United States Patent
Kim et al.

(10) Patent No.: US 9,805,724 B2
(45) Date of Patent: Oct. 31, 2017

(54) METHOD AND APPARATUS FOR VOICE RECORDING AND PLAYBACK

(71) Applicant: Samsung Electronics Co., Ltd., Gyeonggi-do (KR)

(72) Inventors: Eungha Kim, Gyeongsangbuk-do (KR); Jeongwook Seo, Daegu (KR); Sangho Kim, Gyeongsangbuk-do (KR); Bongseok Park, Gyeongsangbuk-do (KR); Cheongjae Lee, Daegu (KR)

(73) Assignee: Samsung Electronics Co., Ltd. (KR)

( * ) Notice: Subject to any disclaimer, the term of this patent is extended or adjusted under 35 U.S.C. 154(b) by 45 days.

(21) Appl. No.: 14/840,928

(22) Filed: Aug. 31, 2015

(65) Prior Publication Data

US 2016/0064002 A1    Mar. 3, 2016

(30) Foreign Application Priority Data

Aug. 29, 2014  (KR) .......................... 10-2014-0114566

(51) Int. Cl.

| | |
|---|---|
| *G10L 21/00* | (2013.01) |
| *G10L 17/06* | (2013.01) |
| *G06F 3/16* | (2006.01) |
| *G10L 15/22* | (2006.01) |

(Continued)

(52) U.S. Cl.
CPC ............ *G10L 17/06* (2013.01); *G01S 3/8083* (2013.01); *G06F 3/167* (2013.01); *G10L 15/22* (2013.01);

(Continued)

(58) Field of Classification Search
CPC ......... G10L 17/06; G10L 15/22; G10L 25/84; G10L 13/00; G10L 15/18; G10L 15/26;
(Continued)

(56) References Cited

U.S. PATENT DOCUMENTS

| | | | |
|---|---|---|---|
| 8,473,099 B2 * | 6/2013 | Sugiyama | ............... G06F 17/28 700/245 |
| 2004/0114772 A1 * | 6/2004 | Zlotnick | .................. H04R 3/12 381/92 |

(Continued)

FOREIGN PATENT DOCUMENTS

KR  1020120035190  4/2012

OTHER PUBLICATIONS

European Search Report dated Jan. 29, 2016 issued in counterpart application No. 15182824.1-1957, 9 pages.

*Primary Examiner* — Vijay B Chawan
(74) *Attorney, Agent, or Firm* — The Farrell Law Firm, P.C.

(57) ABSTRACT

Methods and apparatuses are provided for controlling an electronic device that includes a plurality of microphones configured to receive voice input, a storage unit configured to store a sound recording file, and a display unit configured to visually display speaker areas of individual speakers when recording a sound or playing a sound recording file. The electronic device also includes a control unit configured to provide a user interface relating a speaker direction to a speaker by identifying the speaker direction while recording the sound or performing playback of the sound recording file, and to update at least one of speaker information, direction information of a speaker, and distance information of the speaker through the user interface.

25 Claims, 43 Drawing Sheets

(51) Int. Cl.
*G10L 25/51* (2013.01)
*G10L 25/84* (2013.01)
*G11B 20/10* (2006.01)
*G01S 3/808* (2006.01)
*H04R 29/00* (2006.01)
*G10L 17/22* (2013.01)
*H04R 3/00* (2006.01)

(52) U.S. Cl.
CPC .............. *G10L 25/51* (2013.01); *G10L 25/84* (2013.01); *G11B 20/10527* (2013.01); *G10L 17/22* (2013.01); *G11B 2020/10546* (2013.01); *H04R 3/005* (2013.01); *H04R 29/008* (2013.01); *H04R 2499/11* (2013.01)

(58) Field of Classification Search
CPC ......... G10L 25/27; G01S 3/00; G01S 3/8083; G06F 3/167; G06F 17/28; G06F 21/32; G06F 21/46; G06F 3/16; H04S 2420/11; H04S 3/00; H04R 3/005; H04R 2205/022; H04R 5/027; H04R 2420/07; H04R 25/40; H04R 25/407; H04R 3/12; H04R 5/02

USPC ............... 704/246, 270, 275, 270.1; 726/18; 381/92, 186, 303, 313, 97, 98; 700/245
See application file for complete search history.

(56) References Cited

U.S. PATENT DOCUMENTS

| | | | |
|---|---|---|---|
| 2008/0199023 A1* | 8/2008 | Kantola | H04R 3/005 381/92 |
| 2008/0219485 A1* | 9/2008 | Kantola | H04R 3/005 381/303 |
| 2010/0323669 A1 | 12/2010 | Maggenti et al. | |
| 2013/0222230 A1* | 8/2013 | Choi | G06F 3/167 345/156 |
| 2013/0230179 A1* | 9/2013 | Beaty | H04S 7/40 381/56 |
| 2015/0036850 A1* | 2/2015 | Barthel | H04R 25/407 381/313 |
| 2015/0220715 A1* | 8/2015 | Kim | G06F 21/32 726/18 |

* cited by examiner

FIG. 4
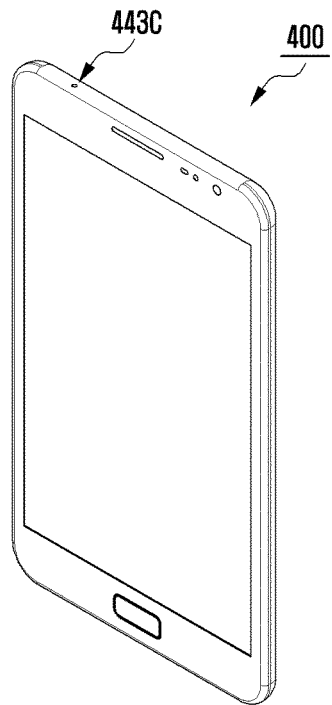
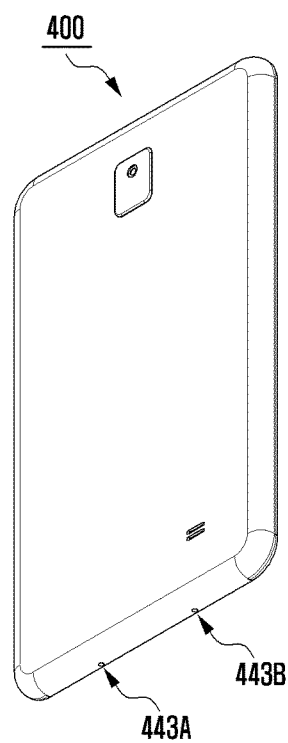

FIG. 30

Recordings

I have an annoucement of considerable importance.
The first problem of today's meeting is to...

I would like to make a comment on that...

Let me give you a rundown on what has been going on with the packaging and shipping process. We're here today to discuss the possible waws to meet our x1.0

00:04:10          00:20:00

METHOD AND APPARATUS FOR VOICE RECORDING AND PLAYBACK

PRIORITY

This application claims priority under 35 U.S.C. §119(a) to a Korean Patent Application filed on Aug. 29, 2014 in the Korean Intellectual Property Office and assigned Serial No. 10-2014-0114566, the contents of which are incorporated herein by reference.

BACKGROUND OF THE INVENTION

1. Field of the Invention

The present invention relates generally to an electronic device and, more particularly, to a method and an apparatus for voice recording in the electronic device.

2. Description of the Related Art

Various services are provided for users of an electronic device. For example, an electronic device supports a telephone function as well as various functions including, for example, web page browsing, contents playback, Social Networking Service (SNS) activity, sound recording (voice recording) and playback, video recording and playback. The electronic device can receive a sound (or voice) using a microphone while performing functions of telephone, voice recording, or video recording. In order to support the above-described functions, the microphone of electronic device receives a sound and converts it into an electric signal.

While performing the sound recording, users can be located at various distances and directions from the electronic device, according to the sound recording environment, e.g., an interview, a conference, a speech, and daily activity. However, the sound recording environment, which determines the distance or direction between users participating in the sound recording, is not considered, and the sound (or voice) is simply recorded. Accordingly, the quality of the sound or voice recording can be deteriorated due to distance differences between users (for example, a speaker) and an electronic device (for example, a microphone). Specifically, it is difficult to record a high quality voice for all users. Further, it is difficult to distinguish individual speakers when playing a sound recording file, and information corresponding to various sound recording environments (for example, locations and directions of speakers) is not intuitively provided.

SUMMARY OF THE INVENTION

The present invention has been made to address as least the above problems and/or disadvantages and to provide at least the advantages described below. Accordingly, an aspect of the present invention provides an electronic device and an operating method of the electronic device, which can improve user convenience and usability of the electronic device by establishing an environment suitable for supporting a sound recording function in the electronic device.

In accordance with an aspect of the present invention, a method is provided for operating an electronic device. A speaker is identified from an acoustic signal. A direction from the electronic device to the speaker is determined. A user interface is provided for the acoustic signal based on the direction from the electronic device to the speaker. The user interface is updated.

In accordance with another aspect of the present invention, a method is provided for operating an electronic device. A playback operation is performed. A user interface is provided including a speaker area of at least one speaker corresponding to the playback operation. A voice of the at least one speaker is output according to a playback section while performing the playback operation. The speaker area in the user interface corresponding to the at least one speaker is updated while outputting the voice of the at least one speaker.

In accordance with another aspect of the present invention, an electronic device is provided that includes a plurality of microphones configured to receive voice input, a storage unit configured to store a sound recording file, and a display unit configured to visually display speaker areas of individual speakers when recording a sound or playing a sound recording file. The electronic device also includes a control unit configured to provide a user interface relating a speaker direction to a speaker by identifying the speaker direction while recording the sound or performing playback of the sound recording file, and to update at least one of speaker information, direction information of a speaker, and distance information of the speaker through the user interface.

In accordance with another aspect of the present invention, a non-transitory computer readable recording medium having a program is provided. The program, when executed, implements the steps of identifying a speaker from an acoustic signal; identifying a direction from the electronic device to the speaker; providing a user interface for the acoustic signal based on the direction from the electronic device to the speaker; and outputting a voice of the at least one speaker according to a playback section while performing the playback operation.

BRIEF DESCRIPTION OF THE DRAWINGS

The above and other aspects, features, and advantages of the present invention will be more apparent from the following detailed description when taken in conjunction with the accompanying drawings, in which:

FIG. 4 is a diagram illustrating microphones disposed in an electronic device, according to an embodiment of the present invention;

FIGS. 25-30 are diagrams illustrating operations for controlling playback of a sound recording file in an electronic device, according to an embodiment of the present invention;

DETAILED DESCRIPTION OF EMBODIMENTS OF THE PRESENT INVENTION

Figure 1:
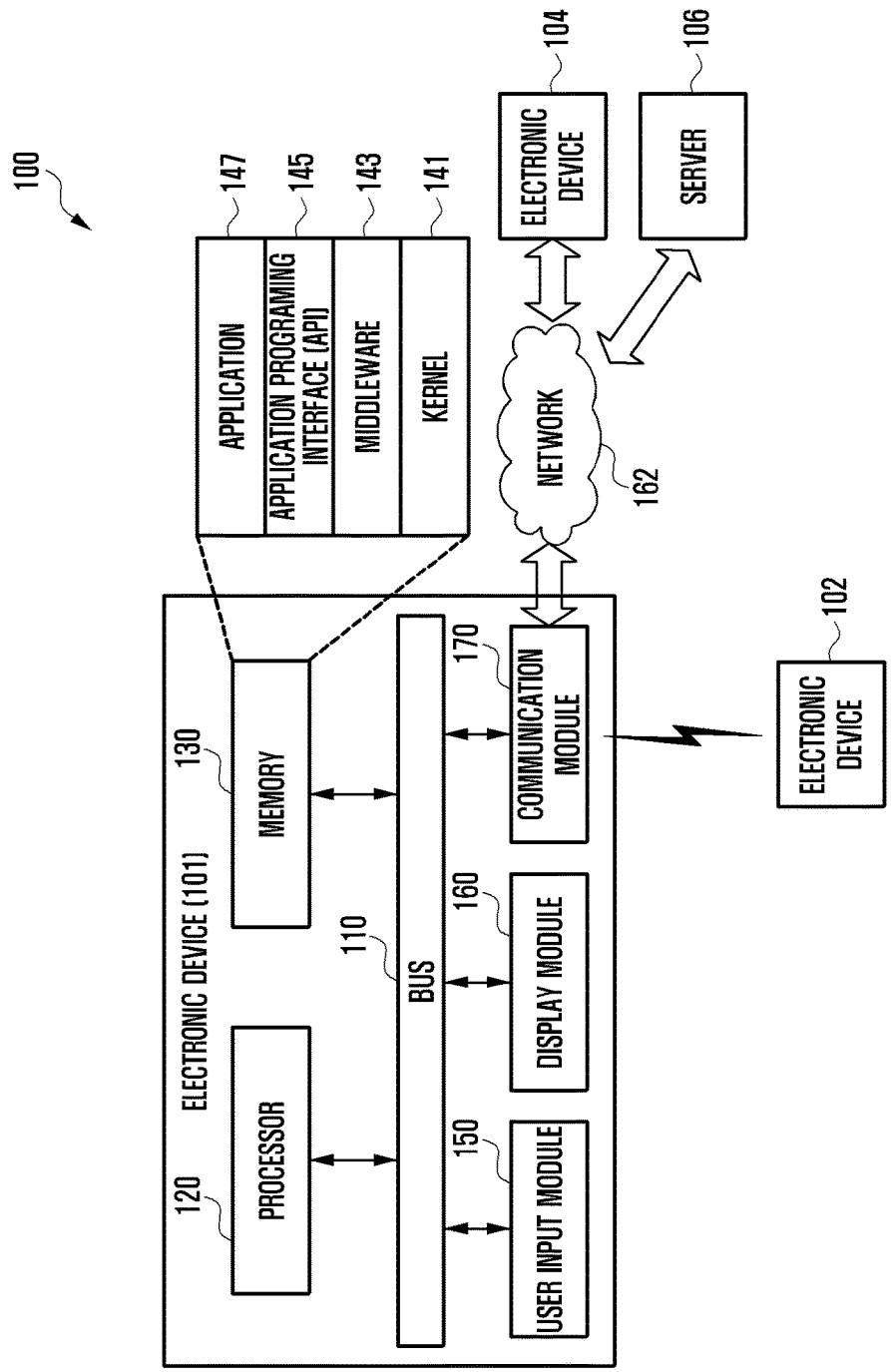
FIG. 1 is a diagram illustrating an electronic device in a network environment, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Some components in the accompanying drawings are emphasized, omitted, or schematically illustrated, and the size of each component does not fully reflect the actual size. Therefore, the present invention is not limited to the relative sizes and distances illustrated in the accompanying drawings.

The expressions "comprise" and "include", as used herein, indicate the existence of a correspondingly disclosed function, operation, or component, and does not exclude the existence of at least one additional function, operation, or component. Further, the terms "include" and "have", as used herein, mean that a characteristic, number, step, operation, element, component, or their combination exists in the disclosure, and therefore, it should be understood that at least one additional characteristic, number, step, operation, element, component, or their combination is not excluded.

Expressions "A or B", "at least one of A and B", and "one or more of A and B" may include one of the listed words and their combinations. For example, "A or B", "at least one of A and B", and "one or more of A and B" may mean all the cases of: (1) including at least A, (2) including at least B, and (3) including at least A and B.

Expressions such as "first" and "second" can modify various components of the present invention, but do not limit the corresponding components. For example, the above expressions do not limit the order and/or importance of the corresponding components. The above expressions can be used to distinguish one component from another component. For example, both a first user device and a second user device are user devices but indicate separate user devices. For example, within the spirit and scope of the present invention, a first component can be referred to as a second component and, similarly, the second component can be referred to as a first component.

When describing that a component (for example, a first component) is operatively or communicatively "coupled with/to" or "connected to" another component (for example, a second component), the component could be directly coupled or connected to the other component or a further another component (for example, a third component) could exist between them. If it is described that a component (for example, a first component) is "directly coupled with/to" or "directly connected to" another component (for example, a second component), it should be understood that no other component exists between them.

The expression "configured to", as used herein, may be interchangeably replaced with "suitable for", "having the capacity to", "designed to", "adapted to", "made to", or "capable of" according to a given situation. The expression "configured to" may not mean only "specifically designed to" in hardware. Alternatively, in some cases, an expression "device configured to" may mean that the device "can do ~" together with another device or other components. For example, "a processor configured (or set) to perform A, B, and C" may mean a generic-purpose processor (for example, Central Processing Unit (CPU) or application processor) that can perform corresponding operations by using a dedicated processor (for example, embedded processor) or by executing at least one software program stored in a memory.

The terms used herein are used to describe embodiments of the present invention, and do not limit the scope and spirit of the present invention. It is to be understood that the singular forms "a", "an", and "the" include plural referents as well, unless the context dictates otherwise.

Unless the context clearly dictates otherwise, all terms, including technical or scientific terms, used herein, have the same meanings as those generally understood by those skilled in the art. It should be understood that terms defined in a generally used dictionary have the same meanings as in a related technical context, and are not interpreted to have abnormal or excessively formal meanings, unless clearly dictated herein.

According to various embodiments of the present invention, the electronic device may be embodied as a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a portable medical device, a digital camera, or a wearable device (e.g., a Head-Mounted Device (HMD) such as electronic glasses, electronic clothes, an electronic bracelet, an electronic necklace, an electronic appcessory, or a smart watch).

According to embodiments of the present invention, an electronic device may be a smart home appliance. For example, an electronic device may be embodied as a TV a Digital Versatile Disc (DVD) player, audio equipment, a refrigerator, an air conditioner, a vacuum cleaner, an oven, a microwave, a washing machine, an air cleaner, a set-top box, a TV box, a game console, an electronic dictionary, an electronic key, a camcorder, or an electronic picture frame.

According to embodiments of the present invention, an electronic device may be embodied as various medical devices (for example, Magnetic Resonance Angiography (MRA), Magnetic Resonance Imaging (MRI), Computed Tomography (CT), a scanning machine, a ultrasonic wave device, or the like), a navigation device, a Global Positioning System (GPS) receiver, an Event Data Recorder (EDR), a Flight Data Recorder (FDR), a car infotainment device, electronic equipment for ship (e.g., a marine navigation system, a gyrocompass, etc.), avionics, security equipment, head unit for automobile, industrial or home robot, Automatic Teller's Machine (ATM) for banking facilities, Point Of Sales (POS) for store, or internet of things (for example, electric bulb, various sensors, electric or gas meter, spring cooler device, fire alarm, thermostat, streetlight, toaster, sporting goods, hot-water tank, heater, and boiler).

According to embodiments of the present invention, an electronic device may be embodied as furniture or part of a building or construction having a communication function, an electronic board, an electronic signature receiving device, a projector, or various measuring instruments (e.g., a water meter, an electric meter, a gas meter, a wave meter, etc.). An electronic device may be embodied as one of the above-described devices or any combination thereof. The electronic device, according to an embodiment of the present invention, may be a flexible electronic device. Further, the electronic device, according to an embodiment of the present invention, is not limited to the above-described devices, and may include new electronic devices according to technical developments.

Herein, the term "user" may mean a person who uses an electronic device or a device that uses the electronic device (for example, artificial intelligence electronic device).

Referring initially to FIG. 1, a diagram illustrates an electronic device in a network environment, according to an embodiment of the present invention. A network environment 100 includes an electronic device 101, which includes a bus 110, a processor 120, a memory 130, an input/output module 150, a display module 160, and a communication module 170. In some embodiments of the present invention, the electronic device 101 may omit at a least one component or may include additional components.

The bus 110 may be a circuit that interconnects the above-described elements and delivers a communication (e.g., a control message) between the above-described elements.

The processor 120 may receive commands from the above-described other elements (e.g., the memory 130, the user input module 150, the display module 160, the communication module 170, etc.) through the bus 110, may interpret the received commands, and may execute calculation or data processing according to the interpreted commands.

The memory 130 may include a volatile and/or non-volatile memory. The memory 130 can store a command or data related to at least one component of the electronic device 101. According to an embodiment of the present invention, the memory 130 can store software and/or a program. The program includes a kernel 141, middleware 143, Application Programming Interface (API) 145, and application program (or "application") 147. At least one of the kernel 141, middleware 143, and API 145 may refer to an Operating System (OS).

The kernel 141 may control or manage system resources (e.g., the bus 110, the processor 120, or the memory 130, etc.) used for performing operations or functions of the other programming modules, e.g., the middleware 143, the API 145, or the application 147. Additionally, the kernel 141 may offer an interface that allows the middleware 143, the API 145 or the application 147 to access, control, or manage individual elements of the electronic device 101.

Further, middleware 143 can process at least one operation request received from the application 147 according to a priority. For example, the middleware 143 can assign the priority to at least one of the applications 147 so that the application can use system resources of the electronic device 101 (for example, the bus 110, the processor 120, or the memory 130). By processing the operation request according to the priority assigned to the applications 147, the middleware 143 can perform scheduling or load balancing for at least one operation request.

The API 145 may include a file control, window control, video processing, or at least one interface or function (for example, command) for text control so that the application 147 can control a function provided by the kernel 141 or middleware 143.

The user input module 150 may play the role of an interface that transmits commands or data received from a user or an external device to other components of the electronic device 101. Further, the user input module 150 can transmit commands and data received from other components of the electronic device 101 to a user device or external device.

The display module 160 may include a Liquid Crystal Display (LCD), a Light-Emitting Diode (LED) display, an Organic Light-Emitting Diode (OLED) display, a Micro-electromechanical Systems (MEMS) display, or an electronic paper display. The display module 160 can output various contents such as, for example, a text, an image, a video, an icon, and a symbol for a user. The display module 160 may include a touch screen, and can receive inputs of touch, gesture, approach, or hovering by using an electric pen or a portion of a user's body.

The communication module 170 can set communication between the electronic device 101 and an external device (for example, a first external electronic device 102, a second external electronic device 104, or a server 106). For example, the communication module 170 can communicate with an external device (for example, the second external electronic device 104 or the server 106) by connecting to a network 162 through wireless communication or wired communication.

The wireless communication may use at least one cellular communication protocol such as, for example, Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM). Further, wireless communication may include a local area network 164. The local area network 164 may include at least one of Wireless Fidelity (WiFi), Bluetooth, Near Field Communication (NFC), or Global Positioning System (GPS). The wired communication may include at least one of Universal Serial Bus (USB), High Definition Multimedia Interface (HDMI), Recommended Standard 232 (RS-232), or Plain Old Telephone Service (POTS). The network 162 may include at least one of a communication network (telecommunications network) such as, for example, a computer network (for example, LAN or WAN), internet, or telephone network.

The first and second external electronic devices 102 and 104 may be of the same type as the electronic device 101 or may be different types of devices. According to an embodiment of the present invention, the server 106 may include one or more servers in a group. According to various embodiments of the present invention, all or a portion of the operations executed in the electronic device 101 may be also executed in one or more different electronic devices (for example, electronic devices 102 and 104, or server 106). According to an embodiment of the present invention, when the electronic device 101 performs a function or service automatically or according to a request, the electronic device 101 may not perform all of the functions or services by itself, but instead may request another device (for example, electronic devices 102 and 104, or server 106) to perform at least a portion of functions or an additional function, and to transmit the result to the electronic device 101. The electronic device 101 may provide the requested function or service as received or by additionally processing. For this, cloud computing, distributed computing, or client-server computing technology can be utilized.

Figure 2:
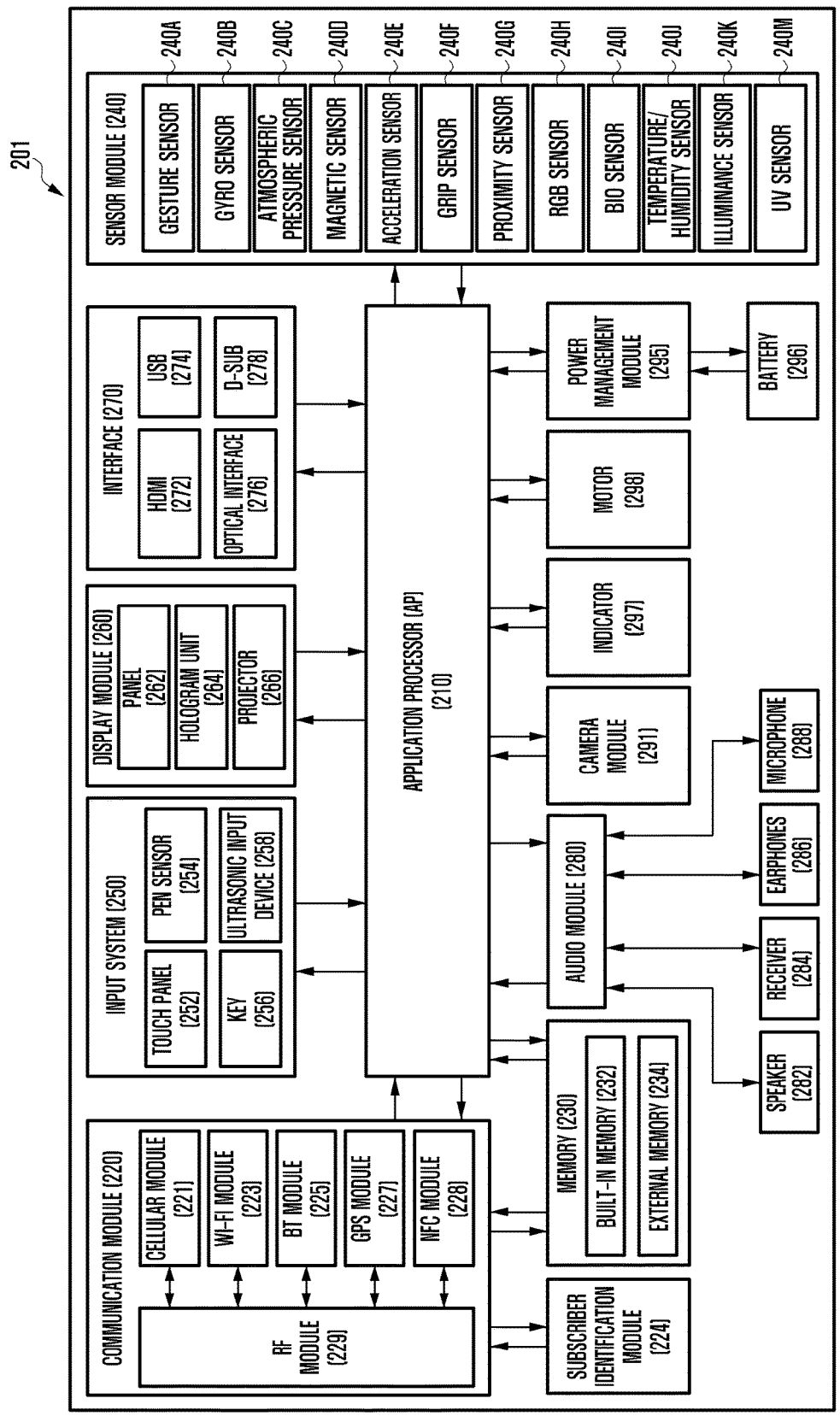
FIG. 2 is a diagram illustrating an electronic device, according to an embodiment of the present invention.

FIG. 2 is a diagram illustrating an electronic device, according to an embodiment of the present invention.

An electronic device 201 may form, for example, the whole or part of the electronic device 101 of FIG. 1. The electronic device 201 includes at least one Application Processor (AP) 210, a communication module 220, a Subscriber Identification Module (SIM) 224, a memory 230, a sensor module 240, an input system 250, a display module 260, an interface 270, an audio module 280, a camera module 291, a power management module 295, a battery 296, an indicator 297, and a motor 298.

The AP 210, for example, may drive an operating system or applications, control a plurality of hardware or software components connected thereto, and also perform processing and operation for various data including multimedia data. The AP 210 may be formed of a System-on-Chip (SoC), fir example. According to an embodiment of the present invention, the AP 210 may further include a Graphic Processing Unit (GPU) and/or image signal processor.

The AP 210 may include at least a portion of components shown in FIG. 2 (for example, cellular module 221). The AP 210 can process a command or data received from at least one of other components (for example, non-volatile memory) by loading into the volatile memory, and store various data in the non-volatile memory.

The communication module 220 may have a configuration that is the same as or similar to the communication interface 170 of FIG. 1. For example, the communication module 220 includes a cellular module 221, a WiFi module 223, a Bluetooth module 225, a GPS module 227, an NFC module 228, and a Radio Frequency (RF) module 229.

The cellular module 221 can provide a voice communication, video communication, character service, or internet service through a communication network. According to an embodiment of the present invention, the cellular module 221 can perform identification and authentication of the electronic device 201 by using SIM 224 (for example, SIM card) in the communication network. According to an embodiment of the present invention, the cellular module 221 can perform at least a portion of functions provided by the processor 210. According to an embodiment of the present invention, cellular module 221 may include a Communication Processor (CP).

WiFi module 223, Bluetooth module 225, GPS module 227, or NFC module 228 may individually include a processor for processing data transmitted and received through the corresponding module. According to an embodiment of the present invention, at least one of the cellular module 221, WiFi module 223, Bluetooth module 225, GPS module 227, and NFC module 228 may be installed in an Integrated Circuit (IC) or IC package. The RF module 229 may transmit and receive data, e.g., RF signals or any other electric signals. The RF module 229 may include a transceiver, a Power Amp Module (PAM), a frequency filter, a (Low Noise Amplifier (LNA), antenna or the like. The WiFi module 223, the BT module 225, the GPS module 227 and the NFC module 228 are shown to share the RF module 229, however, at least one of them may perform transmission and reception of RF signals through a separate RF module in another embodiment of the present invention.

The SIM 224 may be included in a card and/or embedded SIM, and may include specific identification information (for example, Integrated Circuit Card Identifier (ICCID)) or subscriber information (for example, International Mobile Subscriber Identity (IMSI)).

The memory 230 (for example, the memory 130) includes an internal built-in memory 232 and/or an external memory 234. The internal memory 232 may include at least one of a volatile memory (for example, Dynamic Random Access Memory (DRAM), Static RAM (SRAM), or Synchronous Dynamic RAM (SDRAM)), and a non-volatile memory (for example, One Time Programmable Read Only Memory (OTPROM), Programmable ROM (PROM), Erasable and Programmable ROM (EPROM), Electrically Erasable and Programmable ROM (EEPROM), mask ROM, flash ROM, flash memory (for example, NAND flash or NOR flash), hard disk drive, or Solid State Drive (SSD).

The external memory 234 may include a flash drive, e.g., Compact Flash (CF), Secure Digital (SD), Micro Secure Digital (Micro-SD), Mini Secure Digital (Mini-SD), eXtreme Digital (xD), MultiMediaCard (MMC), memory stick, or the like. The external memory 234 may be functionally and/or physically connected to the electronic device 201 through various interfaces.

The sensor module 240 may measure a physical quantity or sense an operating status of the electronic device 201, and then convert the measured or sensed information into electric signals. The sensor module 240 includes, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 24011 (e.g., Red, Green, Blue (RGB) sensor), a biometric sensor 2401, a temperature-humidity sensor 240J, an illumination sensor 240K, and an ultraviolet (UV) sensor 240M. In an embodiment of the present invention, the electronic device 201 can control the sensor module 240, when the processor 210 is in a sleep state, by further including a processor configured to partially or separately control the sensor module 240.

The input system 250 includes, for example, a touch panel 252, a digital pen sensor 254, a key 256, and/or an ultrasonic input device 258. The touch panel 252 may recognize a touch input in a manner of capacitive type, resistive type, infrared type, or ultrasonic type. Also, the touch panel 252 may further include a control circuit. The touch panel 252 may further include a tactile layer. In this case, the touch panel 252 may offer a tactile feedback to a user.

The pen sensor (digital pen sensor) 254 may be a portion of touch panel or a separate identification sheet. The key 256 may include a physical key, optical key, or keypad. The ultrasonic input device 258 can detect ultrasonic waves generated by an input tool through a microphone 288, and identify data corresponding to the detected ultrasonic waves.

The display module 260 (e.g., the display 160) includes a panel 262, a hologram unit 264, and/or a projector 266. The panel 262 may have a flexible, transparent, or wearable form. The panel 262 may be formed of a single module with the touch panel 252. The hologram unit 264 may show a stereoscopic image in the air using interference of light. The projector 266 may project an image onto a screen, which may be located at the inside or outside of the electronic device 201. According to an embodiment of the present invention, the display 260 may further include a control circuit for controlling the panel 262, the hologram unit 264, and the projector 266.

The interface 270 includes, for example, a High-Definition Multimedia Interface (HDMI) 272, a Universal Serial Bus (USB) 274, an optical interface 276, and/or a D-sub-miniature (D-sub) 278. The interface 270 may be contained, for example, in the communication interface 170 of FIG. 1, Additionally or alternatively, the interface 270 may include, for example, a Mobile High-definition Link (MHL) interface, a Secure Digital (SD) card/Multi-Media Card (MMC) interface, or an Infrared Data Association (IrDA) interface.

The audio module 280 may perform a conversion between sounds and electric signals. At least part of the audio module 280 may be contained, for example, in the user input module 150 of FIG. 1. The audio module 280 may process sound information inputted or outputted through a speaker 282, a receiver 284, an earphone 286, and/or the microphone 288.

According to various embodiments of the present invention, the microphone 288 can receive an external sound signal and process it to an electric voice data. The voice data processed by the microphone 288 can be output by converting to a transmittable form to an external device through the communication module 220 when the electronic device 201 is in a telephone mode. The microphone 288 can be configured with various noise reduction algorithms in order to remove noises generated in the process of receiving an external sound signal. The microphone 288 can handle an audio stream of voice recognition, voice copy, digital recording, and telephone function. For example, the microphone 288 can convert a voice signal to an electric signal. According to various embodiments of the present invention, the microphone 288 is configured with a plurality of microphones (for example, first microphone, second microphone, and third microphone) so that a directional pattern can be obtained in a specific array form. If the electronic device 201 includes a plurality of microphones, a direction of speaker can be identified based on at least one of time, distance, and intensity of sound or voice (decibel) input by the microphones, and thereby individual speakers can be distinguished. The electronic device 201 can output a sound corresponding to the distinguished direction of speaker. According to various embodiments of the present invention, the microphone 288 may include an internal microphone installed in the electronic device 201 and an external microphone connected to the electronic device 201. According to an embodiment of the present invention, sound recording can be supported by combining the internal and external microphones while performing a sound recording function.

According to various embodiments of the present invention, the AP 210 (or controller, or control unit) can control operations related to the sound recording function. For example, the AP 210 can identify a speaker direction while sound recording or playback is performed, and control to provide a user interface corresponding to the operation of identifying a speaker direction. The AP 210 can control to update at least one of speaker information, speaker direction information, or speaker distance information through the user interface while proceeding the sound recording or playback. According to various embodiments of the present invention, the AP 210 can perform a voice recording operation of the electronic device by synchronizing with software modules stored in the memory 230, The AP 210 can perform sound recording by distinguishing speakers and speaker locations (distances and directions) in the sound recording function. Further, the AP 210 can identify the current speaker in the sound recording function, and record a voice signal based on the identified speaker while displaying a visual effect.

According to various embodiments of the present invention, the AP 210 can select a speaker in the playback function, and output a voice signal while displaying a visual effect based on the selected speaker.

According to various embodiments of the present invention, the AP 210 can connect electronic devices of other users (a plurality of speaker) through wired or wireless communication and, in some cases, operate as a master or server of the connected electronic devices to transmit and receive voice information and speaker information.

According to various embodiments of the present invention, by synchronizing a plurality of microphones or electronic devices (for example, electronic device 101 and electronic device 102), the AP 210 obtains angle information of direction having a high energy or a phase difference between arriving voices in order to identify a direction of sound source. The AP 210 can identify a speaker area of sound source based on directions accumulated for a predetermined time, and if the size of sound is greater than a predetermined value or if an angle value of direction has a big difference from an average angle value of previous sounds, the control unit may process it as a noise or a meaningless voice. While recording a sound or playing a sound recording file, the AP 210 can distinguish a speech section, mute section, simultaneous speech section, and speaker movement section, and process operations related to compensating a movement of speaker or electronic device 201. Further, the AP 210 can process an operation of storing various information such as speaker information, voice signal in speaker area, text information generated by converting a voice signal to a text, and speaker area information. According to various embodiments of the present invention, the AP 210 may be configured with at least one module which can process the above functions.

The camera module 291 may capture an image and a moving image. According to an embodiment of the present invention, the camera module 291 may include one or more image sensors (e.g., a front lens or a back lens), an Image Signal Processor (ISP), and a flash LED.

The power management module 295 may manage power of the hardware. The power management module 295 may include, for example, a Power Management Integrated Circuit (PMIC), a charger IC, or a battery gauge. The PMIC may be mounted to, for example, an IC or a SoC semiconductor. Charging methods may be classified into a wired charging method and a wireless charging method. Examples of the wireless charging method may include a magnetic resonance method, a magnetic induction method, an electromagnetic method, and the like. Additional circuits (e.g., a coil loop, a resonance circuit, a rectifier, etc.) for wireless charging may be added in order to perform the wireless charging. The battery gauge may measure, for example, a residual quantity of the battery 296, or a voltage, a current or a temperature during the charging. The battery gauge may measure, for example, a residual quantity of the battery 296, or a voltage, a current or a temperature during the charging. The battery 296 may supply power by generating electricity, and may be, for example, a rechargeable battery or solar battery.

The indicator 297 may indicate particular states of the electronic device 201 or a part (e.g., the AP 210) of the electronic device 201, for example, a booting state, a message state, a charging state, and the like. The motor 298 may convert an electrical signal into a mechanical vibration or generate vibration, or haptic effect. The electronic device 201 may include a processing unit (e.g., a GPU) for supporting a module TV. The processing unit for supporting a module TV may process media data according to standards such as, for example, Digital Multimedia Broadcasting (DMB), Digital Video Broadcasting (DVB), media flow, and the like.

Each of the above-described elements of the electronic device 201, according to an embodiment of the present invention, may include one or more components, and the name of the relevant element may change depending on the type of electronic device. The electronic device 201, according to an embodiment of the present invention, may include at least one of the above-described elements. Some of the above-described elements may be omitted from the electronic device 201, or the electronic device 201 may further include additional elements. Also, some of the elements of the electronic device 201, according to an embodiment of the present invention, may be combined into one entity, which may perform functions identical to those of the relevant elements before the combination.

Figure 3:
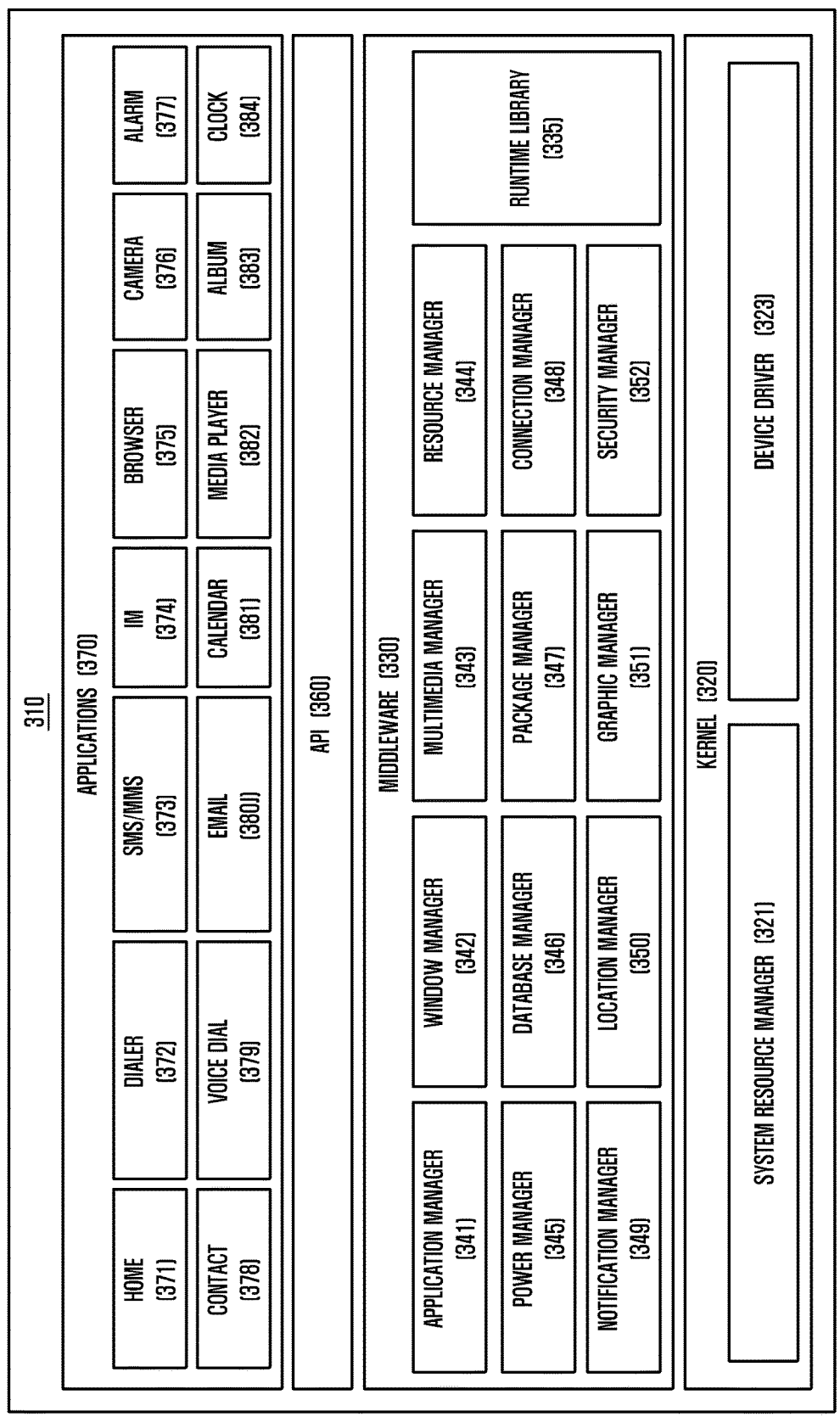
FIG. 3 is a diagram illustrating a configuration of a programming module, according to an embodiment of the present invention.

FIG. 3 is a diagram illustrating a configuration of a programming module, according to an embodiment of the present invention.

A programming module 310 may be implemented in hardware, and may include an OS controlling resources related to an electronic device (e.g., the electronic device 201) and/or various applications (e.g., an application 147) executed in the OS.

The programming module 310 includes a kernel 320, a middleware 330, an API 360, and/or the applications 370. At least a portion of the program module 310 may be preloaded in the electronic device or downloaded from an external device (for example, electronic devices 102 and 104, or server 106).

The kernel 320 (e.g., the kernel 141) includes a system resource manager 321 and/or a device driver 323, The system resource manager 321 may include, for example, a process manager, a memory manager, and a file system manager. The system resource manager 321 may perform the control, allocation, recovery, and/or the like of system resources. The device driver 323 may include, for example, a display driver, a camera driver, a Bluetooth driver, a shared memory driver, a USB driver, a keypad driver, a Wi-Fi driver, and/or an audio driver. Also, according to an embodiment of the present invention, the device driver 323 may include an inter-Process Communication (IPC) driver.

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present invention, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present invention, when the electronic device (e.g., the electronic device 101) has a telephone function, the middleware 330 may further include a telephony manager for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present invention, may further include other elements, or may replace the some of the elements with elements, each of which performs a similar function and has a different name.

The API 360 (e.g., the API 145) is a set of API programming functions, and may be provided with a different configuration according to an OS.

The applications 370 (e.g., the applications 147) may include, for example, a preloaded application and/or a third party application. The applications 370 (e.g., the applications 147) include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

According to an embodiment of the present invention, the applications 370 may include an application (hereafter, "information exchange application") supporting information exchange between an electronic device 101 and an external electronic device 102 and 104. The information exchange application may include a notification relay application for transmitting specific information to the external electronic device or a device management application for managing the external electronic device.

For example, the notification relay application may include a function of transmitting notification information generated by an application of other electronic device (for example, the SMS/MMS application 373, the email application 380, a health care application, or an environmental information application) to the external electronic device (for example, electronic devices 102 and 104). Further, the notification relay application can provide notification information for a user by receiving from the external electronic device.

The device management application can manage (for example, install, delete, or update) at least one function (for example, turning on/off of electronic device or some of its components, or control of display brightness and resolution) of external electronic device (for example, electronic devices 102 and 104) communicating with the electronic device, application operating in the external electronic device, or service provided by the external electronic device (for example, telephone service or message service).

According to an embodiment of the present invention, the applications 370 may include applications (for example, a health care application for mobile medical appliance) designated according to the attributes of the external electronic device 102 and 104. According to an embodiment of the present invention, the applications 370 may include an application received from the external electronic device (for example, the server 106 or the electronic devices 102 and 104). According to an embodiment of the present invention, the applications 370 may include a preloaded application or a third party application downloaded from a server. The component names of program module 310, according to an embodiment of the present invention, may differ according to the type of operating system.

According to various embodiments of the present invention, at least a portion of the program module 310 may be configured with software, firmware, hardware, or their combinations. At least a portion of the program module 310 may be implemented or executed by a processor (for example, the processor 210). At least a portion of the program module 310 may include a module, program, routine, command set of instructions, or process in order to perform at least one function.

The term "module", as used herein, may refer to, for example, a unit including one or more combinations of hardware, software, and firmware. The term "module" may be interchangeable with terms such as "unit," "logic," "logical block," "component," "circuit," or the like. A module may be a minimum unit of a component formed as one body or a part thereof. A module may be a minimum unit for performing one or more functions or a part thereof. A module may be implemented mechanically or electronically. For example, a module, according to an embodiment of the present invention, may include at least one of an Application-Specific Integrated Circuit (ASIC) chip, a Field-Programmable Gate Array (FPGA), and a programmable-logic device for performing certain operations, which have been known or are to be developed in the future.

At least a part of the programming module 310 may be implemented by instructions stored in a non-transitory computer-readable storage medium. When the instructions are executed by one or more processors (e.g., the one or more processors 120), the one or more processors may perform functions corresponding to the instructions. The non-transitory computer-readable storage medium may be, for example, the memory 130. At least a part of the programming module 310 may be implemented (e.g., executed) by, for example, the one or more processors 120. At least a part of the programming module 310 may include, for example, a module, a program, a routine, a set of instructions, and/or a process for performing one or more functions.

The computer-readable storage media may include a hard disk, floppy disk, magnetic media (for example, magnetic tape), optical media (for example, Compact Disc Read Only Memory (CD-ROM), DVD, magneto-optical media (for example, floptical disk), hardware device (for example, ROM, RAM, or flash memory). Further, the program command may include not only the machine language code generated by a compiler, but also a high level language code executable by a computer using an interpreter. The above-described hardware devices may be configured to operate with at least one software module in order to perform an operation, or vice versa, according to various embodiments of the present invention.

Names of the elements of the programming module (e.g., the programming module (e.g., the programming module 310), according to an embodiment of the present invention, may change depending on the type of OS, The programming module 310, according to an embodiment of the present invention, may include one or more of the above-described elements. Alternatively, some of the above-described elements may be omitted from the programming module 310. Alternatively, the programming module 310 may further include additional elements. The operations performed by the programming module 310 or other elements, according to an embodiment of the present invention, may be processed in a sequential method, a parallel method, a repetitive method, or a heuristic method. Also, some of the operations may be omitted, or other operations may be added to the operations.

Embodiments of the present invention relate to an electronic device and a method for operating the electronic device, which includes sound (voice) recording functions for a plurality of speakers, playing a sound recording file, and managing the recording file. In various embodiments of the present invention, the sound recording can be performed by considering various sound recording environments (for example, sound recording in an interview, a conference, a speech, and daily activity), distance or direction between the speakers, and accordingly an electronic device and a method of operating the electronic device, which can intuitively play a corresponding sound recording file, are disclosed.

According to various embodiments of the present invention, a sound signal (acoustic signal) is input from a multi-direction by using a plurality of microphones installed in an electronic device or through synchronization of a plurality of electronic devices. A sound source generation direction (speaker area) is traced by calculating a sound signal input by a predetermined method. Further, according to various embodiments of the present invention, the traced sound source direction may be provided by converting to visualized information. According to various embodiments of the present invention, by providing the sound source generation direction with visualized information, playback can be selected from individual speakers according to a user selection.

According to various embodiments of the present invention, the electronic device may include a plurality of microphones, and can support voice recording by distinguishing speakers, locations, or directions of speakers by using the plurality of microphones. In various embodiments of the present invention, the plurality of microphones may include an internal microphone installed in an electronic device or an external microphone connected to the electronic device, and can additionally or alternatively operate by combining the internal microphone with the external microphone.

Further, according to various embodiments of the present invention, sound recording of voices for a plurality of speakers can be performed through wired or wireless synchronization between a plurality of electronic devices, and the sound recording can be supported by distinguishing speakers, locations, and directions of speakers based on the plurality of electronic devices. Further, according to various embodiments of the present invention, the electronic device can intuitively display information of speakers participated in the sound recording and information of speaker area (location or direction) between speakers, and support a selective playback according to a selection of speaker.

In various embodiments of the present invention, the electronic device may include all the devices utilizing various processors (for example, processor 120), such as an AP, GPU, and CPU. For example, the electronic device may include an information and communication device, multimedia device, wearable device, and an application device that supports functions according to various embodiments of the present invention.

Hereafter, a method is described for accessing hardware, according to various embodiments of the present invention. However, various embodiments of the present invention include technologies using both hardware and software, and thereby various embodiments of the present invention don't exclude an access method based on the software.

According to an embodiment of the present invention, an electronic device may include: a plurality of microphones configured to input a voice; a storage unit configured to store a sound recording file; a display unit configured to visually display a speaker area by individual speaker while sound recording or playing a sound recording file; and a control unit configured to control to display a speaker area corresponding to a speaker direction while proceeding the sound recording, to store a sound recording file by including voice information and direction information when the sound recording is finished, to visually display a selective playback and a speaker area of the playback while playing the sound recording file. In various embodiment of the present invention, the microphone may include an internal microphone and an external microphone. Further, the sound recording file may be configured with voice information, direction information, distance information, and text information, and the storage unit can store an original sound recording file, divided sound recording ile, sound recording file by individual speaker when storing the sound recording file.

Hereinafter, the sound recording mode may be used as a term including a normal mode, interview mode, meeting mode/conference mode, voice memo mode, and playback mode. The normal mode may be a mode in which a user performs a conventional sound recording function by using the electronic device. The interview mode may be a mode in which the user performs a sound recording function by an individual speaker in an environment of talking with more than one user by using the electronic device. The conference mode may be a mode in which the sound recording function is performed by individual speakers in an environment of a conference with a plurality of speakers. The voice memo mode may be a mode in which a text-based message or memo is recorded by converting a voice to a text. The playback mode may be a mode in which sound recording files stored by various sound recording functions are played back.

FIG. 4 is a diagram illustrating microphones disposed in an electronic device, according to an embodiment of the present invention.

Referring to FIG. 4, an electronic device 400 includes a plurality of microphones (for example, a first microphone 443A, a second microphone 443B, and a third microphone 443C). For example, the plurality of microphones may be installed at one of the upper surface, lower surface, right surface, left surface, front surface, or rear surface of the electronic device 400.

In various embodiments of the present invention, the plurality of microphones 443A, 443B, and third microphone 443C may be installed in the electronic device 400, and transmit related information to a control unit so that the sound recording function is performed by receiving voices from the plurality of speakers.

In an embodiment of the present invention, the electronic device 400 includes the first microphone 443A, the second microphone 443, and the third microphone 443C. The first microphone 443A and the second microphone 443B are installed at the lower surface of the electronic device 400, and the third microphone 443C is installed at the upper surface of the electronic device 400. In an embodiment of the present invention, one of the first microphone 443A, the second microphone 443B, and the third microphone 443C may be a microphone for a telephone function of the electronic device 400, and the remaining microphones may be microphones for sound recording of the electronic device 400. In various embodiments of the present invention, the first microphone 443A, the second microphone 443B, and the third microphone 443C may be designed to have directional components.

In the electronic device 400, according to various embodiment of the present invention, the arrangement of microphones is not limited to that shown in FIG. 4. The arrangement of microphones can be implemented variously, for example, two microphones may be installed at the upper surface of the electronic device 400 and one microphone may be installed at the lower surface of the electronic device 400. Alternatively, an additional microphone can be installed at the right surface or left surface of the electronic device 400.

In various embodiment of the present invention, the electronic device 400 including the plurality of microphones 443A, 443B, and 443C can identify speaker information (for example, location, distance, or direction of speaker) based on at least one of time difference, distance difference, or intensity of sound (for example, difference of decibel) of voices input through the first microphone 443A, second microphone 443B, and third microphone 443C.

Figure 5:
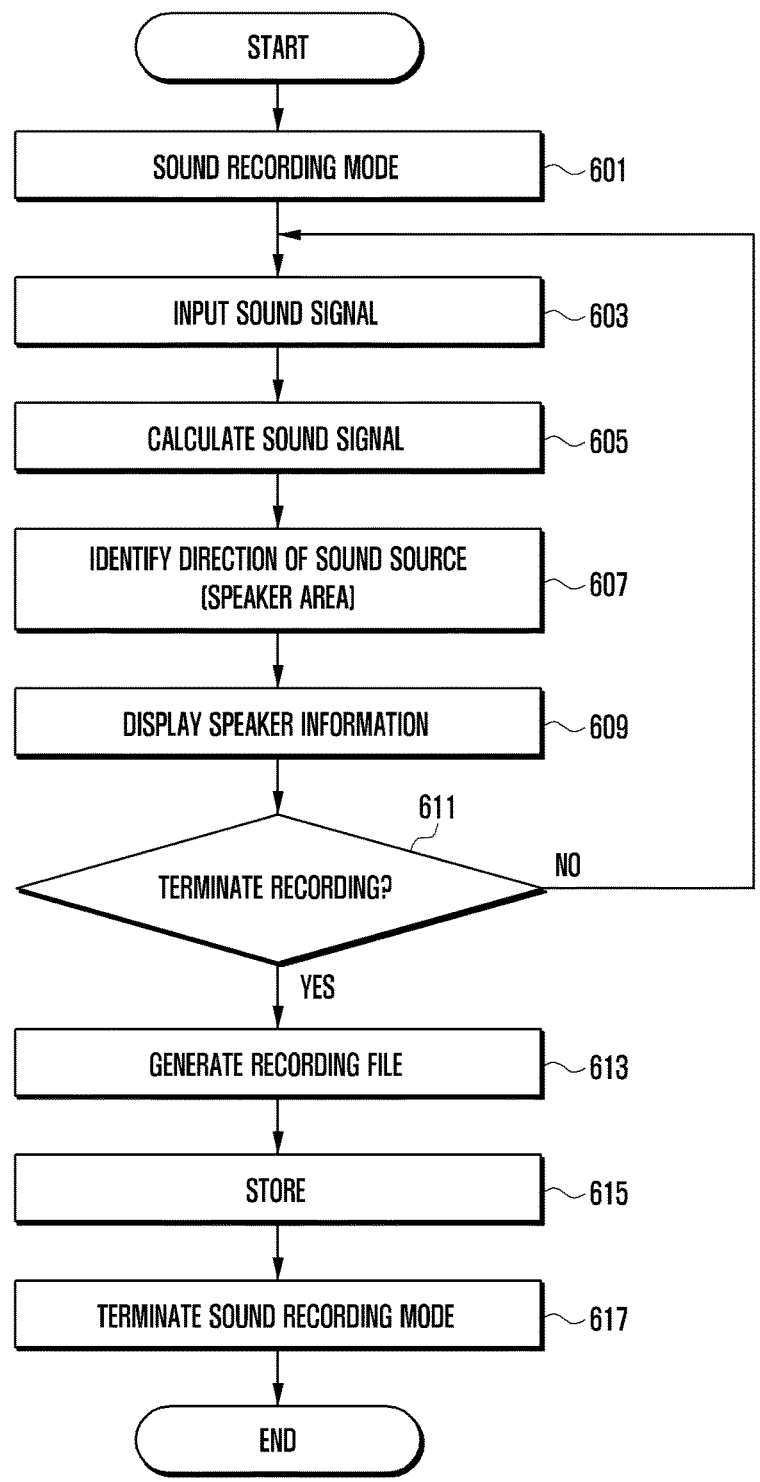
FIG. 5 is a flowchart illustrating processing of a voice recording in an electronic device, according to an embodiment of the present invention.

FIG. 5 is a flowchart illustrating processing of a voice recording in an electronic device, according to an embodiment of the present invention.

Referring to FIG. 5, the AP 210 performs a sound recording mode, in step 601. For example, the AP 210 can receive a user input requesting execution of the sound recording mode while operating the electronic device 201, and execute the sound recording mode responding to the user input. The sound recording mode may be performed as an interview mode or a conference mode according to a user selection, and the AP 210 can control to display an interface related to the sound recording mode according to the user selection.

According to various embodiments of the present invention, the AP 210 receives a sound signal (acoustic signal) through the microphone, in step 603. For example, if at least one user (speaker) makes a speech in a conference environment, the corresponding sound may be input through a plurality of microphones (for example, the first microphone 443A, the second microphone 443B, and the third microphone 443C) installed in the electronic device 400. The plurality of microphones can receive the input sound and transmit to the AP 210 by converting to an electric signal.

According to various embodiments of the present invention, if sound signals (acoustic signals) are received from the plurality of microphones, the AP 210 calculates each sound signal, in step 605. For example, the AP 210 can calculate the sound signals (acoustic signals) input through the plurality of microphones by using a sound source location tracing system based on a Time Difference Of Arrival (TDOA) between sound signals. The algorithm of TDOA may indicate a system which traces a location of a sound source by using arrival delay differences of sound signals input through a plurality of microphones installed at different locations, according to the arrangement of microphones (for example, the first microphone 443A, the second microphone 443B, and the third microphone 443C). According to an embodiment of the present invention, the AP 210 can calculate a relative time delay existing between each sound signal (for example, wave form of sound signal) by using the TDOA. Alternatively, the AP 210 can calculate the sound signals input through the plurality of microphones by using a sound source location tracing system, which compares the frequency, phase, or sound pressure of the sound signal based on Steered Response Power (SRP). According to an embodiment of the present invention, the sound has a characteristic of sound pressure besides the frequency and phase. The sound pressure is a pressure generated when sound waves passes through a medium, and differences in the size of sound pressure can generate according to distances between the sound signal and each microphone. Accordingly, by calculating and comparing sound pressures input through each microphone, it can be identified that a sound has generated at the closet location of microphone having the highest sound pressure. Further, the AP 210 can use a complex algorithm to trace a sound source.

According to various embodiments of the present invention, the AP 210 identifies a direction of sound source based on the calculation result, in step 607. For example, AP 210 can identify a direction of sound source from the result calculated through a sound source location tracing algorithm such as the TDOA or SRP, and distinguish individual speakers (for example, speaker area) according to the direction of sound source.

According to various embodiments of the present invention, the AP 210 processes speaker information to be displayed corresponding to the direction of sound source, in step 609. For example, the AP 210 can identify a speaker area of the current speaker by analyzing the direction of traced sound source, and process so that speaker information for recognizing the current speaker is dynamically displayed through the identified speaker area. According to an embodiment of the present invention, the AP 210 can identify the direction of speaker, provide a user interface for relating the identified direction to the speaker, and provide the user interface to be dynamically updated corresponding to the input sound source. Operations for displaying a speaker area and the corresponding speaker information according to an embodiment of the present invention will be described later.

According to various embodiments of the present invention, the AP 210 can process the sound recording by individual speakers in a background based on sound signals input through the plurality of microphones and the direction of traced sound source while processing steps 603 to 609, and buffer sound recording information by individual speakers. In various embodiments of the present invention, the sound recording information may include sound information being recorded and analyzed location information of the corresponding sound.

According to various embodiments of the present invention, the AP 210 identifies whether a user input for terminating the sound recording operation is detected, in step 611. For example, the AP 210 can identify whether a user input is generated through an interface (for example, an end button) set for terminating the sound recording function while performing a sound recording function in a sound recording mode.

According to various embodiments of the present invention, if a user input for terminating the sound recording operation is not detected, the AP 210 returns to step 603 and performs the above-described operations.

If a user input for terminating the sound recording operation is detected, the AP 210 generates a sound recording file, in step 613. For example, the AP 210 terminates voice recording responding to a user input, and generates at least one sound recording file based on sound recording information buffered by individual speakers in the sound recording operation. According to the embodiment of the present invention, the sound recording information by individual speaker may be generated with separate files or generated with a single file. According to various embodiments of the present invention, the AP 210 can generate the sound recording file by including speaker location information.

According to various embodiments of the present invention, the AP 210 stores the generated sound recording file, in step 615. For example, the AP 210 can store one or more sound recording files corresponding to individual speakers according to the sound recording system.

According to various embodiments of the present invention, the AP 210 terminates the sound recording mode, in step 617. According to the embodiment of the present invention, when the sound recording mode is finished responding to a user input, the AP 210 can display a file list of the stored sound recording files or stop the sound recording operation while maintaining a screen display of the sound recording mode.

According to various embodiments of the present invention, AP 210 can identify a speaker from the input acoustic signal (sound signal, voice), and perform an operation of identifying a direction of the identified speaker while proceeding with the sound recording. According to various embodiments of the present invention, control unit 480 can provide a user interface for relating the direction to the speaker based on the operation result, and dynamically update the user interface while proceeding the sound recording. According to various embodiments of the present invention, the operation of updating may include an operation of visually displaying changed speaker information in the corresponding direction responding to the acoustic signal while proceeding the sound recording. According to various embodiments of the present invention, the operation of updating may include operations of identifying a speaker based on an acoustic signal input, and displaying changed speaker information in a user interface based on the identification result or displaying by adding new speaker information to the user interface.

Figure 6:
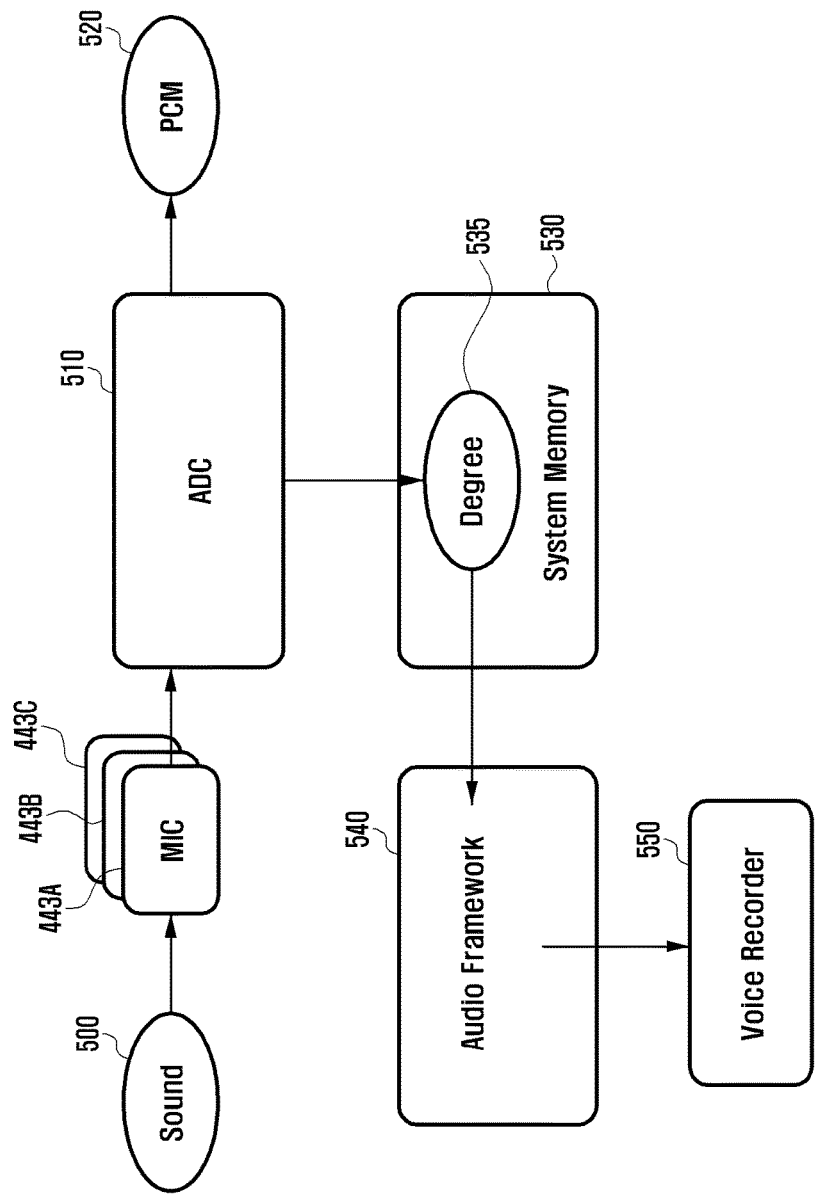
FIG. 6 is a diagram illustrating a procedure of processing a voice recording in an electronic device, according to an embodiment of the present invention.

FIG. 6 is a diagram illustrating a procedure of processing voice recording in an electronic device, according to an embodiment of the present invention.

Referring to FIG. 6, a voice (sound) 500 generated by a speaker can be input through a plurality of microphones (for example, the first microphone 443A, the second microphone 443B, and the third microphone 443C). The voice (sound) input through the plurality of microphones can be converted to electric signals through an Analog-Digital Converter (ADC) 510.

According to various embodiments of the present invention, a Pulse Code Modulation (PCM) sound source 520 and an angle (in degrees) 535 can be extracted from the voice (sound) when the voice passes through the ADC 510, For example, the ADC 510 can transmit the voice signal of a speaker to a voice recorder 550 by converting to a digital signal through a 3rd party module (for example, PCM sound module, and PCM tone generator) using the PCM system, and perform sound recording through the voice recorder 550. Further, the ADC 510 can extract the angle 535 of the inputting voice through the 3rd party module. The extracted angle 535 can be stored in a system memory 530.

According to various embodiments of the present invention, the angle 535 stored in the system memory 530 can be transmitted to the voice recorder 550 in real time through an audio framework 540.

According to various embodiments of the present invention, the voice recorder 550 can perform sound recording based on the transmitted PCM sound source, and analyze the directivity of the PCM sound source by using the angle transmitted during sound recording. The AP 210 can display the speaker information in the display unit based on the analyzed directivity. Further, the directivity may be stored by synchronizing with the PCM sound source.

According to various embodiments of the present invention, the angle (degree) can be accumulated according to a time elapse, and accordingly locations of each speakers can be identified. Such an example is shown in Table 1 below.

TABLE 1

|  | 30 ms | 60 ms | 90 ms | 120 ms | 150 ms |
| --- | --- | --- | --- | --- | --- |
| Direction A | 80° | 79° | 83° | 77° | 84° |
| Direction B | 270° | 277° | 35° | 273° | 272° |

Table 1 illustrates an example of distinguishing each speaker from an identified angle (degree) according to various embodiments of the present invention. In Table 1, the vertical line indicates locations of each speaker and the horizontal line indicates a time elapse. Hereafter, a method of distinguishing speakers (or speaker locations) according to various embodiments of the present invention is described.

Figure 7:
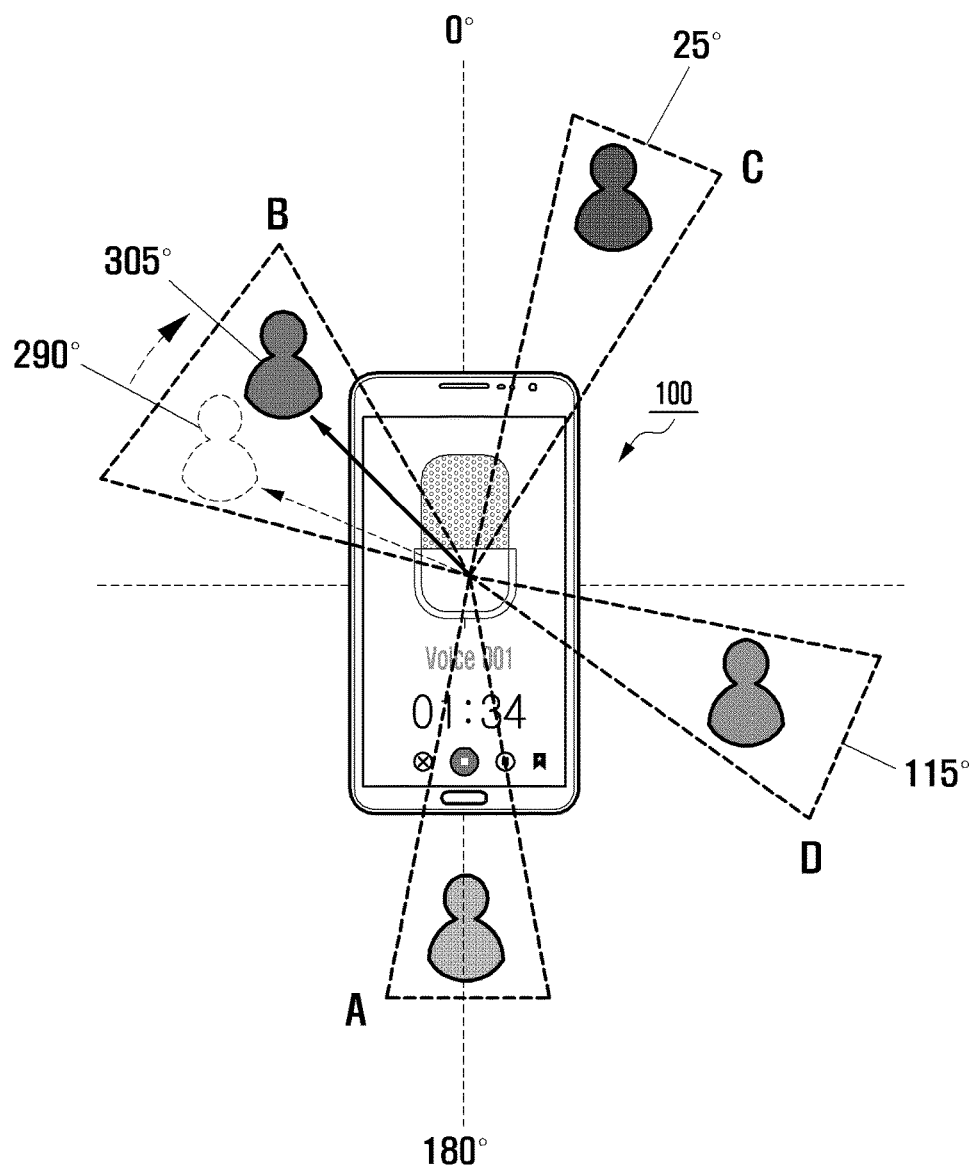
FIG. 7 is a diagram illustrating operations of distinguishing speakers while performing voice recording in an electronic device, according to an embodiment of the present invention.

FIG. 7 is a diagram illustrating operations of distinguishing speakers while performing voice recording in an electronic device, according to an embodiment of the present invention.

Referring to FIG. 7, the electronic device 400 can detect a speaker in the omnidirectional range (0° to 360°) in a sound recording mode (for example, conference mode).

Further, in the embodiment of the present invention, a representative angle can be calculated by obtaining a cumulative average of identified angles. According to the embodiment of the present invention, the electronic device 400 can identify a direction of speaker based on the calculated representative angle (i.e., analyzed directivity) as shown in FIG. 7. According to an embodiment of the present invention, the users can be distinguished, such as, user A: 180°, user B: 305°, user C: 25°, and user D: 115° as shown in FIG. 7.

Further, if a newly input angle has a difference more than a predetermined base angle (for example, +/−10°, +/−15°, +/−30°) from the presented angle, the newly input angle can be ignored or discarded by identifying as an error value.

For example, referring to Table 1, if firstly identified angle is 270° at 30 ms, the presented angle may be determined to be 270°. Subsequently, if a new angle 277° is input at 60 ms, the presented angle may be determined to be approximately as 273° by obtaining a cumulative average of the previous 270° and new 277°. Here, the new angle 277° exists in a tolerance range (for example, base angle +/−10°) from the presented angle 270°, and thereby can be used for the calculation of presented angle. Subsequently, if a new angle 35° is input at 90 ms, the new angle 35° is identifies as an error, and can be ignored. Namely, because the new angle 35° has a difference more than a tolerance range (for example, base angle +/−10°) from the presented angle 273°, the angle 35° may be processed as an error. Subsequently, an angle 273° input at 120 ms and an angle 272° input at 150 ms may be determined in the same manner as described above.

Further, according to various embodiments of the present invention, average angles for all the angles input within the base angle (for example, +/−10°) can be converted to the cumulative average angle (for example, 273°) and stored in a file. According to an embodiment of the present invention, if a cumulative average angle for user B is calculated after calculating the cumulative average angle 305°, angles input within a base angle (for example, +/−10°) set at 305° may be determined as a speaker location based on 305°, and angles having a difference more than the predetermined base angle (for example, 290°) may be processes as error as shown in FIG. 7.

Figure 8:
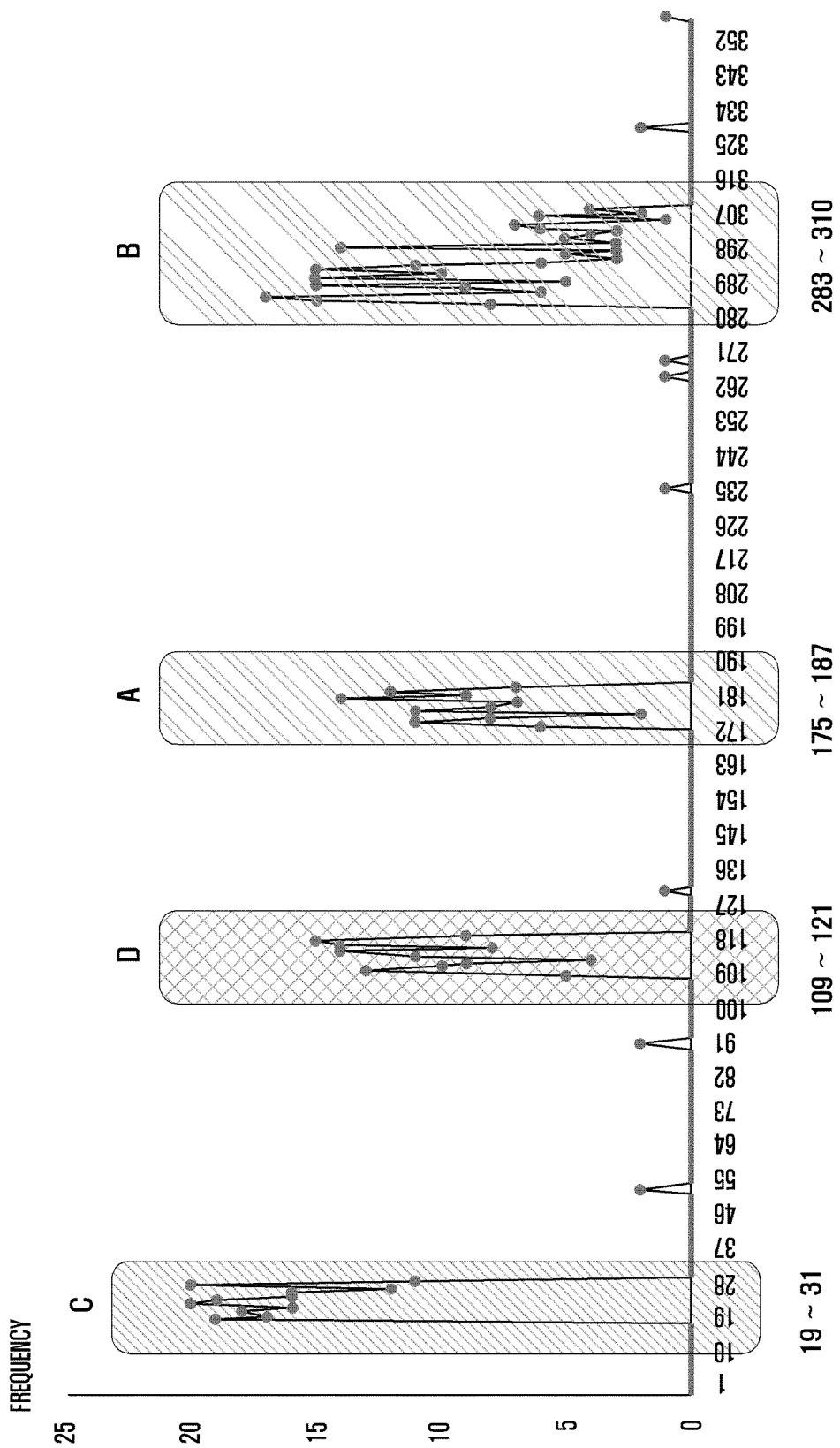
FIGS. 8 and 9 are diagrams illustrating operations of identifying a speaker area in an electronic device, according to an embodiment of the present invention.
Figure 9:
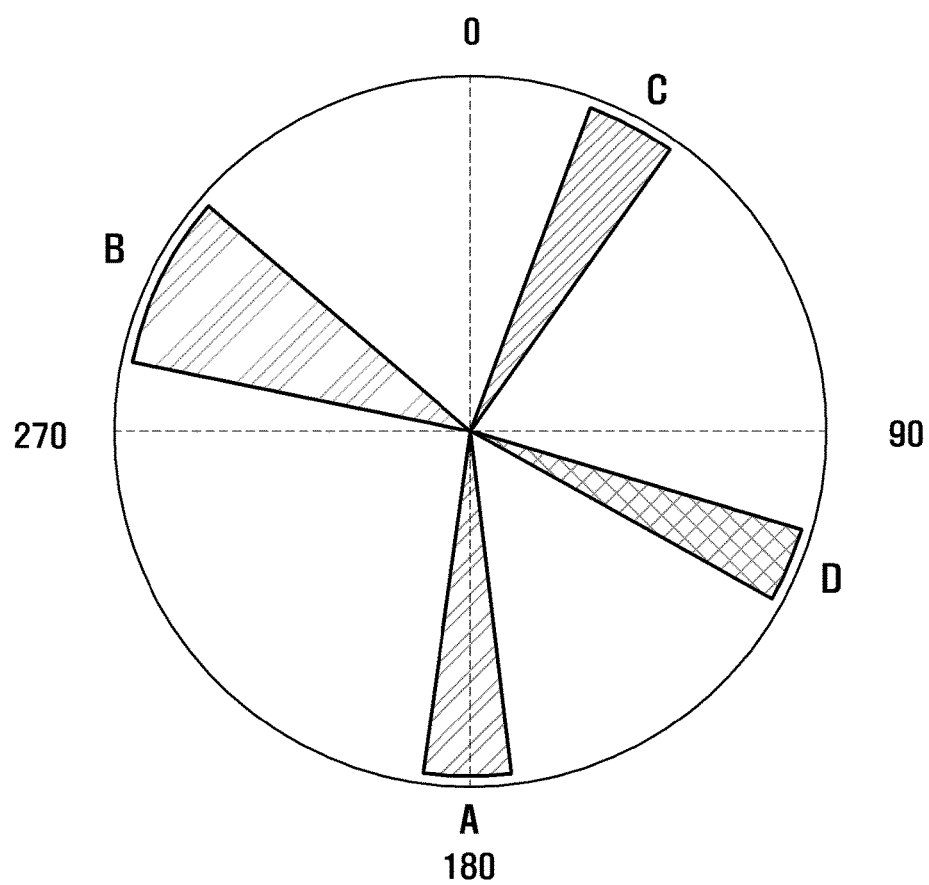

FIGS. 8 and 9 are diagrams illustrating operations of identifying a speaker area in an electronic device, according to another embodiment of the present invention.

Referring to FIGS. 8 and 9, the speaker area can be identified by considering an input angle and movement of speaker while recording a voice by individual speakers.

According to various embodiments of the present invention, a corresponding speaker area can be identified by measuring frequencies of input angles (directions) of sound source while recording voices by individual speakers, as shown in FIG. 8. For example, a sound source between 19° and 31° may be identified as an identical speaker area (for example, user C), a sound source between 109° and 121° may be identified as an identical speaker area (for example, user D), a sound source between 175° and 187° may be identified as an identical speaker area (for example, user A), and a sound source between 283° and 310° may be identified as an identical speaker area (for example, user B).

As shown in FIG. 9, the speaker area can be identified by considering a movement or displacement within a limited area of speaker (for example, error range of base angle). In various embodiments of the present invention, the error range may be variously determined according to the type of sound recording environment. According to an embodiment of the present invention, in a conference environment having frequent movement of speaker, the sound recording may be performed in a dynamic mode in which the error range (base angle) is set greater (for example, +/−30°) and, in a conference environment having less movement of speaker, the sound recording may be performed in a static mode in which the error range is set smaller (for example, +/−15°). Accordingly, in the embodiment of the present invention, a sound source having different directivities within a predetermined error range can be identified as an identical speaker (user). Such an error range can be changed variously according to settings of user or electronic device 400.

Figure 10:
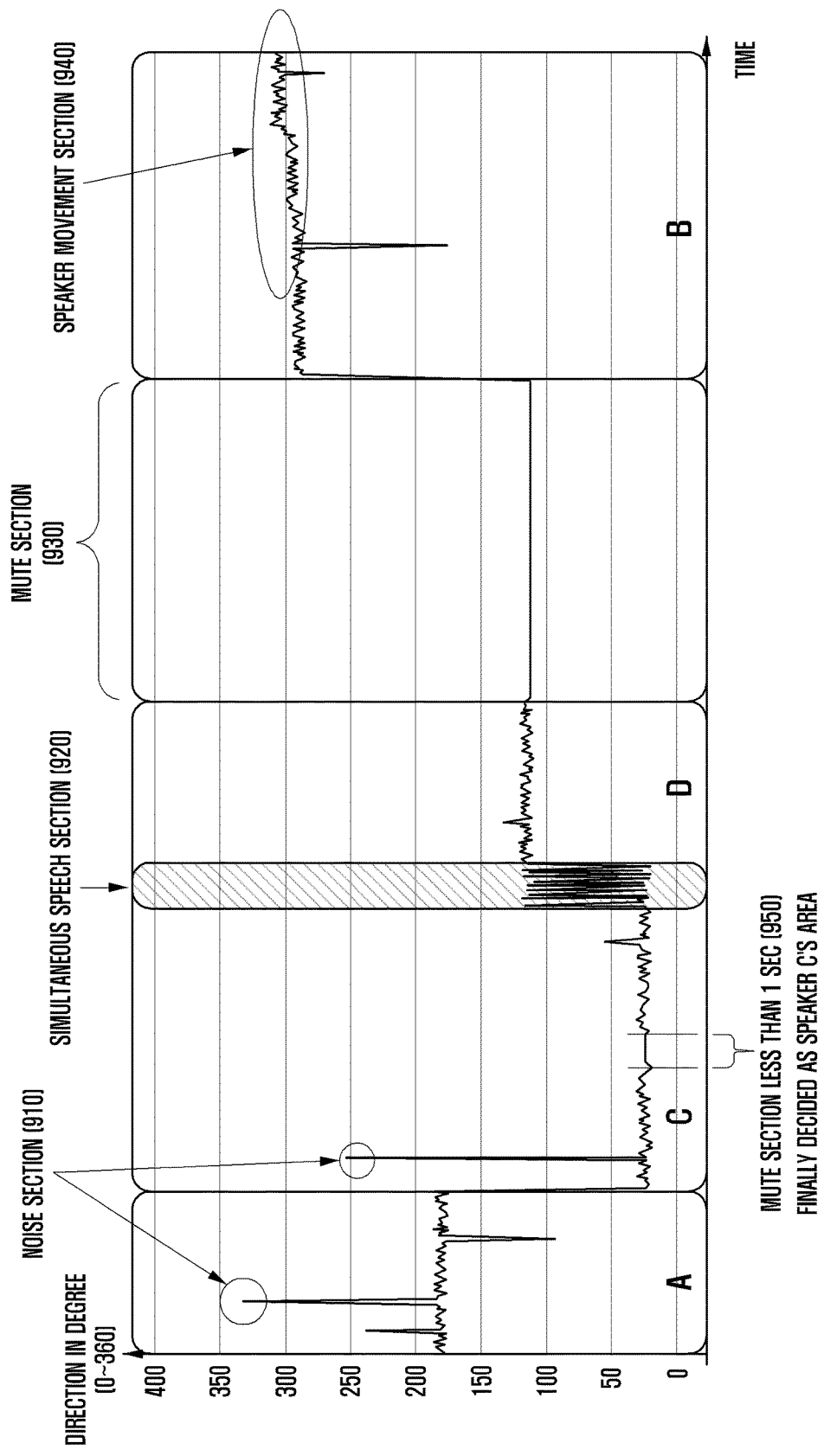
FIG. 10 is a diagram illustrating operations of distinguishing a speaker in real time in an electronic device, according to an embodiment of the present invention.
Figure 11:
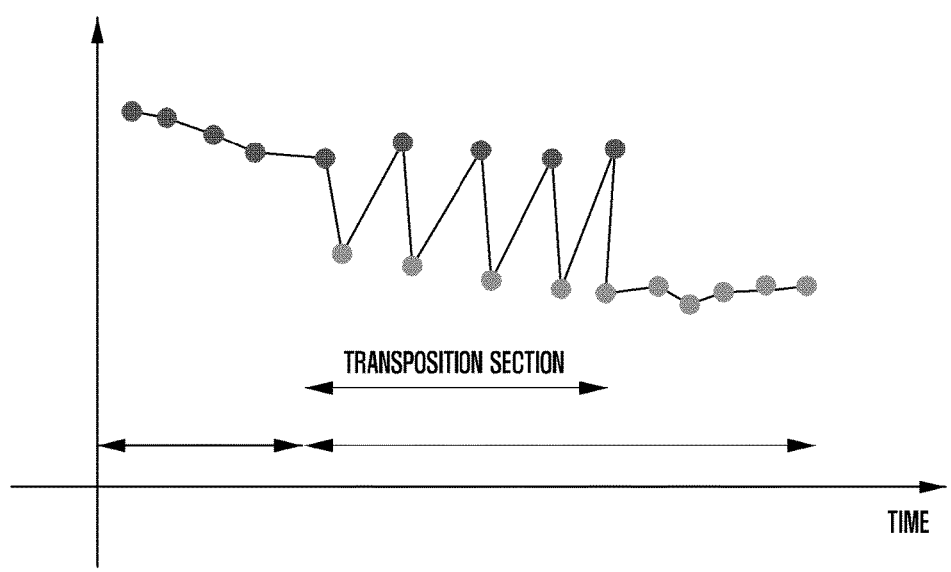
FIG. 11 is a graph illustrating operations of distinguishing a speaker in real time in an electronic device, according to an embodiment of the present invention.
Figure 12:
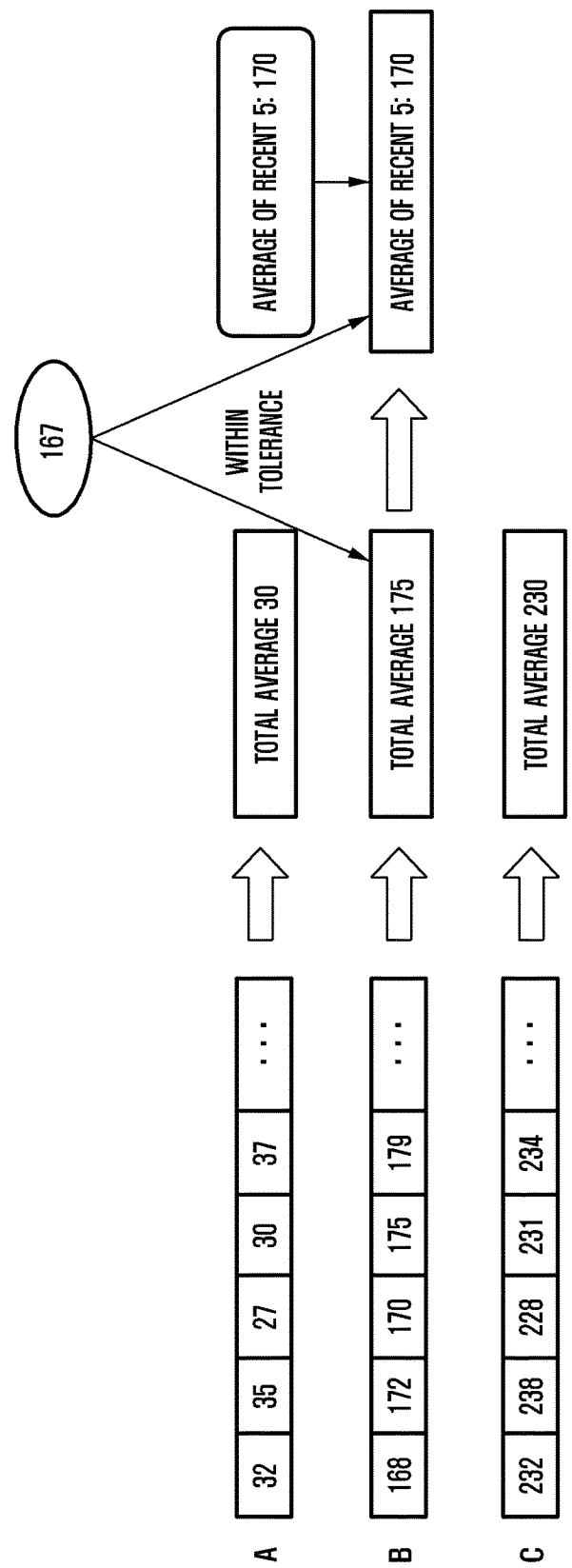
FIG. 12 is a diagram illustrating operations of distinguishing a speaker in real time in an electronic device, according to an embodiment of the present invention.

FIGS. 10 to 12 are diagram illustrating operations of distinguishing a speaker in real time in an electronic device, according to an embodiment of the present invention.

FIG. 10 illustrates an example of performing sound recording for 4 speakers, i.e., user A, user B, user C, and user D, and the horizontal line indicates a time elapse and the vertical line indicates each speaker location (angle of identified direction). According to an embodiment of the present invention, direction data can be collected at 1 frame per specific period (for example, 10 ms).

In various embodiments of the present invention, a speech may be made by a specific speaker or simultaneously by a plurality of speakers while performing sound recording, or various situations can be generated like that no speech is made for a certain time, a speaker moves, or a noise is generated. For example, the sound recording may include a noise section 910, a simultaneous speech section 920, a mute section 930, and a speaker movement section 940 as shown in FIG. 10.

According to various embodiments of the present invention, the noise section 910 may indicate a section where an input directions changes within a specific time (for example, 30 ms). The electronic device 400 may identify a sound signal in the noise section as a noise or meaningless voice. For example, in various embodiments of the present invention, if a sound having a great difference from an average angle of the previous sounds is generated from the same speaker area, the sound may be processed as a noise.

According to an embodiment of the present invention, electronic device 400 can process a sound having a value less than a predetermined size of sound or a sound having a great difference from an average angle of the previous sound as a noise or meaningless voice.

According to various embodiments of the present invention, the simultaneous speech section 920 may indicate a section where changes (i.e., direction change) between more than one speaker is made repeatedly for more than a specific time (for example, 1 ms). For example, as shown in FIG. 11, the electronic device 400 can identify the simultaneous speech section 920 if an interchange between more than one sound direction is generated. According to an embodiment of the present invention, the electronic device 400 can identify the simultaneous speech section 920 when angle change is repeated for a plurality of speakers in a specific time.

According to various embodiments of the present invention, the mute section 930 may indicate a section where an input sound is measured with a value less than a base value (for example, 20 dB), The electronic device 400 can determine the mute section if no sound is input from a plurality of microphones or the intensity of sound being input is measured with a value less than a predetermined value.

According to various embodiments of the present invention, the speaker movement section 940 may indicate a section where an input angle from an identical speaker area changes within a predetermined value. The electronic device 400 can identify the speaker movement section 940 if an average angle value in a speech section changes within a critical value. An example is described with reference to FIG. 12. Here, it is assumed that the currently input sound angle is 167° while performing sound recording for each speaker of user A (angle 30°), user B (angle 180°), and user C (angle 230°).

According to various embodiments of the present invention, as shown in FIG. 12 if a sound is input, the electronic device 400 can identify a speaker area (direction) of user A, user B, and user C. For example, the angle 167° of input sound is in a tolerance range (for example, +/−100) of the direction angle 180° of user B, and can be identified to belongs to speaker area (direction) of user B. The electronic device 400 can compare the input sound angle 167° with an average (for example, 170°) of recent angles (for example, recent 5 angles), and determine that a movement is generated in the direction (speaker area) of user B if the angle 167° is within a tolerance range (for example, +/−10°) of the average (for example, 170°), According to various embodiments of the present invention, the oldest angle is excluded from the recent angles, a median of the remaining 4 angles is calculated, and an average of the recent angles is calculated by adding to the remaining angles. For example, in the example of FIG. 12, the oldest angle 168° is discarded from the recent angles of user B: 168°, 172°, 170°, 175°, and 179°, and an average is calculated by adding a median 174° to the remaining angles: 172°, 170°, 175°, and 179°. Further, if a subsequently input sound angle is 163°, it can be identified that a movement is generated in the speaker area of user B, because the input sound angle 163° is within the tolerance range (for example, +/−10°) of the average 170°.

According to various embodiments of the present invention, in order to identify as an identical speaker, a speaker area detected within a specific angle tolerance range (for example, +/−5°, +/−10°, and +/−15°) can be identified as of identical speaker, and such a tolerance range can be variously set or changed by a user.

According to various embodiments of the present invention, a mute section can be generated within a specific time (for example, 1 sec) in the same speaker area as already mentioned before. For example, as shown by reference number 950 of FIG. 10, if the mute section is generated within the specific time (for example, 1 sec) in the speech section of user C and identical to a preceding and following speakers, the corresponding section is not processed as a mute section but identified as a continuous speech section 950 of the same speaker. According to an embodiment of the present invention, the electronic device 400 can identify the continuous speech section 950 of the same speaker if the mute section is continued less than a specific time in the speaker area and the speaker is same as the preceding and following speakers.

Similarly, according to various embodiments of the present invention, the electronic device 400 can identify a speaker location by tracing an input voice, and distinguish speech and speaker movements of a plurality of speakers in real time based on at least one of a cumulative direction change, time, or volume.

Figure 13:
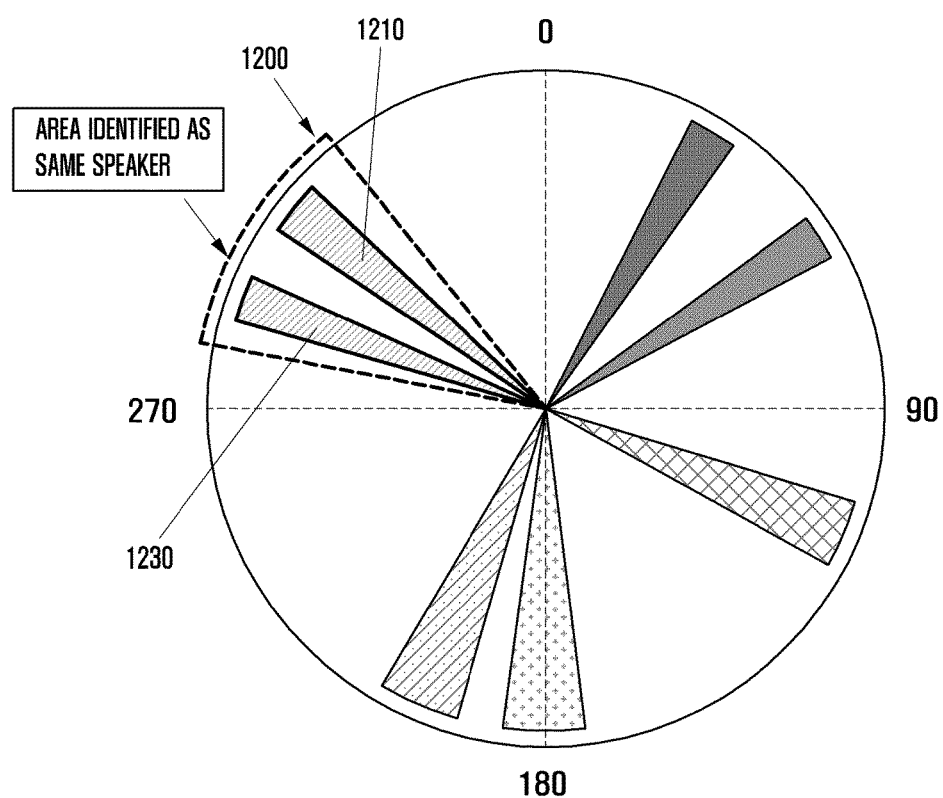
FIG. 13 is a diagram illustrating an operation of distinguishing a speaker in an electronic device, according to an embodiment of the present invention.

FIG. 13 is a diagram illustrating an operation of distinguishing a speaker in an electronic device, according to an embodiment of the present invention.

Figure 14:
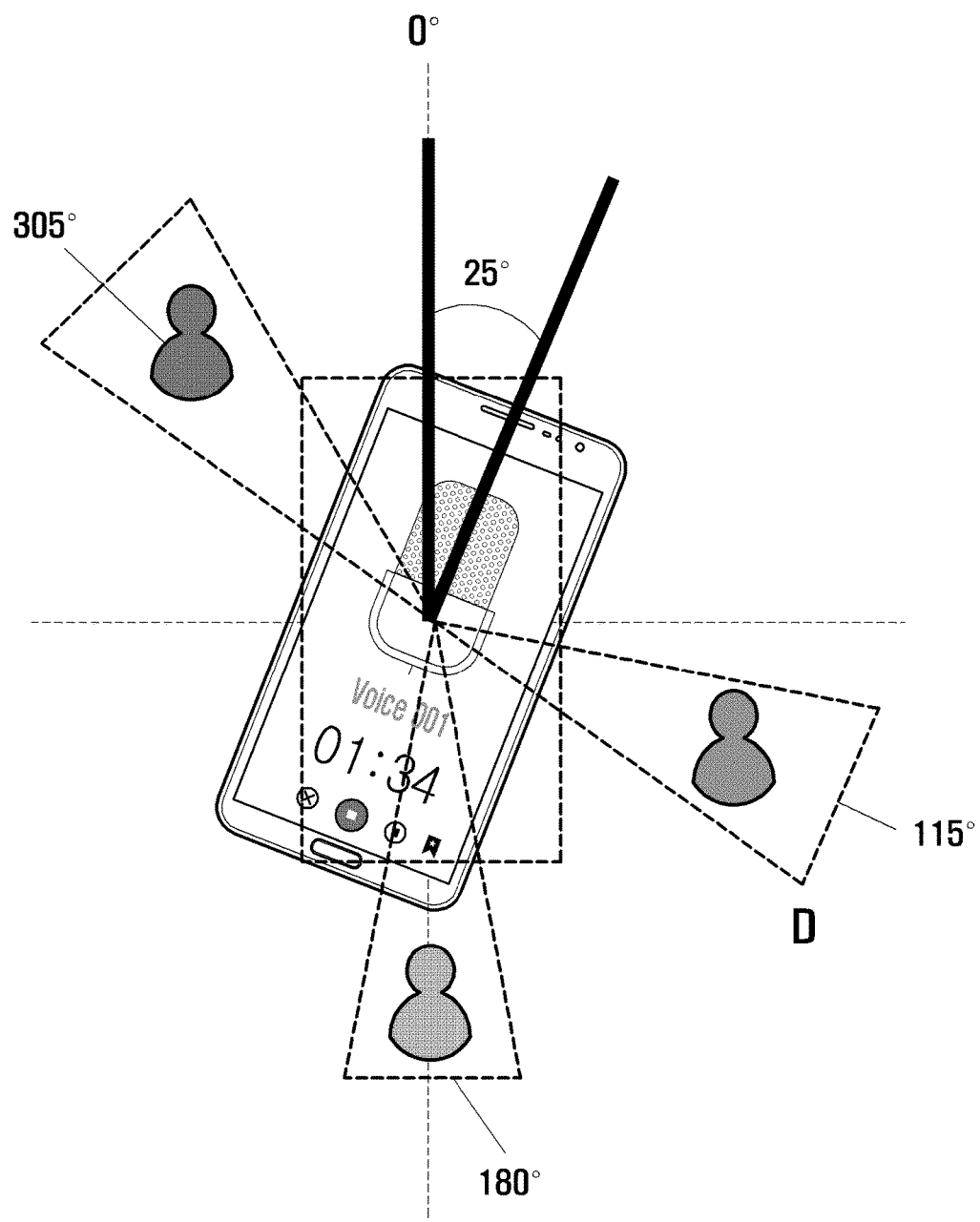
FIG. 14 is a diagram illustrating operations of distinguishing a speaker in an electronic device, according to an embodiment of the present invention.

Referring to FIG. 14, a speaker area is compensated if more than one speaker area is identified as an identical speaker by using speaker recognition while performing voice recording in the electronic device 400, For example, as shown in FIG. 13, sounds can be input from more than one area 1210 and 1230 due to a movement of the same speaker while making a speech.

In various embodiments of the present invention, if more than one area 1210 and 1230 is identified from the same speaker due to the movement of speaker when identifying a speaker and a speaker area based on the direction, the electronic device 400 can identify more than one area 1210 and 1230 as an area 1200 of the same speaker. According to an embodiment of the present invention, the electronic device 400 can identify whether adjacent areas 1210 and 1230 corresponds to the area 1200 of the same speaker by using speaker recognition, and can integrate sound signals input from the adjacent areas 1210 and 1230 through the same channel if the adjacent areas 1210 and 1230 are identical to area 1200 of the same speaker.

Further, according to an embodiment of the present invention, when a plurality of speakers makes a speech, the speaker area can be divided individually based on the directions, and speaker recognition can be performed based on the divided area.

FIG. 14 is a diagram illustrating operations of distinguishing a speaker in an electronic device, according to another embodiment of the present invention.

Referring to FIG. 14, the electronic device 400 performs a compensation operation if more than one speaker area is identified from the same speaker due to a rotation or movement of the electronic device 400 while performing voice recording by using a specific sensor. In various embodiments of the present invention, the specific sensor may include at least one of a gyro sensor, an altitude sensor, a direction sensor, or an acceleration sensor.

For example, as shown in FIG. 14, the electronic device 400 may rotate or move while performing sound recording. In various embodiments of the present invention, if a change of attitude (for example, rotation or movement) is generated while performing sound recording, the electronic device 400 can identify its own rotation angle (for example, 25°) by using the specific sensor. The electronic device 400 can apply the rotation angle (for example, 25°) to the direction (angle) of each speaker area and identify a speaker.

FIGS. 15 to 18 are diagrams illustrating an interface for displaying a sound recording function in an electronic device, according to an embodiment of the present invention.

Figure 15:
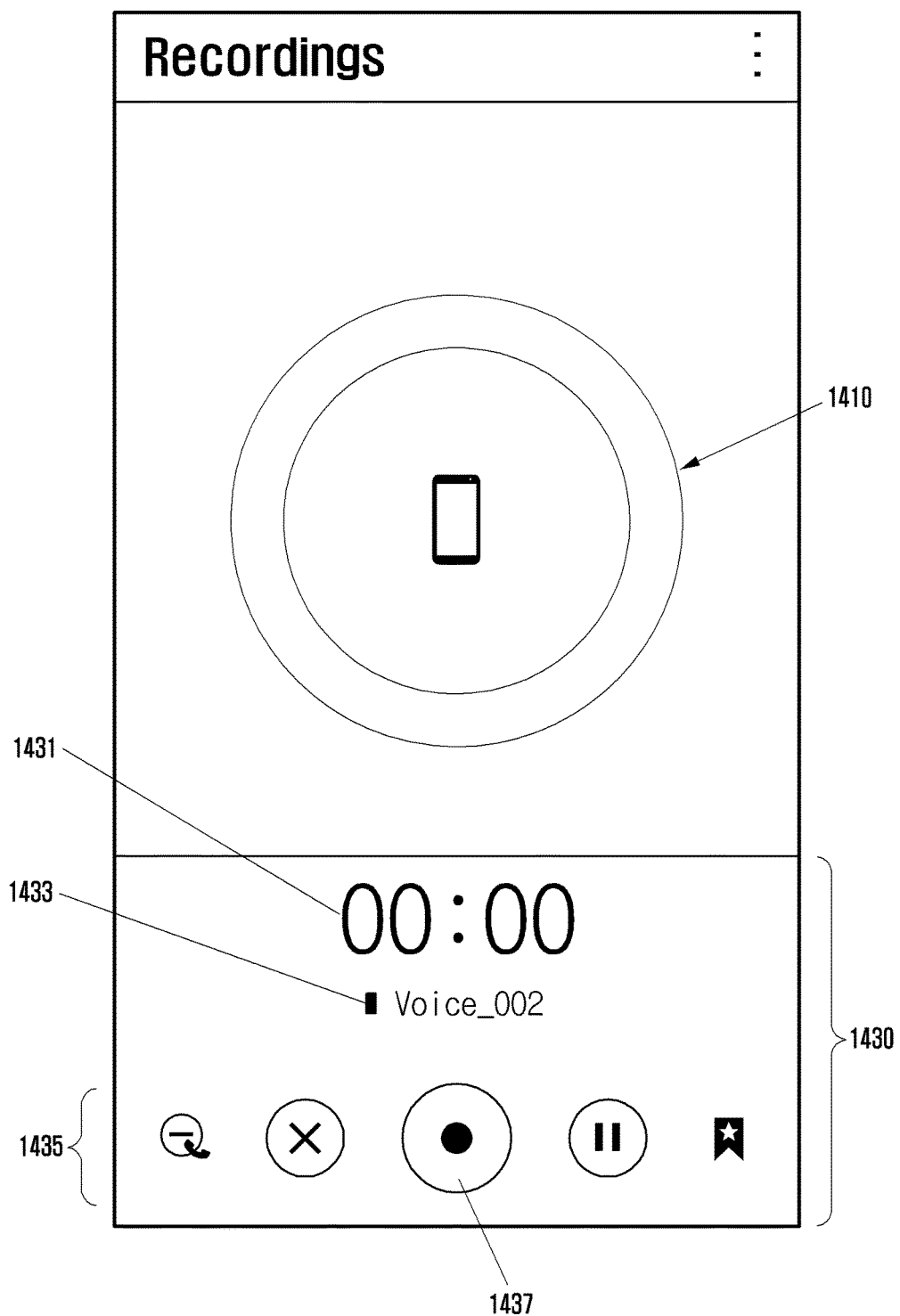
FIG. 15-18 are diagrams illustrating an interface for displaying a sound recording function in an electronic device, according to an embodiment of the present invention.

FIG. 15 illustrates an example of screen interface provided in a sound recording mode (for example, conference mode) executed by the electronic device 400. FIG. 15 shows a screen example before the sound recording is performed in the sound recording mode. As shown in FIG. 15, the screen interface is divided into a speaker information area 1410 and a control area 1430. The speaker information area 1410 can provide speaker information identified while performing sound recording and speaker information of the currently identified speaker. In various embodiments of the present invention, the speaker information may be displayed with an object such as a text, graphic (icon, photo, or image), video, and their combinations. The control area 1430 provides time information 1431, file information 1433, and control information 1435 related to the sound recording.

According to various embodiments of the present invention, in a state of displaying a screen interface shown in FIG. 15, a user can perform sound recording by using control information 1435 related to the sound recording. For example, user can initiate a sound recording function by using a button 1437 for starting and ending the sound recording. The electronic device 400 can perform the sound recording function responding to the user's initialization of sound recording function, and correspondingly display a screen interface shown in FIG. 15.

Referring to 16, the electronic device 400 can display a time elapse according to the sound recording through the time information 1431. The electronic device 400 can display speaker information identified in the sound recording with a predetermined object through the speaker information area 1410. For example, it is assumed that 3 speakers participate in talking and all the speakers are identified because all of the speakers made speeches in the sound recording.

Figure 16:
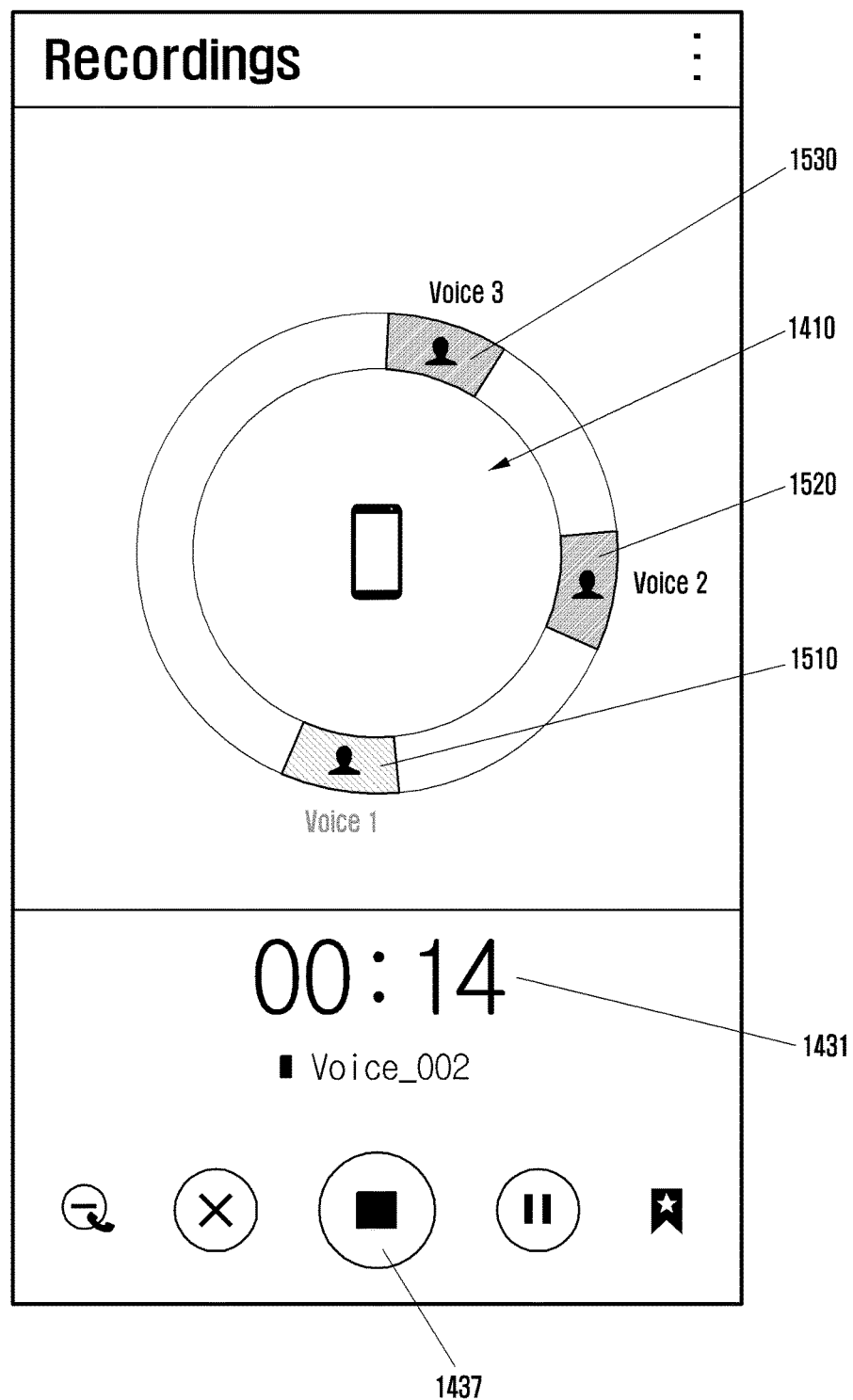

In this case, 3 objects 1510, 1520, and 1530, corresponding to the number of speakers, can be displayed in the speaker information area 1410, as shown in FIG. 16. Further, the objects 1510, 1520, and 1530 can be disposed so that they have directivities corresponding to the identified speakers. For example, as described above, the electronic device 400 can analyze a speaker area from the input sound source, and display the objects 1510, 1520, and 1530 of each speaker in the speaker information area 1410 corresponding to the directivities of analyzed speaker areas. According to an embodiment of the present invention, as shown in FIG. 16, the object 1510 may indicate speaker information of the identified user A, the object 1520 may indicate speaker information of the identified user B, and the object 1530 may indicate speaker information of the identified user C.

In various embodiments of the present invention, when recognizing a speaker according to the sound recording function, the electronic device 400 can display predetermined visual information in the speaker area corresponding to the order of identified speakers. For example, electronic device 400 can display a text-based Voice 1 and a graphic-based user item (for example, the object 1510) of the firstly identified speaker in a corresponding location of the speaker information area 1410, Voice 2 and a user item such as the object 1520 of the secondly identified speaker (for example, user B) in a corresponding location, and Voice 3 and a user item (for example, the object 1530) of the thirdly identified speaker (for example, user C) in a corresponding location.

In various embodiments of the present invention, when displaying the objects 1510, 1520, and 1530 through the speaker information area 1410, the electronic device 400 can display a speaking state by distinguishing speakers. For example, the electronic device 400 can distinguish between a speaker making a speech and a speaker not making a speech. According to an embodiment of the present invention, in the example of FIG. 16, the objects 1510 and 1530 of the corresponding speakers (for example, respectively user A and user C) indicate a state of not speaking, and the object 1520 of the corresponding speaker (for example, user B) indicates a state of speaking. The electronic device 400 can display an object of speaker area for an identified speaker differently from other objects by differently visualizing if at least one speaker is identified while proceeding the sound recording. According to various embodiments of the present invention, corresponding object can be differently displayed by visualizing at least one of color, brightness, intaglio/relief, and shape (shape change), highlight, or by adding an item (for example, speech state icon) according to a speaking state of speaker.

Figure 17:
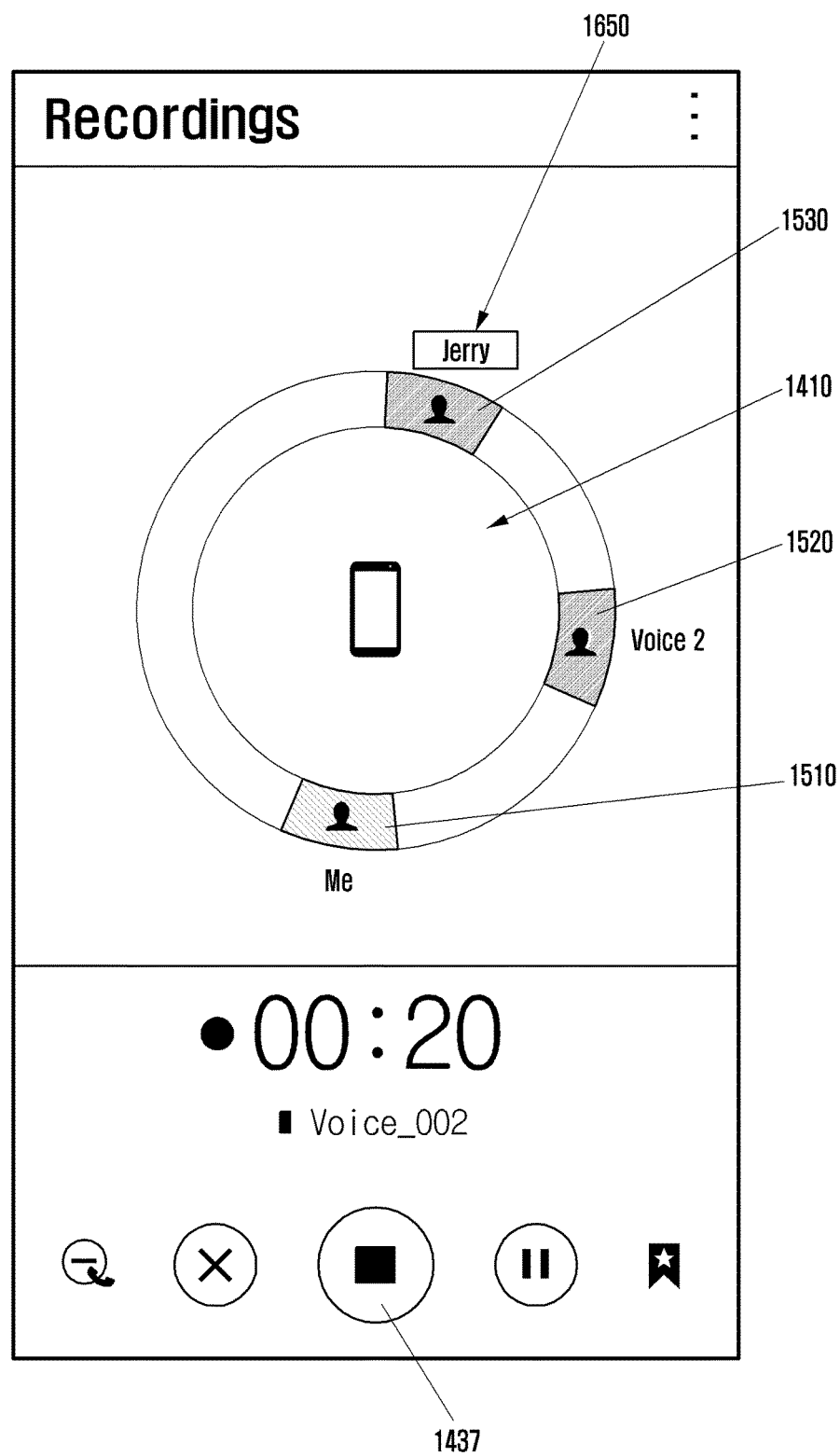

According to various embodiments of the present invention, a user can variously change objects (speaker information) indicating each speaker through the speaker information area 1410 as shown in FIG. 17. For example, referring to FIG. 18, in the state of displaying objects 1510, 1520, and 1530 (for example, information of text and/or item such as Voice 1, Voice 2, Voice 3, and each graphic item) of users (for example, user A, user B, user C) participating in the sound recording through the speaker information area 1410, a user can select a specific object. In various embodiments of the present invention, the selection of a specific object can be performed based on a user input according to a predetermined touch type and a user input according to a physical button. For example, the user input can be performed variously according to a predetermined touch type such as a long press, short press, or double press of object, or by a physical button (for example, direction/movement button and selection button).

An example of changing the speaker information according to object displayed in the speaker information area 1410 is described with reference to FIGS. 17 and 18.

According to various embodiments of the present invention, as shown in FIG. 17, a user can select the object 1530 corresponding to user C based on a predetermined user input (for example, long press). If a user input is detected through the object 1530 while performing sound recording, the electronic device 400 can identify execution of editing mode. The electronic device 400 can switch to a screen interface for the object editing responding to a user input. For example, a text window 1650 including Voice 3 can be displayed so that the text of selected object 1530 (for example, Voice 3) can be edited, and additionally or alternatively a popup window for changing a user item can be displayed. The user can change the speaker information of the object 1530 in the state of displaying the text window 1650. According to an embodiment of the present invention, as shown in FIG. 17, the user can change "Voice 3" to "Jerry". If the change of speaker information is finished according to such an operation, Voice 3 can be replaced with Jerry in the screen interface. Similarly, the user item also can be changed to various graphic images according to a user selection.

According to various embodiments of the present invention, the change of speaker information can be performed by synchronizing with a phonebook. For example, the electronic device 400 can display a phonebook list responding to a user input, and the user can select an item of corresponding speaker (for example, speaker of object 1530) from the phonebook list. The electronic device 400 can extract contact information (for example, name/nickname, telephone number, and image) responding to the selection of item, and automatically change the corresponding item according to a predetermined priority of the contact information (for example, name nickname>image>telephone number). An example of screen interface configured like this is shown in FIG. 18.

Figure 18:
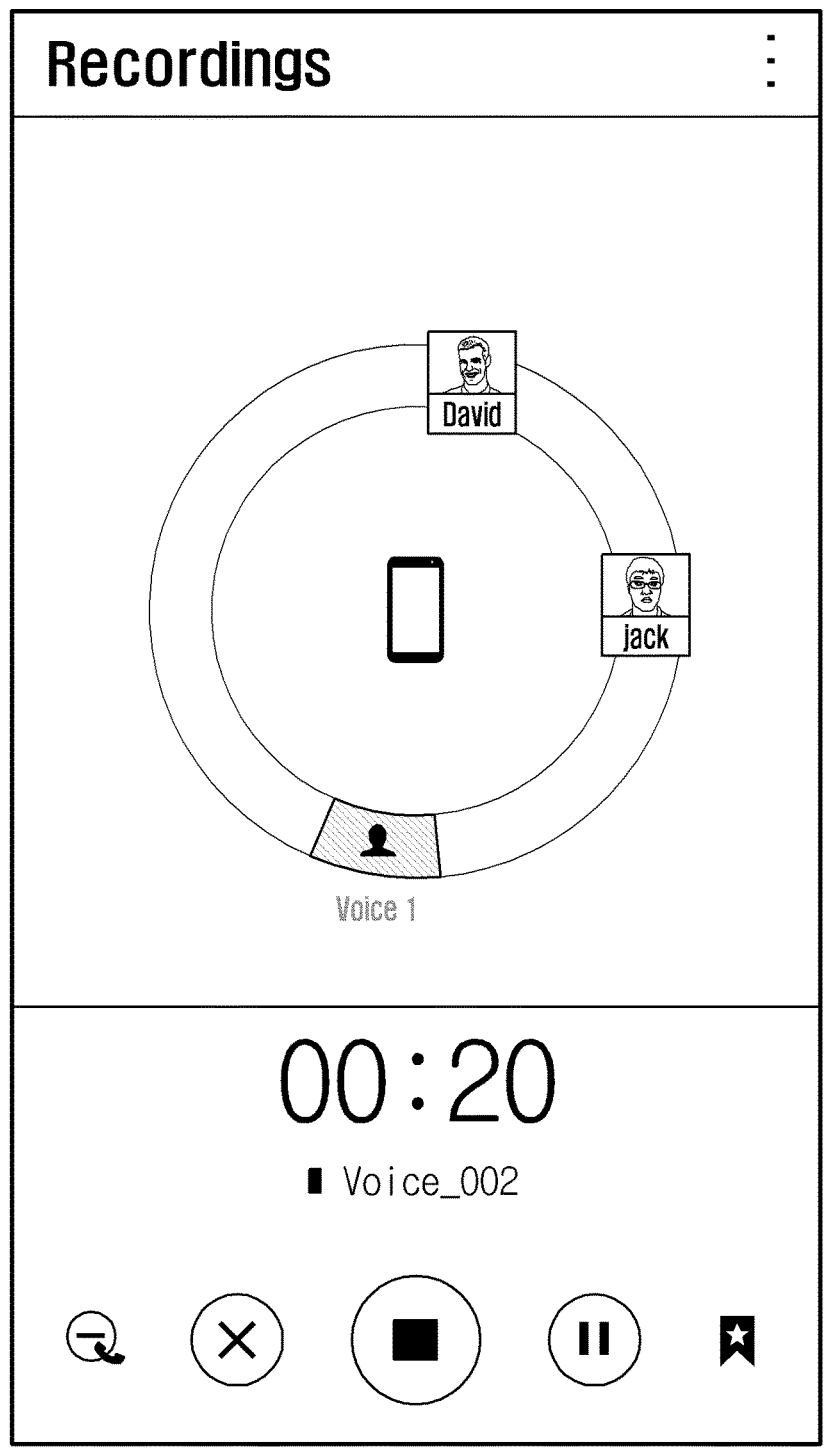

As shown in FIG. 18, according to various embodiments of the present invention, the objects 1520 and 1530 of FIG. 16 can be changed to names (for example, Jack and David) of the corresponding speakers (for example, user B, user C).

According to various embodiments of the present invention, the electronic device 400 can extract Rich Communication Suite (RCS) information of counterpart speaker (for example, various user information obtained through various communication services such as an image, name/nickname, message, video, or social information) based on the speaker's voice identified in the sound recording and RSC information applied to the phonebook of the electronic device 400, and automatically change an object of the corresponding speaker according to the extracted RCS information.

Figure 19:
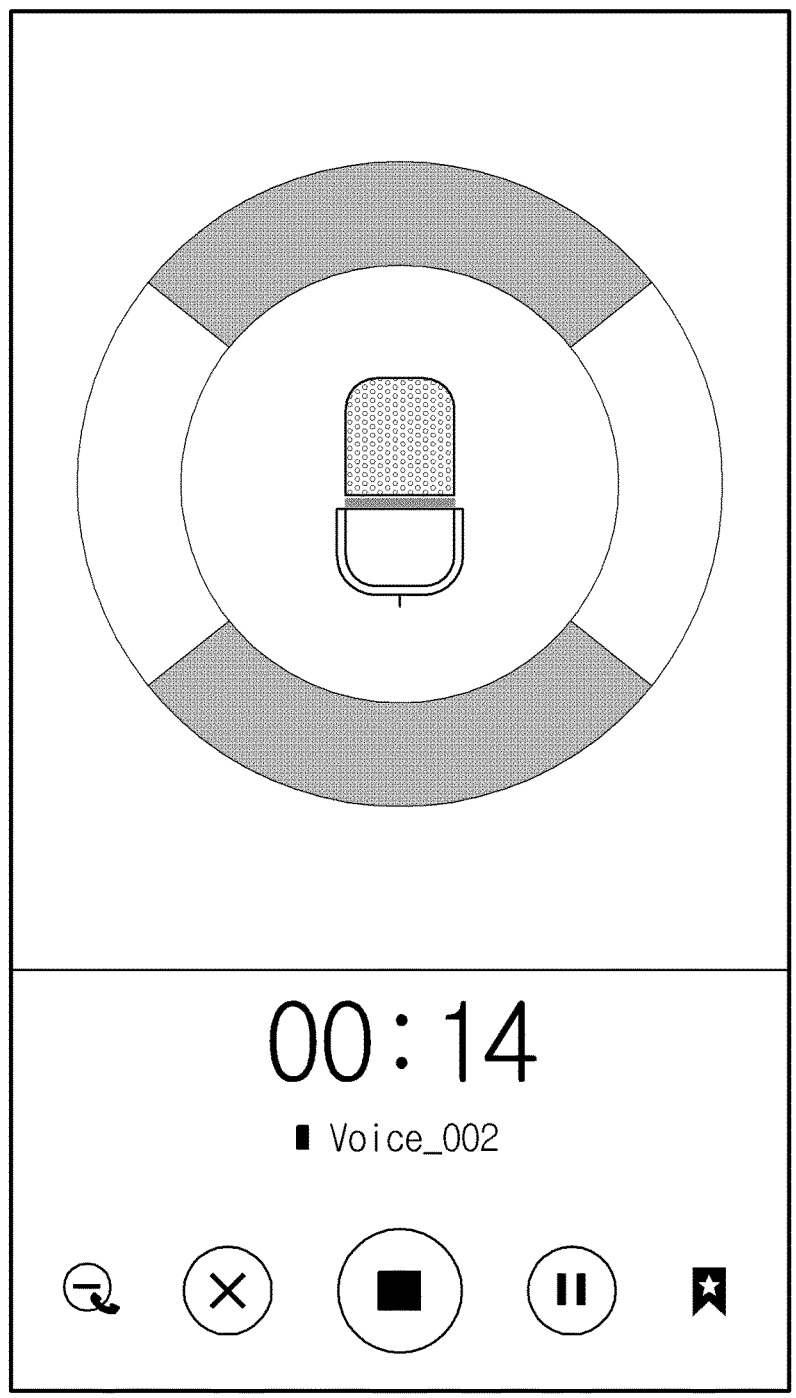
FIG. 19 is a diagram illustrating displaying of a sound recording function in an electronic device, according to an embodiment of the present invention.

FIG. 19 is a diagram illustrating displaying a sound recording function in an electronic device, according to another embodiment of the present invention.

FIG. 19 illustrates an example of screen interface provided according to execution of sound recording mode (for example, interview mode) in the electronic device 400. In particular, FIG. 19 illustrates a case when the sound recording function is performed based on an interview mode in the electronic device 400, and the sound recording can be performed corresponding to the aforementioned operations of sound recording function in the electronic device 400. According to an embodiment of the present invention, in case of an interview mode capable of distinguishing speakers, the sound recording can be performed with 2 channels (for example, L channel and R channel) by using 2 speaker units installed in the upper surface and lower surface of the electronic device 400, and the sound recording can be performed with a fixed beamforming system by using the 2 speakers installed at the upper and lower side of the electronic device 400. In the interview mode, stereo sound recording can be performed by distinguishing the upper speaker as an L channel and the lower speaker as an R channel.

According to various embodiments of the present invention, various sound recording interfaces can be provided according to various sound recording environments of users. The screen interfaces of FIGS. 15 to 18 indicate examples of interface according to the conference mode (or talk mode), and the screen interface of FIG. 19 indicates an example of interface according to the interview mode (or single direction sound recording mode). Accordingly, the sound recording function corresponding the sound recording environment can be improved and identification of user's mode identification can be easily performed.

According to an embodiment of the present invention, the conference mode sensitively responds to sounds of a plurality of microphones in the multi-direction (for example, 0° to 360°), the electronic device 400 may perform sound recording with the same amount of sound for all the microphones. Further, according to various embodiments of the present invention, the interview mode may be a mode in which the sound recording is performed so that the microphone responds to sounds in one direction according to the characteristics of interview, for example, so that a sound in the front direction of the electronic device 400 is recorded intensively. Further, according to various embodiments of the present invention, the sound recording modes and interfaces can be variously modified.

Figure 20:
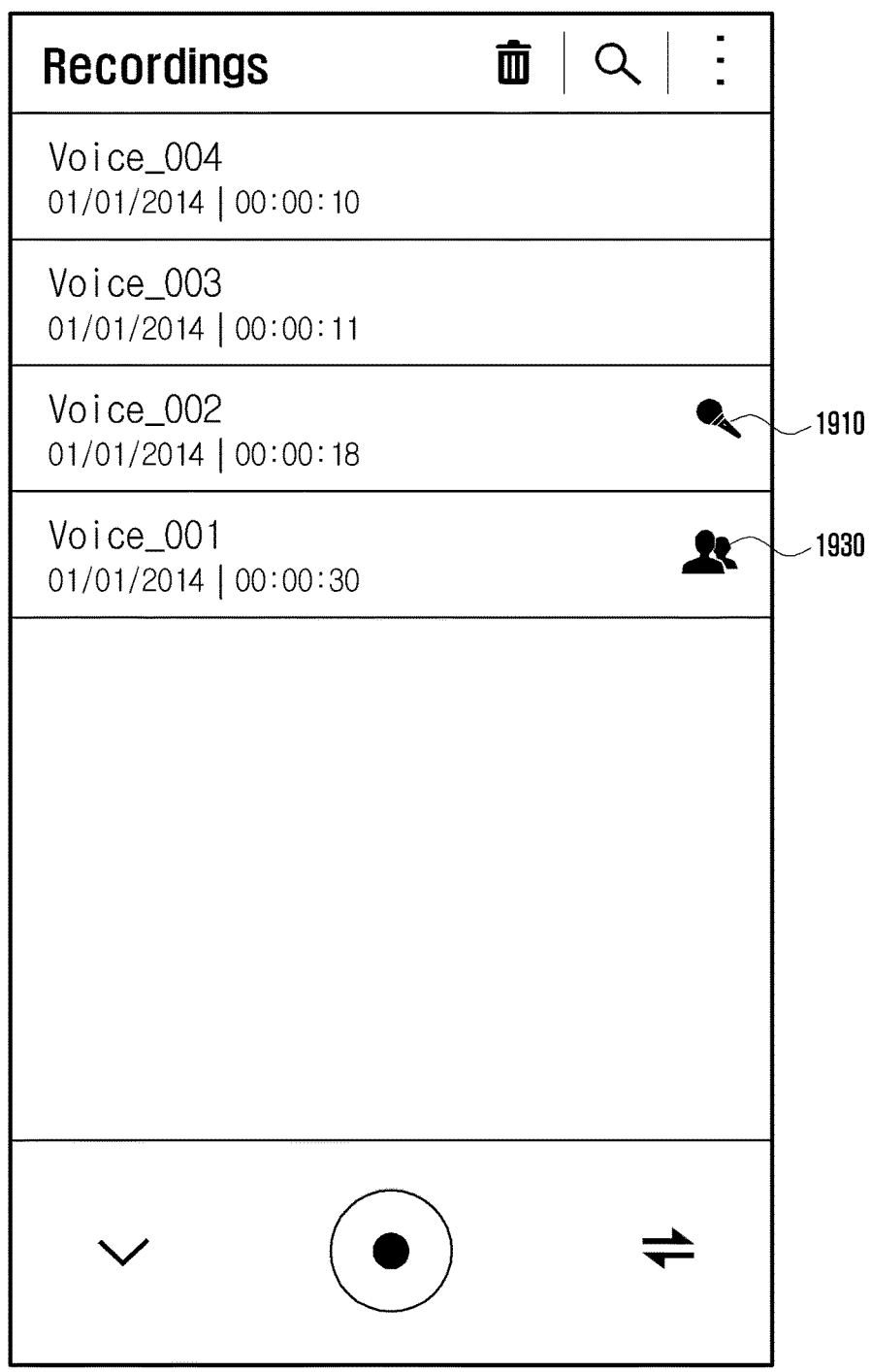
FIG. 20 is a diagram illustrating an interface for displaying a list of sound recording files in an electronic device, according to an embodiment of the present invention.

FIG. 20 is a diagram illustrating an example of interface for displaying a list of sound recording files in an electronic device, according to an embodiment of the present invention.

Referring to FIG. 20, as described above, an example of interface for displaying a list of sound recording files recorded according to the executing sound recording mode (for example, normal mode, conference mode, and interview mode) is illustrated. According to various embodiments of the present invention, the sound recording files can be displayed by distinguishing the sound recording mode.

For example, as shown in FIG. 20, identification icons (fbir example, a microphone icon 1910 and an icon indicating a plurality of users 1930) corresponding to the sound recording mode can be displayed in a specific area of the list. For example, the microphone icon 1910 indicates that the sound recording file is one recorded in the environment of interview mode, and the icon indicating a plurality of users 1930 indicates that the sound recording file is recorded in the environment of conference mode. The user can play a specific sound recording file and listen to the corresponding sound by selecting the sound recording file.

Figure 21:
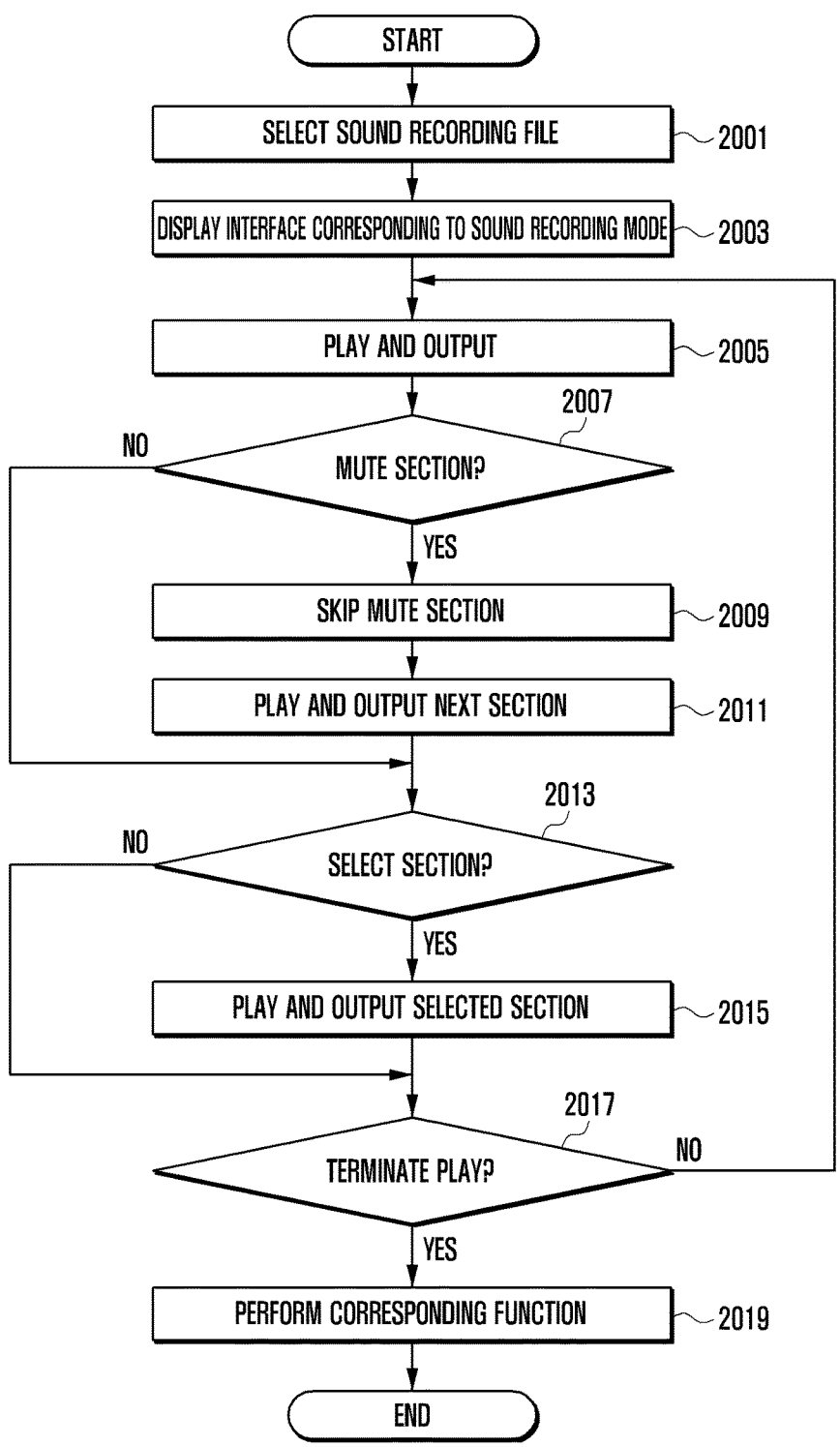
FIG. 21 is a flowchart illustrating a procedure of playing a sound recording file in an electronic device, according to an embodiment of the present invention.

FIG. 21 is a flowchart illustrating a procedure of playing a sound recording file in an electronic device, according to an embodiment of the present invention.

Referring to FIG. 21, the AP 210 detects a selection of a specific sound recording file from a sound recording file list, in step 2001. For example, a user can select a specific sound recording file to be played from the sound recording file list as illustrated by the example of FIG. 20, and the electronic device 400 can identify playback of a sound recording file responding to the selection of sound recording file.

According to various embodiments of the present invention, the AP 210 displays an interface corresponding to a sound recording mode of the selected sound recording file, in step 2003. For example, AP 210 can analyze the sound recording file if the sound recording file is selected, distinguish a sound recording mode (for example, interview mode and conference mode) from the analysis result of sound recording file, and distinguish speakers participating in the sound recording of corresponding sound recording mode. According to an embodiment of the present invention, the sound recording file can be generated with information (for example, mode information in a file header) indicating characteristics of sound recording environment (for example, conference mode or interview mode). The AP 210 can display a playback interface corresponding to a sound recording interface (for example, interface used for a sound recording environment (conference mode or interview mode)) by analyzing the information of sound recording file. Here, the playback interface may be displayed by including all the speaker information distinguished in the sound recording file. In the embodiment of the present invention, the control unit 480 can display by identifying directivities of each speaker (for example, by identifying a speaker area) based on the location information of speaker stored in the sound recording file while playing the sound recording file.

According to various embodiments of the present invention, the AP 210 outputs the selected sound recording file through playback, in step 2005, For example, the AP 210 can play the sound recording file back according to a progress time, output visual information through the interface corresponding to the playback, and output acoustic information through a speaker unit. According to an embodiment of the present invention, the AP 210 can display a speaker area of currently playing section in the interface by distinguishing speakers through a visual reversing, and output a corresponding sound (voice) of speaker through the speaker unit. Although not shown in the drawings, according to various embodiments of the present invention, a user input for a selective playback by individual speakers in a speaker area of the interface can be received while selecting the sound recording file, and a playback section of the selected speaker area can be processed corresponding to the user input.

According to various embodiments of the present invention, the AP 210 determines whether a mute section is detected while playing the sound recording file back, in step 2007. In various embodiments of the present invention, the mute section can be processed according to a user setting, setting of the electronic device 400, or optional setting of skipping the mute section.

According to various embodiments of the present invention, if a mute section is not detected, the AP 210 proceeds to step 2013.

According to various embodiments of the present invention, if a mute section is detected, the AP 210 can skip the mute section, in step 2009, and control the playback and output of the next section (for example, speech section and simultaneous speech section), in step 2011. For example, if a mute section is detected while playing the sound recording file back, the AP 210 can check the end point of the detected mute section, skip the mute section by jumping to the end point of the detected mute section, and play and output a section following the mute section. Although not shown in the drawings, according to various embodiments of the present invention, the skip of mute section can be determined according to a user setting (selection). According to an embodiment of the present invention, if the mute section is detected, the AP 210 can identify a setting state of the skip option, and skip the mute section if the skip option is activated. Alternatively, according to various embodiments of the present invention, if a mute section is detected, the AP 210 can request for a user selection corresponding to the skip of mute section through a predetermined popup window, and determine the skip of mute section according to the result.

According to various embodiments of the present invention, the AP 210 determines whether a section is selected by a user while playing the sound recording file back, in step 2013. In various embodiments of the present invention, the user can select a playback section of specific speaker in the playback of sound recording file, and the electronic device 400 can process a selective playback by individual speakers responding to the user's selection.

According to various embodiments of the present invention, if a selection of section is not detected, the AP 210 proceeds to step 2017.

According to various embodiments of the present invention, if a selection of section is detected, the AP 210 controls the playback and output of selected section, in step 2015. For example, the AP 210 can control visual and acoustic outputs corresponding to the speaker of selected section.

According to various embodiments of the present invention, the AP 210 determines whether the playback of sound recording file is completed, in step 2017. In an embodiment of the present invention, the completion of playback may include a forced termination by a user and an automatic termination due to reaching the end of sound recording file.

According to various embodiments of the present invention, if the playback of sound recording file is not completed, the AP 210 returns to step 2005.

According to various embodiments of the present invention, if the playback of sound recording file is completed, the AP 210 performs a corresponding function, in step 2019. For example, the AP 210 can display a sound recording file list described before or stop the playback operation while maintaining a screen display of the playback mode responding to the completion of playback.

According to various embodiments of the present invention, responding to the playback of sound recording file, the AP 210 can provide a user interface including a speaker area for a plurality of speakers corresponding to the playback. According to various embodiments of the present invention, the AP 210 can perform an operation of outputting at least one speaker's voice according to a playback section of individual speakers while proceeding the playback, and provide an updated speaker area corresponding to at least one speaker in the user interface together with the output of voice. According to various embodiments of the present invention, the operation of updating may include an operation of identifying a speaker area corresponding to the output voice, and an operation of outputting the speaker area identified in the user interface by visually modifying based on the result of identification. According to various embodiments of the present invention, the AP 210 can perform an operation of displaying in the user interface by including at least one of speaker information, direction information of speaker, and distance information of speaker.

Figure 22:
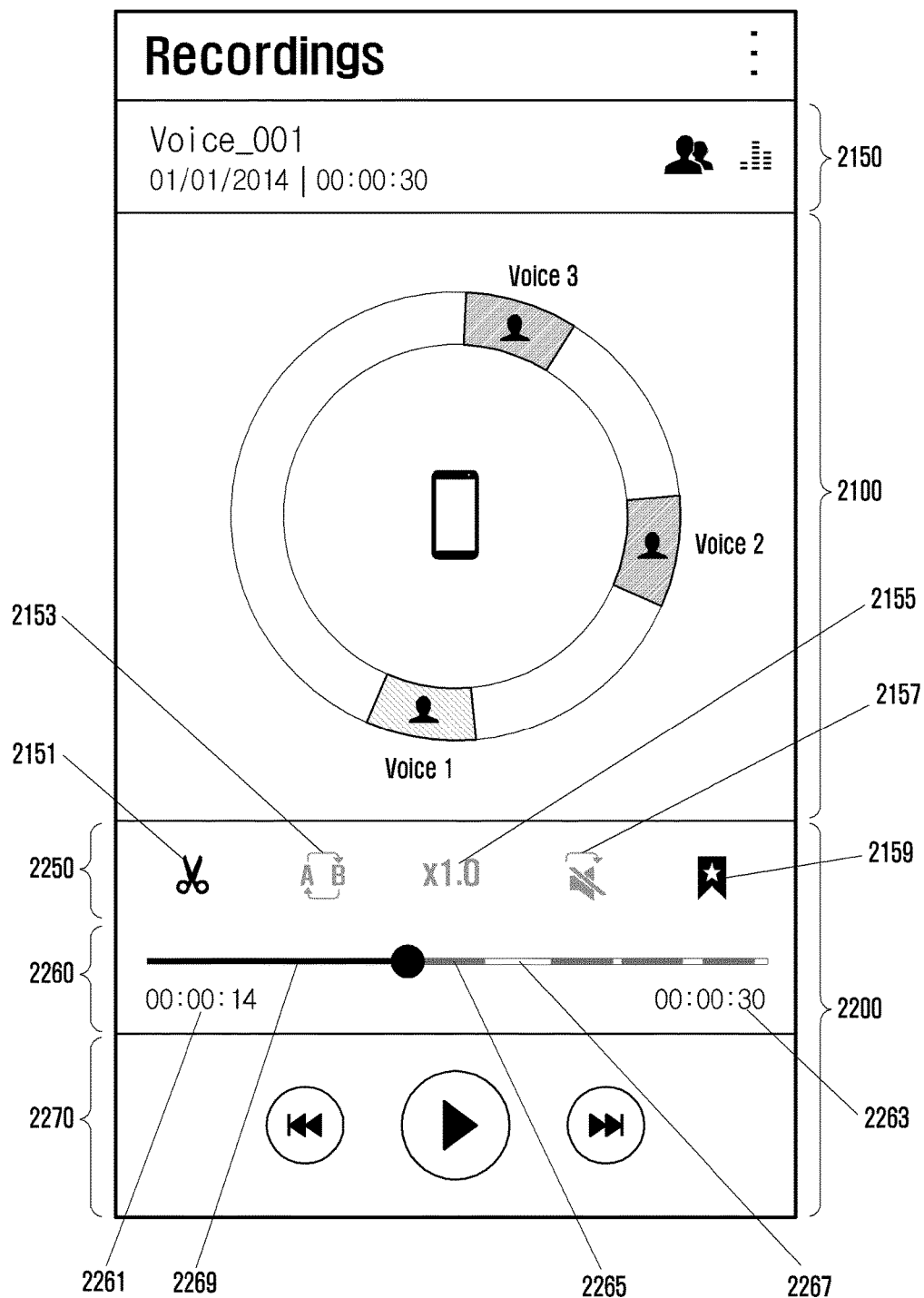
FIGS. 22-24 are diagrams illustrating a playback interface for a sound recording file in an electronic device, according to an embodiment of the present invention.
Figure 23:
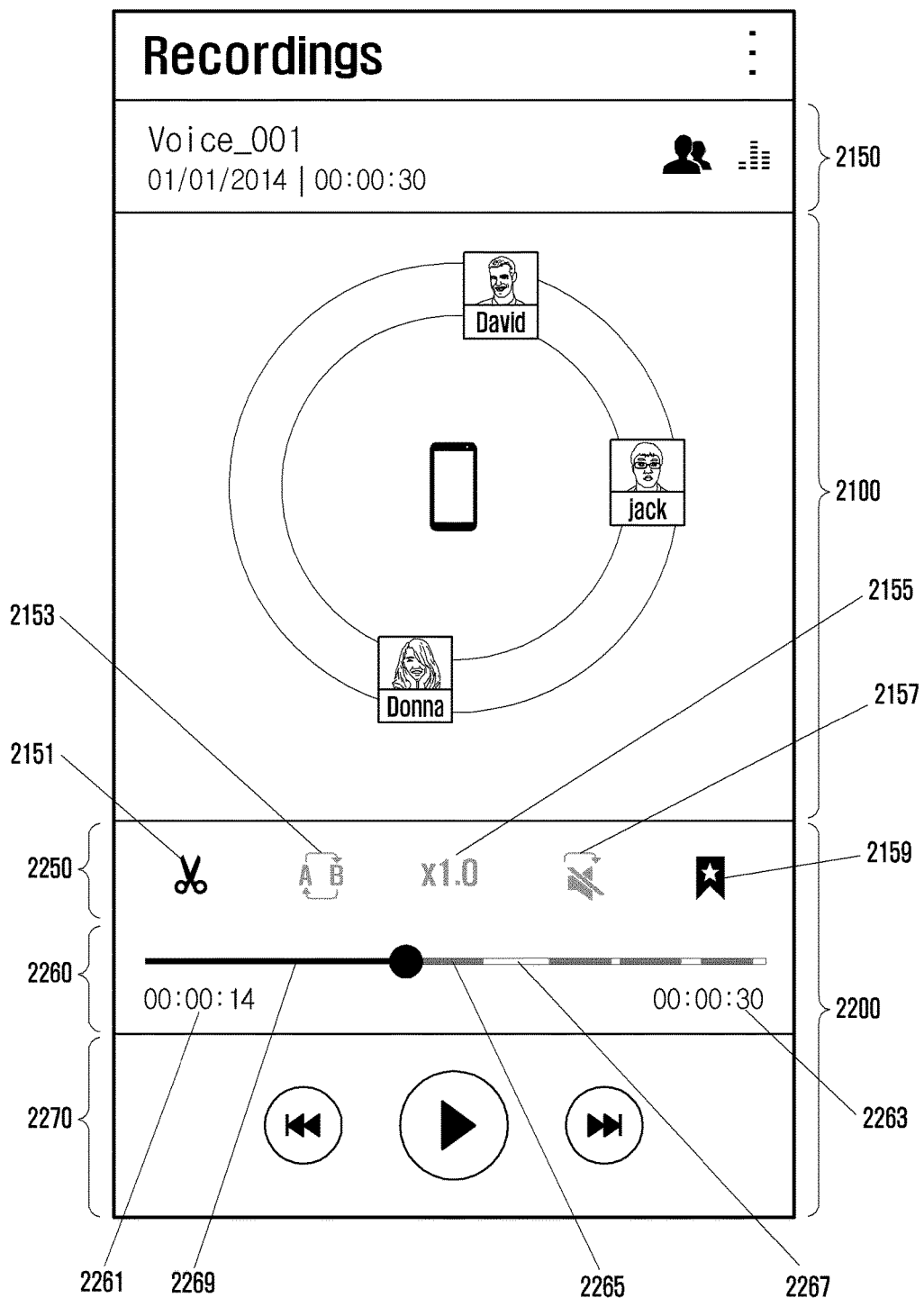

FIGS. 22 and 23 are diagrams illustrating a playback interface for a sound recording file in an electronic device, according to an embodiment of the present invention.

FIGS. 22 and 23 illustrate an example of playing a sound recording file recorded based on 3 speakers in a sound recording mode (for example, conference mode) of the electronic device 400, as shown in FIGS. 15 to 18). In various embodiment of the present invention, the playback interface for playing a sound recording file is divided into a speaker information area 2100 and a control area 2200. According to various embodiments of the present invention, the playback interface may further include a list area 2150.

According to various embodiments of the present invention, the speaker information area 2100 may include information of speakers participating in the sound recording, and can display by distinguishing a speaker making a speech at the current playback time. In various embodiments of the present invention, the speaker information may be displayed with visual object such as a text, graphics (icon, photo, and image), video, or their combinations. According to an embodiment of the present invention, the AP 210 can display a speaker area corresponding to a section currently being played through the speaker information area 2100 by distinguishing the speaker through a visual reversing. According to various embodiments of the present invention, objects in the speaker area corresponding to the playback section can be differently displayed by at least one of color visualization, brightness visualization, visualization in intaglio or relief, shape visualization, highlight visualization, or addition of items (for example, speech state icon).

According to an embodiment of the present invention, the AP 210 can display a speaker area corresponding to a section currently being played in the interface by distinguishing through a visual reversing, and output a recorded sound (voice) of the corresponding speaker through a speaker unit.

According to various embodiments of the present invention, the control area 2200 can provide various information related to the playback. According to an embodiment of the present invention, the control area 2200 includes a function item 2250 for setting various functions of cutting 2151, repeating 2153, playback speed 2155, mute section skip 2157, and bookmarking 2159, a progress bar 2260 indicating a progress state of playback, and a control item 2270 for selecting a sound recording file (for example, previous file or following file) and selecting one from playback, temporary stop, and stop. According to various embodiments of the present invention, the progress bar 2260 can be displayed by distinguishing a speech section 2265 of each speaker and a mite section 2267, and a simultaneous speech section can be further included. According to an embodiment of the present invention, time information of a section currently being played, playback information of a total playback section 2263, and a status bar 2269 indicating a playback progress state can be visually provided through the progress bar 2260.

According to various embodiments of the present invention, the list area 2150 can display information on sound recording files (for example, a previous or subsequent sound recording file) located adjacent to the sound recording file selected from the list for playback. According to an embodiment of the present invention, when performing playback according to the selection of a sound recording file (for example, Voice 2) as shown in FIG. 20, a playback interface can be displayed in an extended list view for the selected sound recording file, and a part of the list can be displayed adjacent to the extended list view. The list area 2150 can be selectively displayed according to a provision form of playback interface, user setting, or setting of the electronic device 400.

According to various embodiments of the present invention, FIG. 22 illustrates an example of a playback interface of which a sound recording file, which is stored without editing (modifying) speaker information, is being played in a manner similar to that shown in FIG. 16. For example, objects configured with visual information automatically assigned to speakers identified in the electronic device 400 (for example, text automatically assigned according to the order of identification, such as Voice 1, Voice 2, and Voice 3, and consistent user item) can be displayed in relation to their respective directions.

According to various embodiments of the present invention, FIG. 23 illustrates an example of a playback interface in which a sound recording file, which is stored with edited (modified) of speaker information by synchronizing with a user or phonebook, is played in a manner similar to that shown in FIGS. 17 and 18. For example, referring to FIG. 23, the objects configured with visual information modified by a user setting or phonebook synchronization (for example, edited text indicating a speaker name, such as David, Jack, and Donna), and an edited user item (image by individual speakers)) can be displayed in relation to their respective directions.

According to various embodiments of the present invention, the electronic device 400 can edit the speaker information while playing the sound recording file. Operations for editing the speaker information (object) while playing the sound recording file may correspond to the descriptions in FIGS. 17 and 18. For example, a user can select an object of speaker information to be edited, and modify a text and/or user item of the selected object based on a popup window or phonebook list provided according to the user selection.

Figure 24:
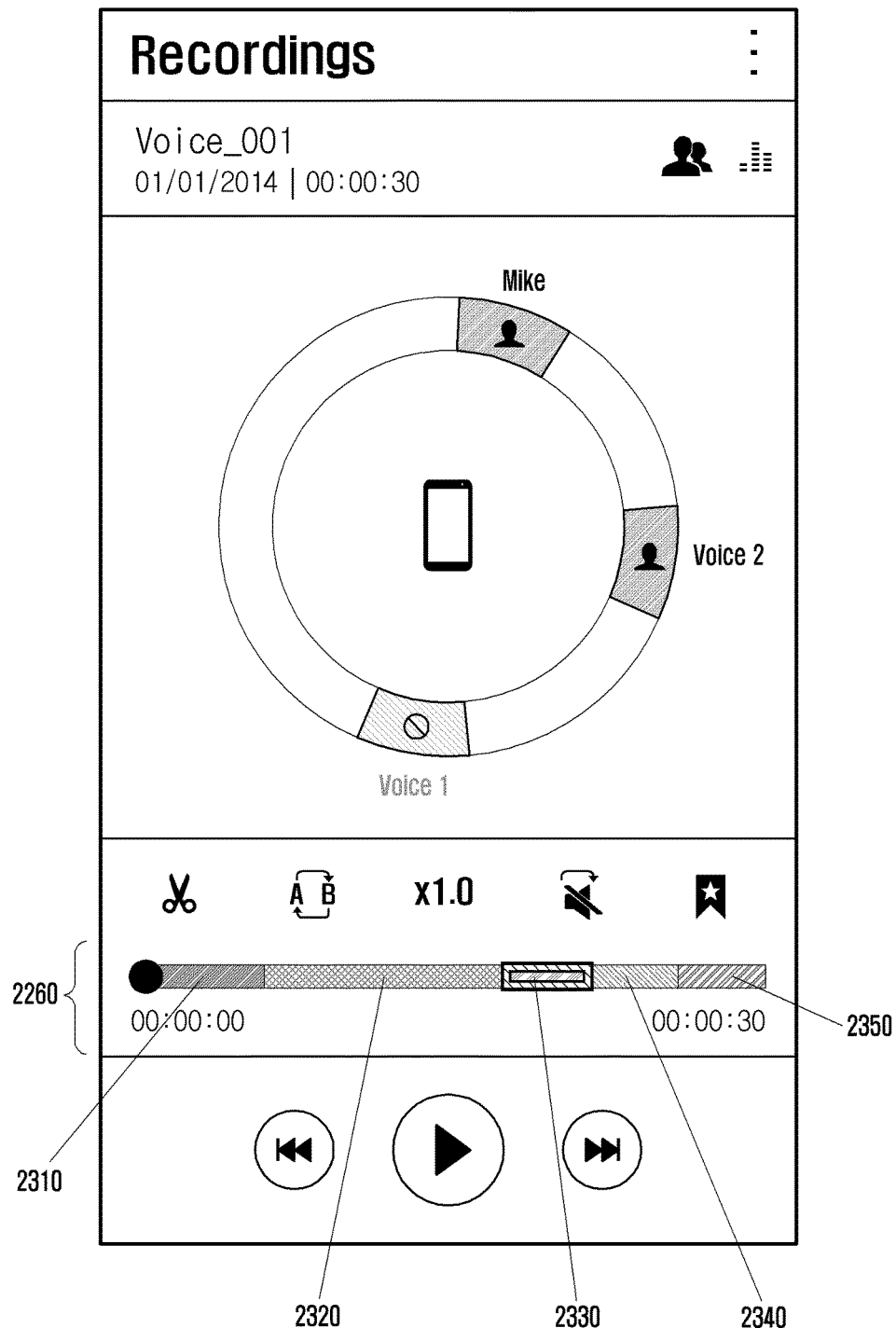

FIG. 24 is a diagram illustrating a playback interface for a sound recording file in an electronic device, according to an embodiment of the present invention.

Referring to FIG. 24, visual information distinguished by individual speakers can be displayed through a progress bar 2260 while playing back a sound recording file. According to an embodiment of the present invention, as shown in FIG. 24, playback sections 2310, 2320, 2330, 2340, and 2350 corresponding to each speaker can be displayed in different colors. Further, according to various embodiments of the present invention, a simultaneous speech section 2330 in which a plurality of speakers simultaneously make a speech can be displayed by overlaying at least two kinds of information corresponding to each playback section of speakers.

Figure 25:
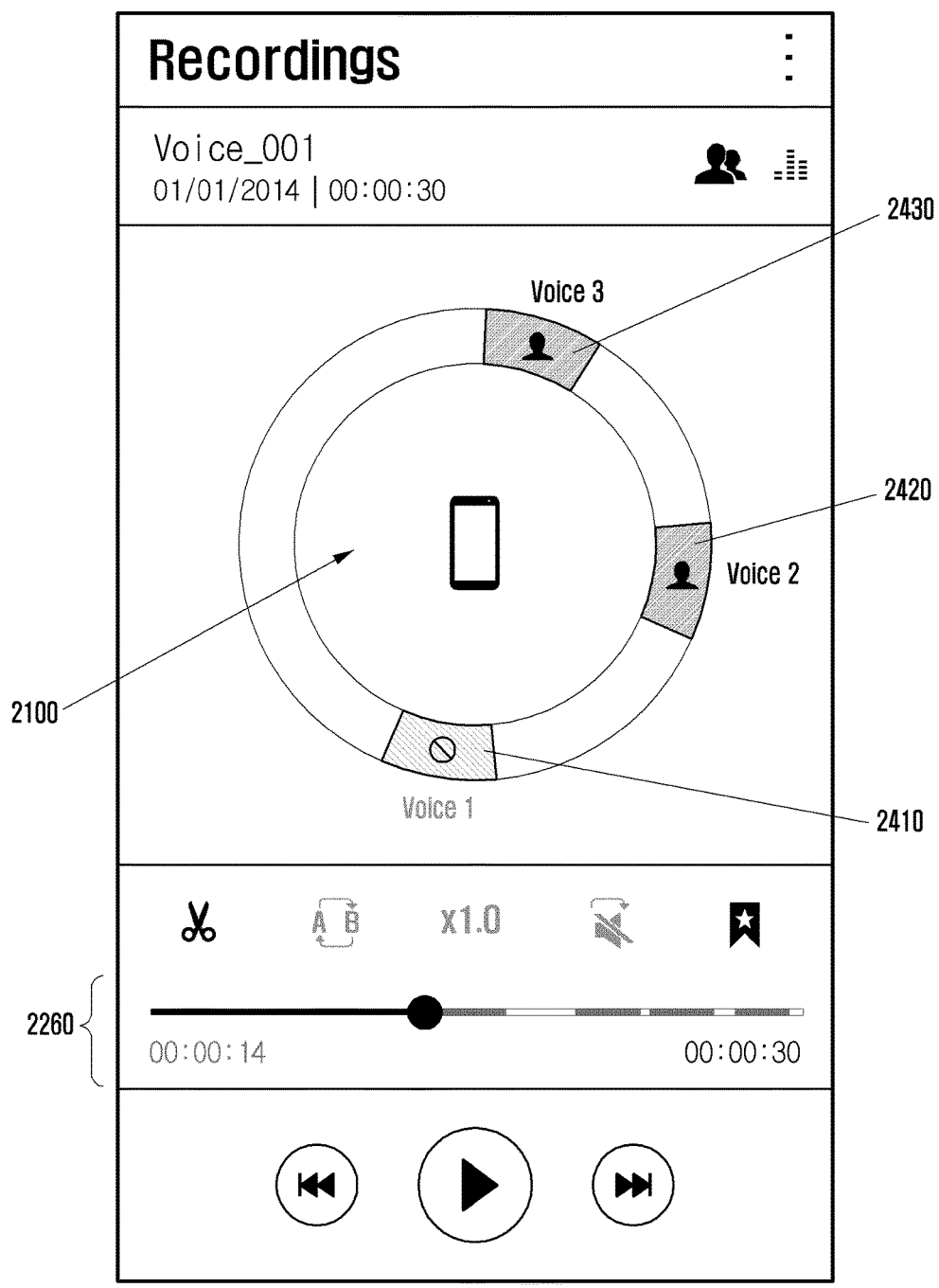

FIG. 25 is a diagram illustrating operations for controlling playback of sound recording file in an electronic device, according to an embodiment of the present invention.

Referring to FIG. 25, while playing a sound recording file, a user can control the playback of the sound recording file through a selection of an object or progress bar in various methods, such as, for example, a selective playback by individual speakers, simultaneous playback, or speaker skip playback. Namely the user can perform playback of a sound recording file by distinguishing each speaker.

For example, the user can select at least one object from objects 2410, 2420, and 2430 in the speaker information area 2100, and the electronic device 400 can control visual and acoustic outputs corresponding to at least one object selected by the user. According to an embodiment of the present invention, if the user selects the objects 2420 and 2430, the electronic device 400 can extract speaker information corresponding to the selected objects 2420 and 2430 from the sound recording file, display the selected objects 2420 and 2430 differently from the object 2410 according to visual information set for playback sections corresponding to the objects 2420 and 2430 in the speaker information area 2100, and output sounds (voices) set to the playback sections corresponding to the objects 2420 and 2430. Further, the electronic device 400 can control so that only the playback sections of the selected objects 2420 and 2430 are displayed in the progress bar 2260.

According to various embodiment of the present invention, the user can select a specific playback section from playback sections by individual speakers in the progress bar 2260, and the electronic device 400 can control a visual output for an object of a speaker corresponding to a playback section selected from the objects 2410, 2420, and 2430 in the speaker information area 2100 responding to the user selection, and control the output of recorded sound (voice).

Further, according to various embodiments of the present invention, the user can decide to skip playback by selecting at least one object from the objects 2410, 2420, and 2430 in the speaker information area 2100. The electronic device 100 can skip the playback of the object selected from the whole playback section of the sound recording file responding to the user's selection. For example, if a playback section of object set to skip is detected while playing a sound recording file, the corresponding playback section is skipped and the next playback section is played.

In an embodiment of the present invention, an object set to skip by a user can be displayed with predetermined visual information. According to the embodiment of the present invention, as shown in FIG. 25, the display of object 2410 can be changed according to identification information for setting a skip of the object.

According to various embodiments of the present invention, as shown in FIG. 25, a voice playback of a corresponding object can be switched on or off through selection of the object from the speaker information area 2100 or selection of a playback section from the progress bar 2260. Namely, in the embodiments of the present invention, a selective playback by individual speakers (or tracks) is possible and a selected speaker area can be visually displayed. Although not shown in the drawings, according to various embodiments of the present invention, locations of objects can be changed by controlling selection and movement (for example, drag & drop) of an object having a directional component in the speaker information area 2100, and the direction of changed location can be saved in the sound recording file. Further, according to various embodiments of the present invention, a plurality of objects can be combined, and 3-dimensional sound playback can be supported because each object has directional information (location information).

Further, according to various embodiments of the present invention, the user can control volumes of each speaker while playing a sound recording file in the state of displaying a playback interface, as shown in FIG. 25. For example, when selecting the object 2420, the user can increase or decrease the volume of the selected object 2420 though a predetermined user input (for example, touch-based gesture or function button for volume control). If the volume of the specific object is changed by the user, the electronic device 400 can output sound with the changed volume in the playback section of corresponding object.

Figure 26:
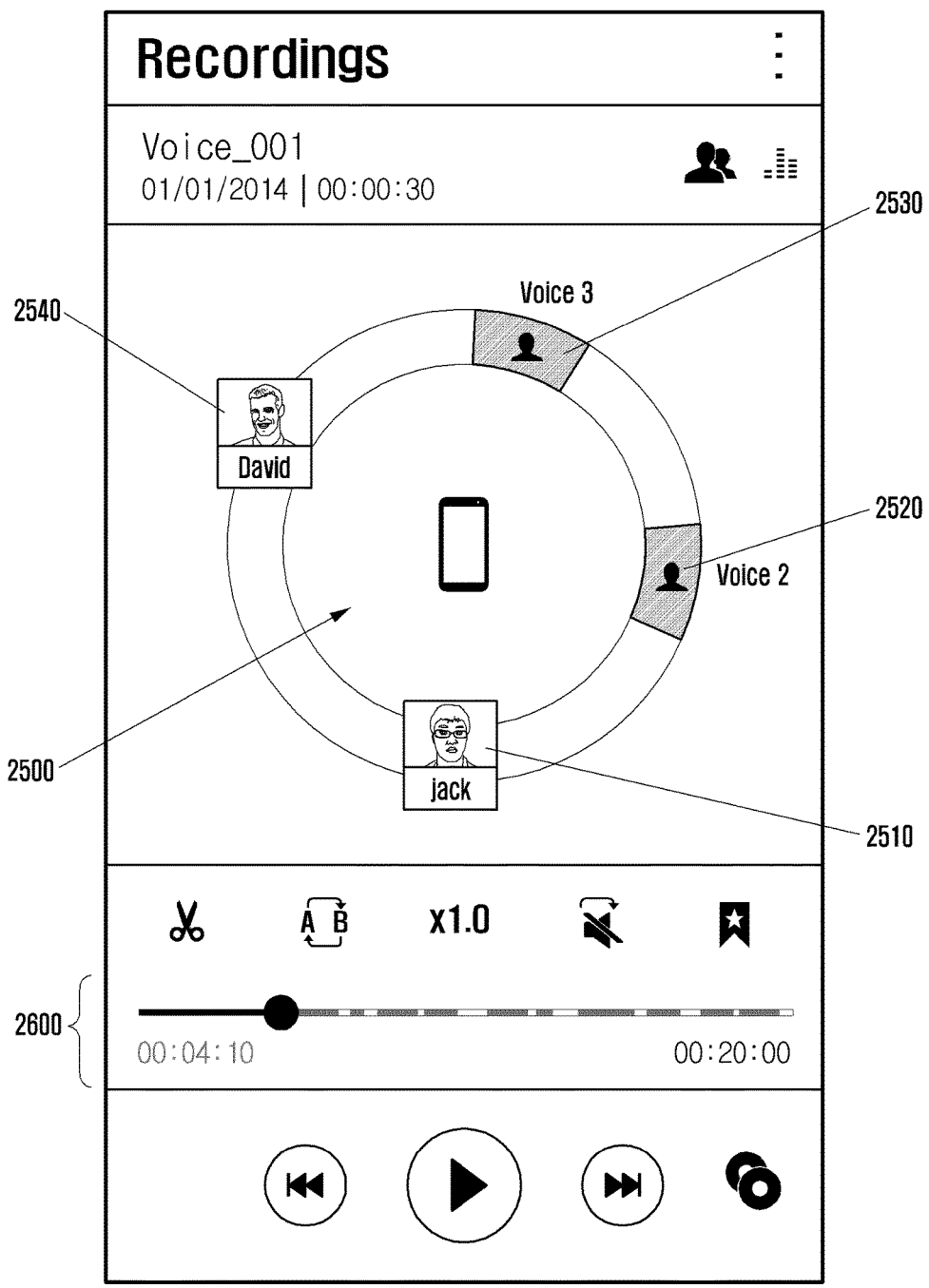
Figure 27:
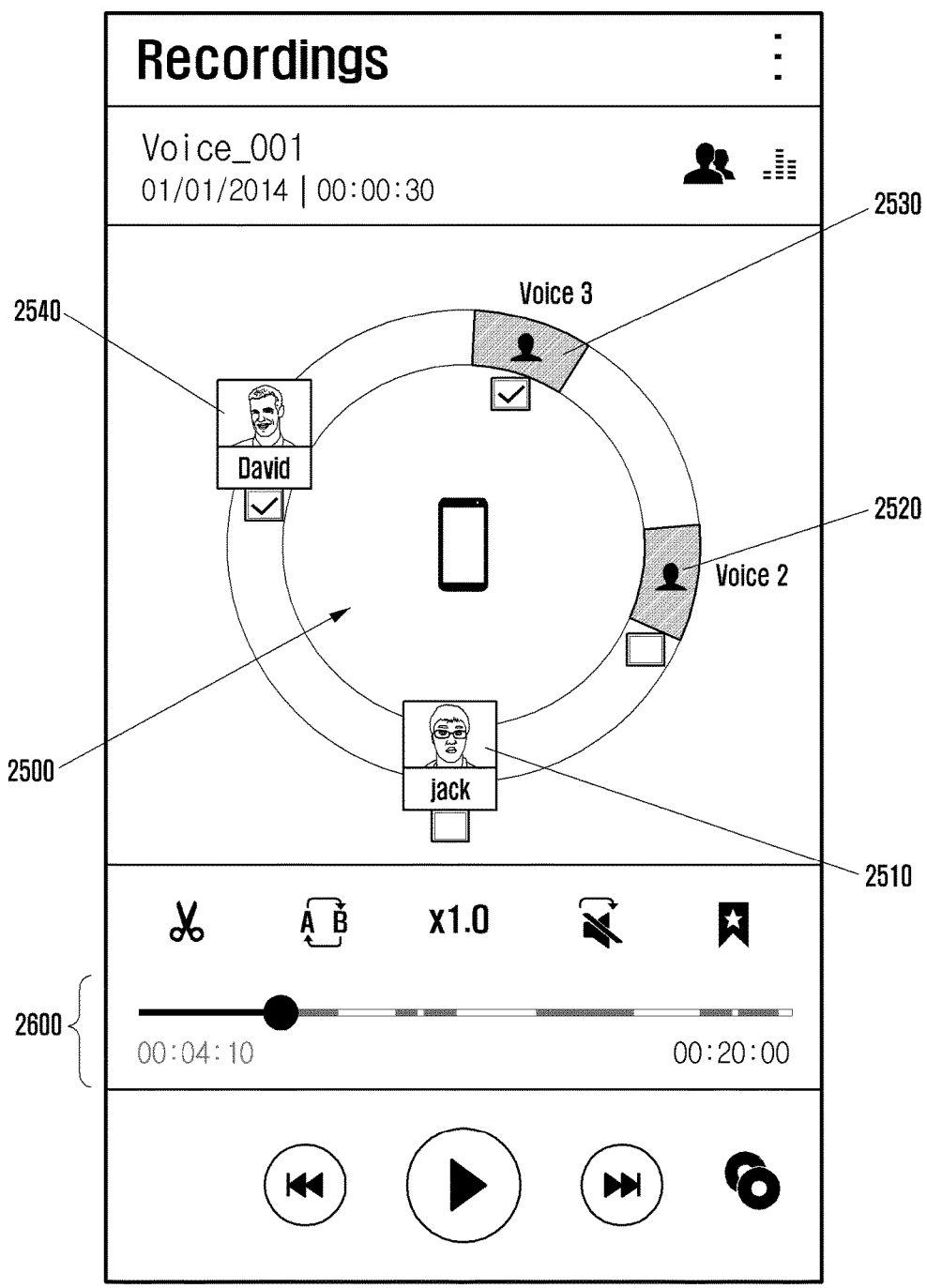

FIGS. 26 and 27 are diagrams illustrating operations for controlling playback of a sound recording file in an electronic device, according to an embodiment of the present invention.

Referring to FIGS. 26 and 27, while playing a sound recording file, directions of individual speakers can be displayed by using speaker location information stored in the corresponding sound recording file. The displaying of directions of each speaker can be performed by visualizing based on the objects set in the speaker information area 2500 as described in detail above. Further, according to an embodiment of the present invention, a user can perform selective playback by individual speakers, change of an object's location, editing of speaker information by selecting at least one object from the speaker information area 2500.

According to various embodiments of the present invention, the objects 2520 and 2530 of FIGS. 26 and 27 are speaker information according to a basic setting, and the objects 2510 and 2540 indicate an editing state of speaker information (for example, name and image) by a user.

FIG. 26 shows a state of performing playback by selecting all of the objects 2510, 2520, 2530, and 2540 from the speaker information area 2500. In this case, all of the playback sections corresponding to all of the objects 2510, 2520, 2530, and 2540 can be visually displayed in the progress bar 2600.

FIG. 27 illustrates a state of performing playback by selecting specific objects 2530 and 2540 from the speaker information area 2500 for selective playback of individual speakers. In this case, playback sections corresponding to the selected objects 2530 and 2540 can be visually displayed in the progress bar 2600, and the display of playback sections for unselected objects 2510 and 2520 can be omitted.

Similarly, according to various embodiments of the present invention, playback sections in the progress bar 2600 can be displayed by dynamically changing according to the selection of objects from the speaker information area 2500. Accordingly to various embodiments of the present invention, objects corresponding to playback sections selected from the speaker information area 2600 can be displayed by visually reversing corresponding to the selection of the playback section from the progress bar 2600. Namely, according to various embodiments of the present invention, a selective playback of each speaker can be supported by using the speaker information area 2500 or the progress bar 2600, and intuitively displayed through synchronization of the speaker information area 2500 and the progress bar 2600.

Figure 28:
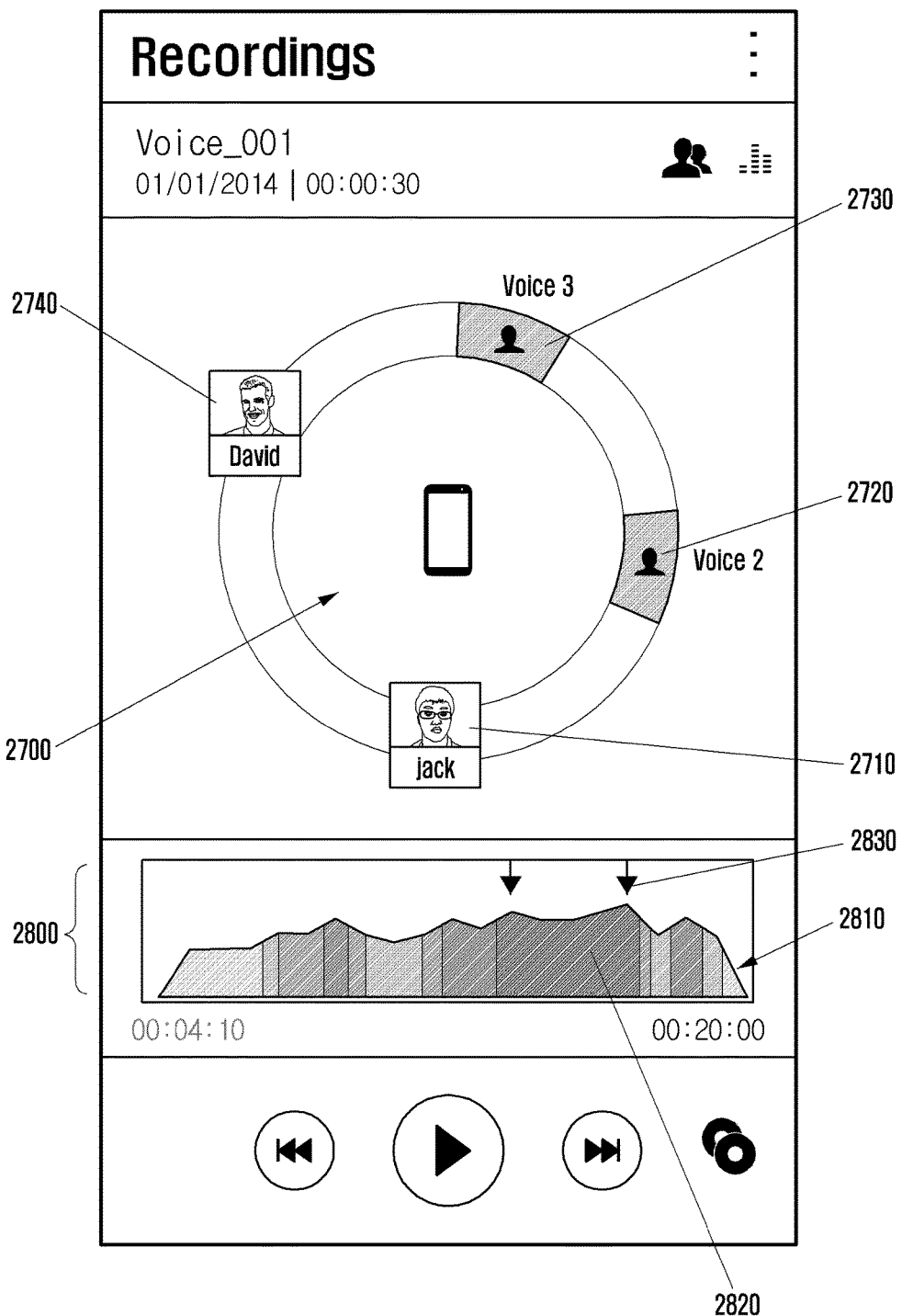
Figure 29:
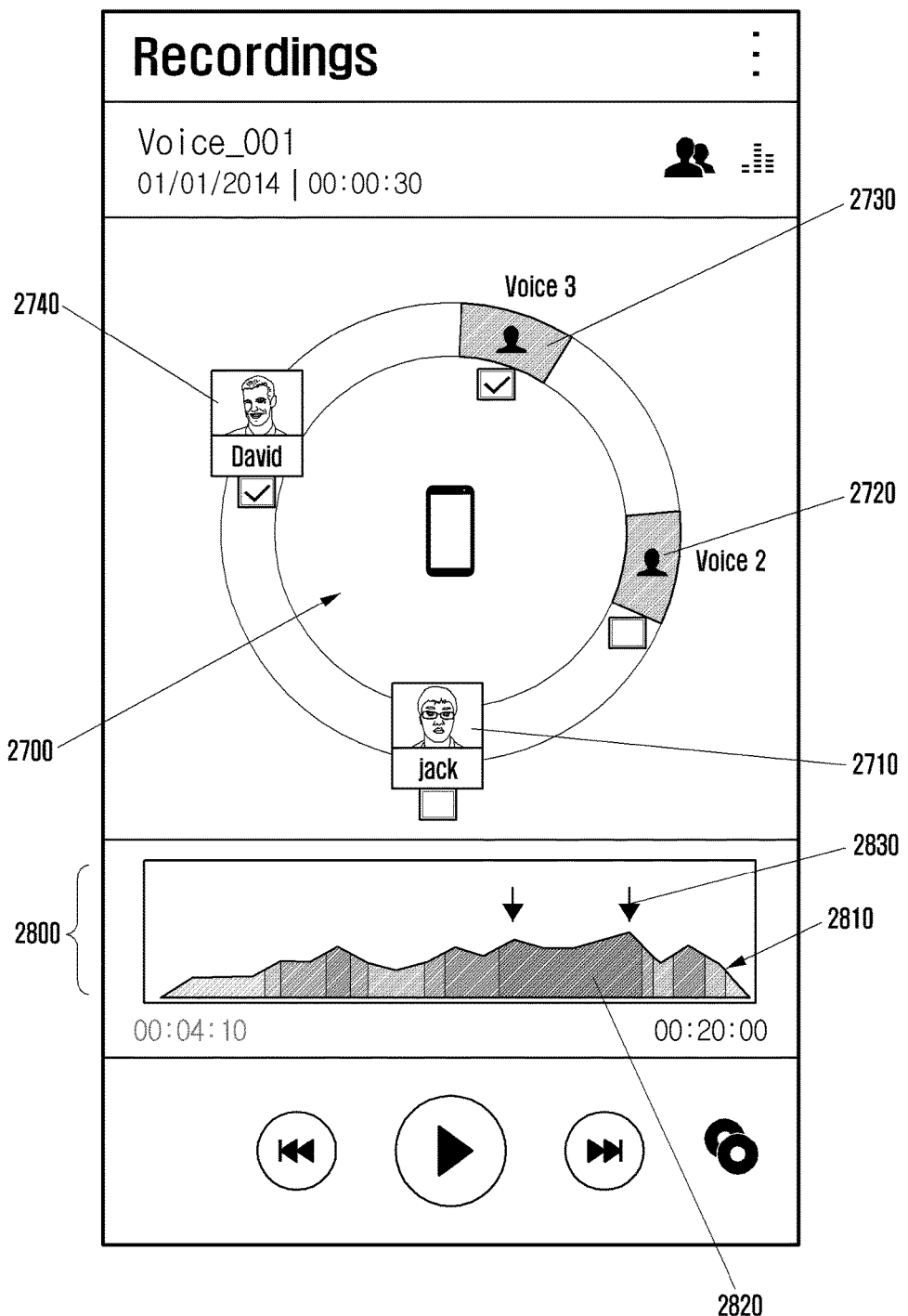

FIGS. 28 and 29 are diagrams illustrating operations for controlling playback of a sound recording file in an electronic device, according to an embodiment of the present invention.

Referring to FIGS. 28 and 29, while playing a sound recording file, the progress bar 2800 can be visually displayed with various information based on various graphs (for example, a bar graph, a graphic graph, a belt graph, a pie graph, or a graph of a broken line), colors, and icons.

For example, as shown in FIGS. 28 and 29, frequent switching between speakers or intensity of volume in the sound recording section can be measured, and a section in which an argument is generated can be visually displayed based on the measurement result by using a graph 2810, a color 2820, and an icon 2830. According to an embodiment of the present invention, a section of the progress bar 2800 in which the icon 2830 is located and the height of graph 2810 is greatest can be indicated as a section in which a plurality of speakers made arguments during the sound recording (for example, argument section), and can be differentially displayed according the number of speakers participating in the speech section.

Further, according to various embodiments of the present invention, visual information of the progress bar 2800 can be differently displayed according selection of the speaker as shown in FIGS. 28 and 29. For example, FIG. 28 shows a case in which playback is performed in a state when all of the objects 2710, 2720, 2730, and 2740 are selected from the speaker information area 2700, and the progress bar 2800 can be displayed with visual information corresponding to all the objects 2710, 2720, 2730, and 2740, FIG. 29 shows a case in which playback is performed in a state when specific objects 2730 and 2740 are selected from the speaker information area 2700 by a user, and the progress bar 2800 can be displayed with visual information corresponding to selected objects 2730 and 2740. According to an embodiment of the present invention, the number of speaker's voices in FIG. 29, is less than that in FIG. 8, and thereby the graph 2810, the color 2820, and the icon 2830 may be differently displayed in the progress bar 2800 (for example, it can be displayed with a lower complexity.

Further, according to various embodiments of the present invention, while playing a sound recording file, an object can be displayed with a highlight effect in the speaker information area 2700 corresponding to playback sections by individual speakers (for example, a section of a specific speaker's speech), and a plurality of objects can be displayed with the highlight effect in the speaker information area 2700 corresponding to a playback section in which more than one speaker makes a speech (for example, simultaneous speech section by a plurality of speakers).

FIG. 30 is a diagram illustrating operations for controlling playback of a sound recording file in an electronic device, according to an embodiment of the present invention.

According to various embodiments of the present invention, a function of displaying a text message by recognizing a speaker voice (for example, conference minutes preparation function, or a Speech To Text (STT) function) can be provided while playing a sound recording file. For example, if STT information is included in speaker information of corresponding speaker or a conference minutes preparation function (STT function) is requested by a user while playing a sound recording file, text information can be displayed corresponding to a voice of playback section by synchronizing as shown in FIG. 30.

Referring to FIG. 30, the electronic device 400 can perform the conference minutes preparation function automatically or according to a user's request while playing a sound recording file, and display corresponding text information by recognizing an input voice and converting to a text. The text information can be displayed by distinguishing individual speakers with a talk message display system (for example, speech bubble based talk form) by replacing the speaker information area. In the embodiment of the present invention, the text information can be displayed by replacing the speaker information area. In the embodiment of the present invention, the speech bubble in a talk form can be provided with visual information distinguished by individual speakers, According to the embodiment of the present invention, a color and shape of the speech bubble by individual speakers can be expressed differently.

Further, according to various embodiments of the present invention, information for identifying a speaker can be provided based on the text information by individual speakers and speaker information set to each object (for example, name and image). Further, according to various embodiments of the present invention, the text shown in FIG. 28 can be stored after editing.

Further, according to various embodiments of the present invention, contents of a conference can be added to the sound recording file by setting a user or speaker as a subject at a desired location and inputting an additional text while displaying the text as shown in FIG. 30. According to an embodiment of the present invention, the electronic device 400 can perform a function of converting an input text to a voice (for example, Text To Speech (TSS)) when adding the text. The electronic device 400 can store the sound recording file with the converted voice by mapping the converted voice on a speaker according to a user setting.

Figure 31:
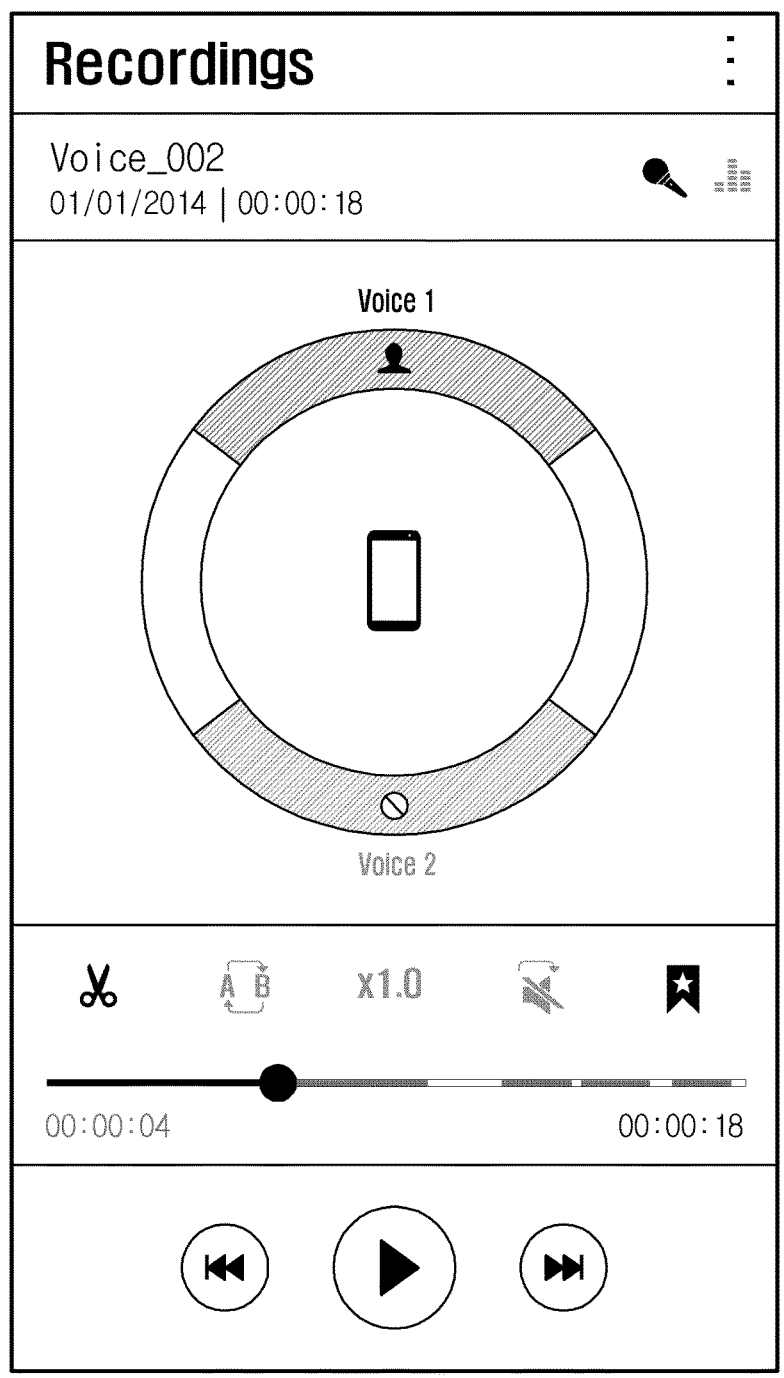
FIG. 31 is a diagram illustrating an interface displayed while playing a sound recording file in an electronic device, according to an embodiment of the present invention.

FIG. 31 is a diagram illustrating an interface displayed while playing a sound recording file in an electronic device, according to an embodiment of the present invention.

FIG. 31 shows a screen interface for playing a sound recording file recorded in an interview mode, according to various embodiments of the present invention. According to various embodiments of the present invention, various playback interfaces can be provided.

For example, FIGS. 22 to 30 show screen interfaces for a conference mode (or talk mode) in various embodiments of the present invention, and FIG. 31 shows a screen interface for an interview mode (or one direction sound recording mode) in various embodiments of the present invention. When playing a sound recording file of the interview mode, the aforementioned operations related to the playback function of the electronic device 400 can be additionally performed.

Figure 32:
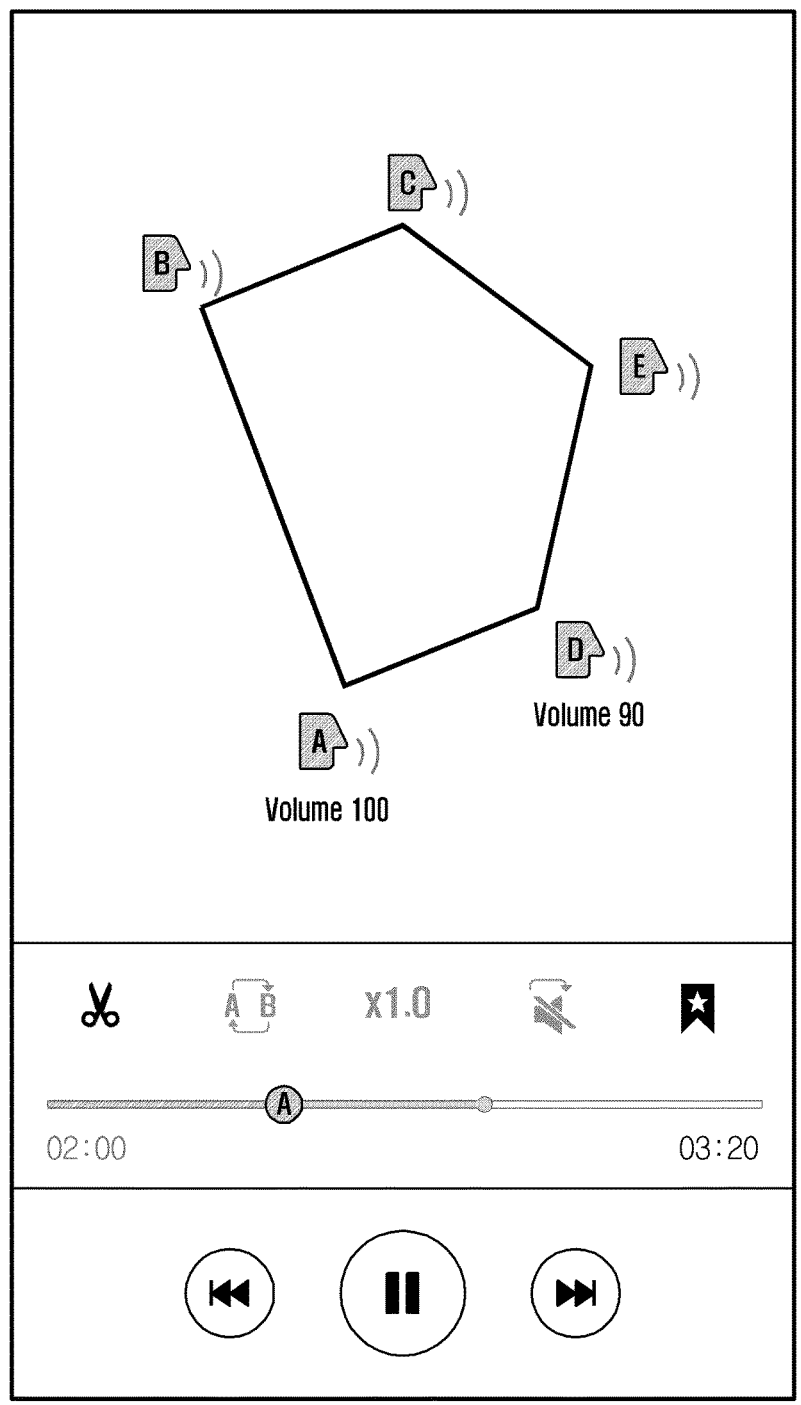
FIG. 32 is a diagram illustrating an example of displaying speaker information in an electronic device, according to an embodiment of the present invention.

FIG. 32 is a diagram illustrating an example of displaying speaker information in an electronic device, according to an embodiment of the present invention.

According to various embodiments of the present invention, while recording a sound or playing a sound recording file, the speaker information can be displayed by disposing based on direction information. According to an embodiment of the present invention, the speaker information can indicate a direction in a circular form as described above. However, the present invention is not limited to this, and the speaker information can be displayed in various graphic forms such as, for example, a conference table form shown in FIG. 32.

Referring to FIG. 32, while recording a sound or playing a sound recording file, the disposition of speakers' seats can be displayed by using direction information and distance information of speakers. In various embodiments of the present invention, the direction information and distance information of speakers can be recorded in the sound recording file. The electronic device 400 can display the disposition of seats by using direction information of traced speakers and by disposing a figure, such as a circle or a polygon, in the center of screen.

According to various embodiments of the present invention, the electronic device 400 can automatically draw a table in a proper shape according to the number of speakers participating in sound recording and locations of the speakers. According to various embodiments of the present invention, the table can be automatically drawn in a circle or a polygon shape (for example, triangle, rectangle, and pentagon), and configured with a specific shape according to a user setting or settings of the electronic device 400, or according to the number of speakers participating in the sound recording of the electronic device 400, speaker direction, and speaker direction.

Further, according to an embodiment of the present invention, a user can select or modify the seat disposition in a specific graphic form desired by the user. According to an embodiment of the present invention, the electronic device 400 can automatically generate a circular table shape based on the direction information and distance information, and display speaker information in the circumference of circle. The user can display the speaker information by changing the circular table shape automatically generated by the electronic device 400 to a polygonal table shape as shown in FIG. 33.

Figure 33:
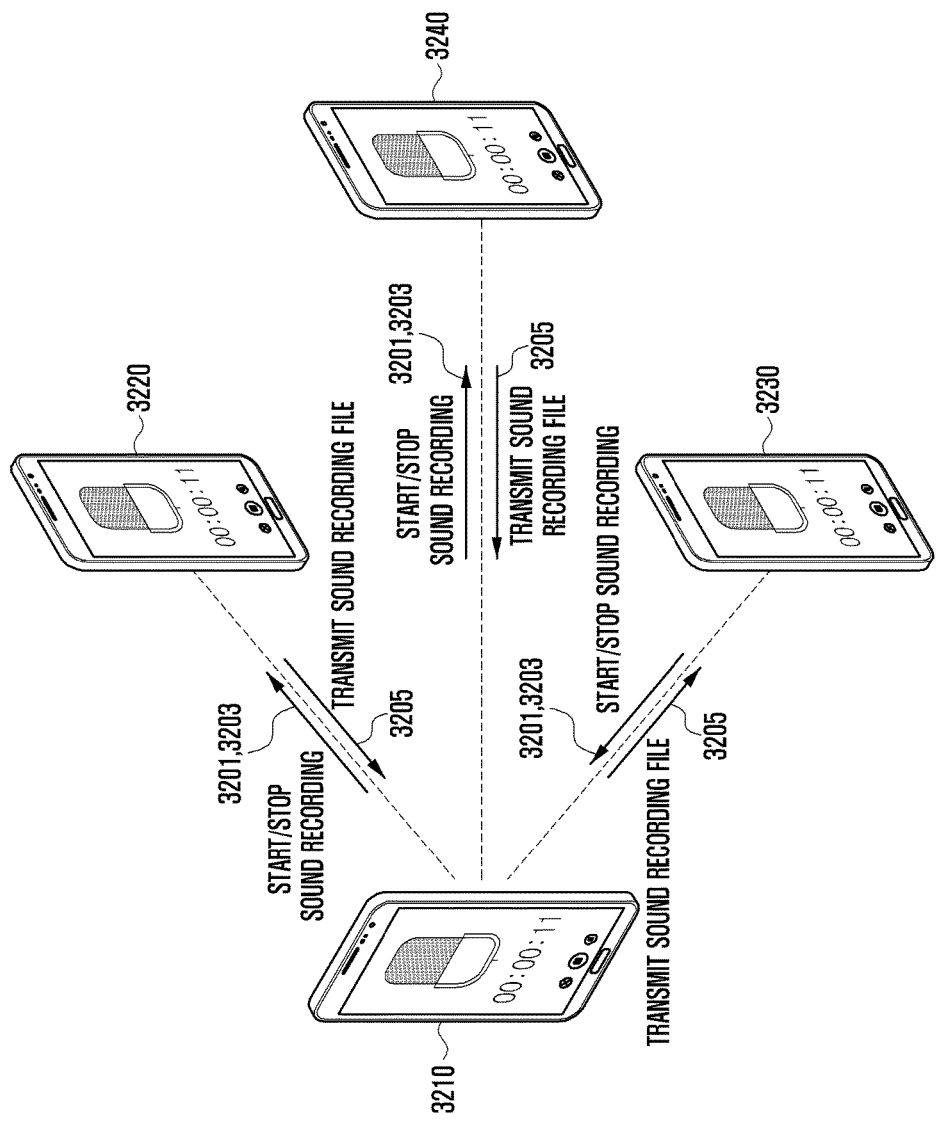
FIG. 33 is a diagram illustrating operations of recording a voice by synchronizing electronic devices, according to an embodiment of the present invention.

FIG. 33 is a diagram illustrating operations of recording a voice by synchronizing electronic devices, according to an embodiment of the present invention.

FIG. 33 shows operations of performing voice recording by synchronizing a plurality of electronic devices (for example, a first electronic device 3210, a second electronic device 3220, a third electronic device 3230, and a fourth electronic device 3240) through wireless and/or wired communication according to various embodiments of the present invention.

In various embodiments of the present invention, the plurality of electronic devices 3210, 3220, 3230, and 3240 can include a plurality of microphones in order to indicate a directional pattern, and perform sound recording when they are in use. Further, the plurality of electronic devices 3210, 3220, 3230, and 3240 can perform the sound recording by using a sound beamforming method.

In various embodiments of the present invention, when recording a sound recording file by synchronizing a plurality of electronic devices 3210, 3220, 3230, and 3240, the electronic devices can be divided in to a master terminal and client terminals, and the master terminal can control general operations related to the sound recording (for example, start of sound recording, or end of sound recording). Alternatively, each electronic device can perform the sound recording as a master terminal without dividing into a master terminal and client terminals. The master terminal can be determined from the plurality of electronic devices 3210, 3220, 3230, and 3240 according to a user selection, or as an electronic device that first performed sound sod recording.

In the example of FIG. 33, the first electronic device 3210 operates as a master terminal, and the second electronic device 3220, the third electronic device 3230, and the fourth electronic device 3240 operate as client terminals.

Referring to FIG. 33, the master terminal 3210 starts sound recording and transmits a command for starting sound recording to client terminals 3220, 3230, and 3240 connected to the master terminal 3210 through wired or wireless communication, in step 3201. The client terminals 3220, 3230, and 3240 start sound recording in response to the command for starting sound recording received from the master terminal 3210.

According to various embodiments of the present invention, when stopping (terminating) the sound recording, in step 3203, the master terminal 3210 transmits a command for stopping the sound recording to client terminals 3220, 3230, and 3240 connected to the master terminal 3210 through wired or wireless communication, and the client terminals 3220, 3230, and 3240 stop the sound recording in response to the command for stopping the sound recording received from the master terminal 3210. In the embodiment of the present invention, when stopping the sound recording, each client terminal 3220, 3230, and 3240 transmits a sound recording file to the master terminal 3210, in step 3205.

According to the embodiment of the present invention, the master terminal 3210 can turn on/off microphone inputs of each client terminal 3220, 3230, and 3210. When turning on/off the microphone inputs of client terminals 3220, 3230, and 3240, the master terminal 3210 transmits a time stamp of the master terminal 3210 to the client terminals 3220, 3230, and 3240. The client terminals 3220, 3230, and 3240 having a microphone turned on according to the control of master terminal 3210 can start sound recording based on the time stamp received from the master ter terminal 3210. Further, the client terminals 3220, 3230, and 3240 having a microphone turned off according to the control of master terminal 3210 can stop sound recording based on the time stamp received from the master terminal 3210 and generate a sound recording file.

According to various embodiments of the present invention, if sound recording files are received from the client terminals 3220, 3230, and 3240, the master terminal 3210 can manage the sound recording files by integrating into a single sound recording file, which is described in greater detail below.

According to various embodiments of the present invention, a method for recording a sound by synchronizing a plurality of electronic devices can be performed by various application systems, such as the system shown in FIG. 33. For example, according to various embodiments of the present invention, the start or stop of sound recording can be performed in response to user inputs through a sound recording button of each electronic device 3210, 3220, 3230, or 3240, and a sound recording file recorded until the end of sound recording can be transmitted to the master terminal 3210 or to all the synchronized electronic device. Each electronic device received sound recording files may manage all the sound recording files by integrating into a single file like the operations of the master terminal 3210.

Further, according to various embodiments of the present invention, when performing sound recording by synchronizing a plurality of electronic devices, a separate server (for example, the server 106) can be utilized. For example, the role of master terminal 3210 can be performed by the separate server. According to an embodiment of the present invention, a plurality of electronic devices 3210, 3220, 3230, and 3240 can start or stop the sound recording according to a user input, or control of the server or specific electronic device. When terminating the sound recording, the plurality of electronic devices 3210, 3220, 3230, and 3240 can transmit sound recording files recorded until the end of sound recording to the server. If sound recording files are received from the plurality of electronic devices 3210, 3220, 3230, and 3240, the server (for example, the server 106) can manage the sound recording file by integrating the received sound recording files into a single sound recording file.

Figure 34:
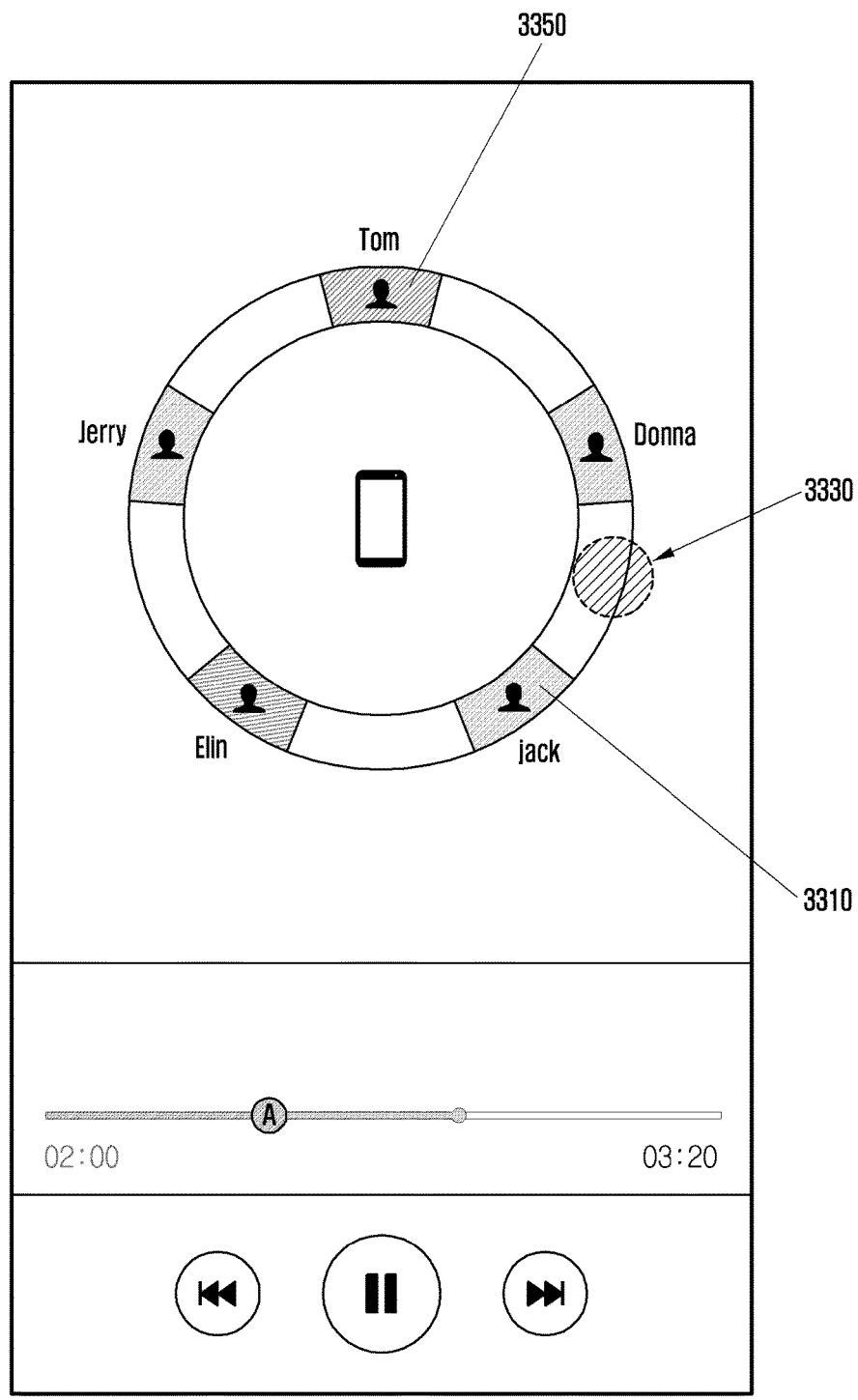
FIG. 34 is a diagram illustrating an interface for displaying a sound recording function by synchronizing electronic devices, according to an embodiment of the present invention.

FIG. 34 is a diagram illustrating an interface for displaying a sound recording function by synchronizing electronic devices, according to an embodiment of the present invention.

In this embodiment of the present invention, the interface for recording a sound by synchronizing electronic devices and playing a sound recording file in the electronic device 400 may have a configuration corresponding to the interface described in detail above. However, the interface provided by synchronizing the electronic devices may include additional operations of inputting or editing related to device information flr distinguishing electronic devices.

Referring to FIG. 34, as described above, locations of electronic devices participating in sound recording can be displayed based on visual information, and the locations of the electronic devices can be changed according to an input (for example, drag & drop) set by a user. The visual information may be displayed based on information matching with a phonebook based on device information of electronic devices (for example, telephone number, device name, and user name). According to an embodiment of the present invention, social information or presence can be displayed by reading RSC information of a counterpart speaker. Further, information such as a photo of a speaker, art image, or a name can be displayed.

Further, according to the embodiment of the present invention, the operations of recording a sound by synchronizing electronic devices can draw a proper table shape automatically or by a user setting, according to the number of electronic devices participating in sound recording and their locations. For example, the device information can be displayed by displaying in a circular or polygonal shape.

Further, according to an embodiment of the present invention, an electronic device operating as a master terminal can exclude a client terminal according to a user input, and the excluded client terminal may automatically terminate group networking. For example, referring to FIG. 34, the user may select an object 3310 corresponding to at least one client terminal (for example, Jack), and perform a predetermined user input (for example, touch based flick input or function button). If the user input is identified, the electronic device 400 can delete the selected object 3310 from the interface, and disconnect a client terminal corresponding to the selected object.

Further, according to the embodiment of the present invention, the electronic device operating as a master terminal can add a new client terminal, and the added client terminal can automatically join in the group networking. For example, referring to FIG. 34, the user can perform a predetermined user input (for example, touch based long press input or function button) in a vacant area 3330 of the interface. If the user input is identified, the electronic device 400 can make a connection with the client terminal responding to the user input, and additionally display an object of the client terminal according to a user selection in the vacant area 3330 of the interface. According to this embodiment of the present invention, the electronic device 400 can display a phonebook list of adjacent electronic devices responding to the user input in the vacant area 3330, and transmit a request message for joining to a specific client terminal if the client terminal is selected. The electronic device that received the request message can participate in the group networking by responding with a user's confirmation.

Further, according to an embodiment of the present invention, when playing an integrated sound recording file through the synchronization of electronic devices, the playback can be controlled by distinguishing electronic devices, Operations for playing a sound recording file can be performed by including playback control operations described above. For example, referring to FIG. 32, information of an object selected by a user responding to a selection of specific object 3350 can be modified, the location of the selected object can be changed, a playback section of the selected object can be skipped, or only the playback section of selected object can be played.

According to various embodiments of the present invention, when playing a sound recording file, if only one sound recording file has been recorded with a higher volume than a predetermined value and other sounds have been recorded with a lower volume than the predetermined value, sounds of the remaining objects can be adjusted to a volume '0' or reduced in order to eliminate an echo, howling, or clipping effect.

Figure 35:
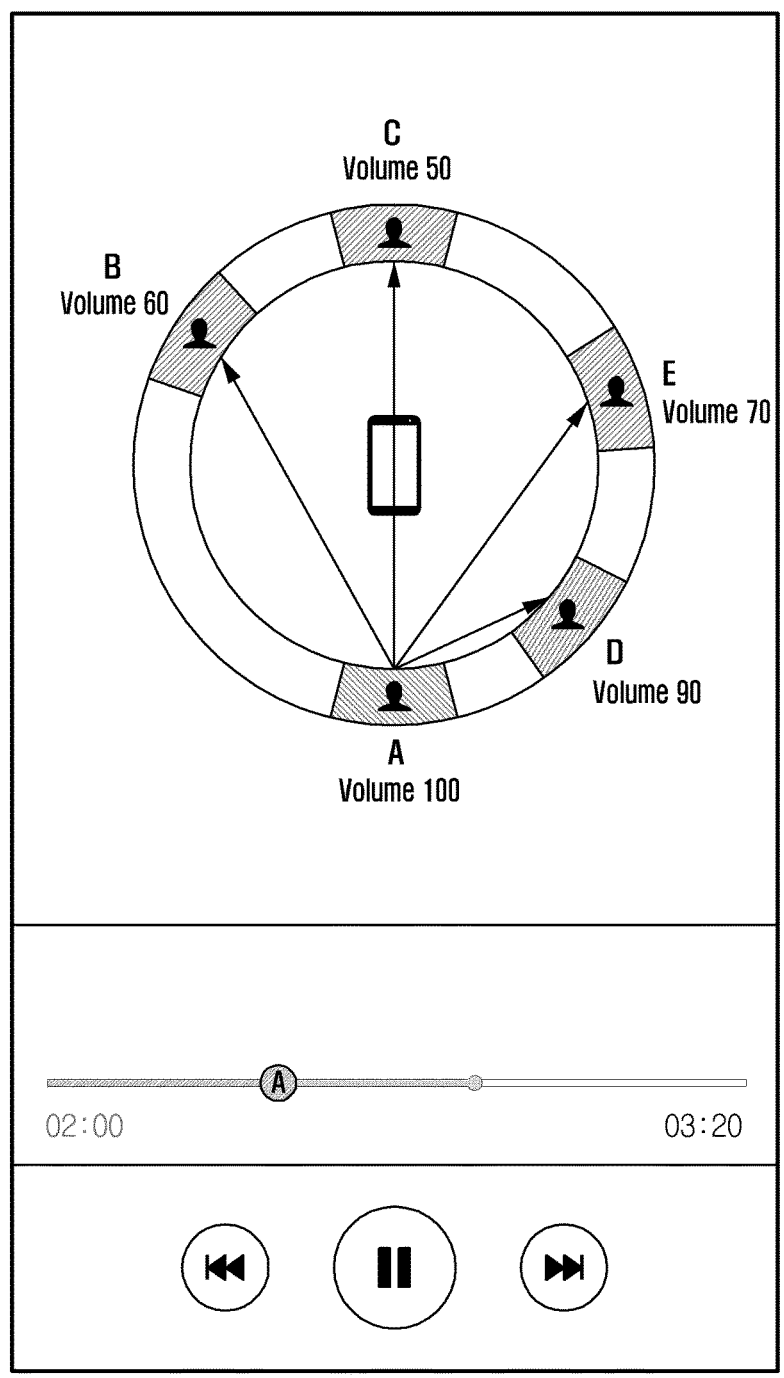
FIGS. 35 to 37 are diagrams illustrating operations of disposing locations of electronic devices participating in sound recording, according to an embodiment of the present invention.
Figure 36:
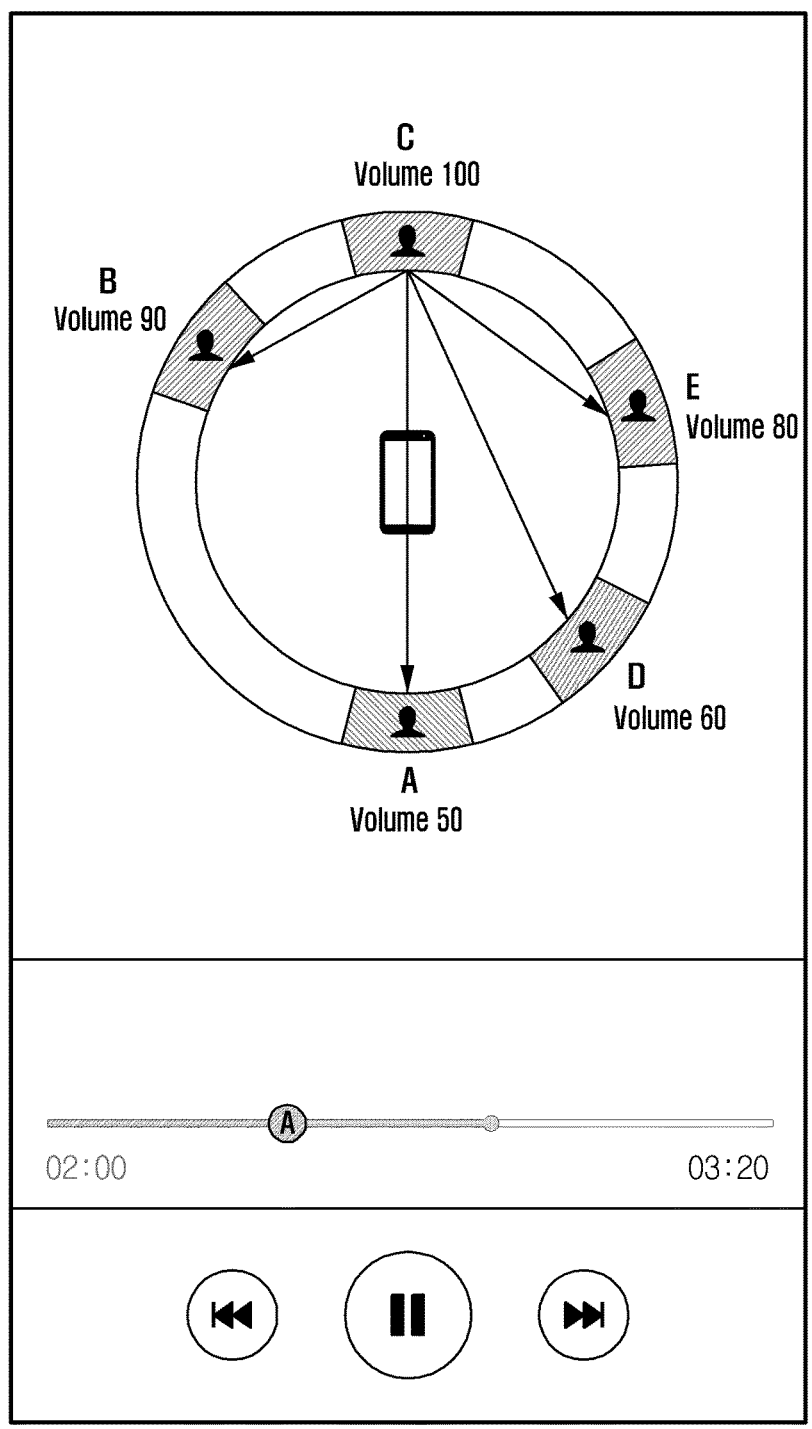
Figure 37:
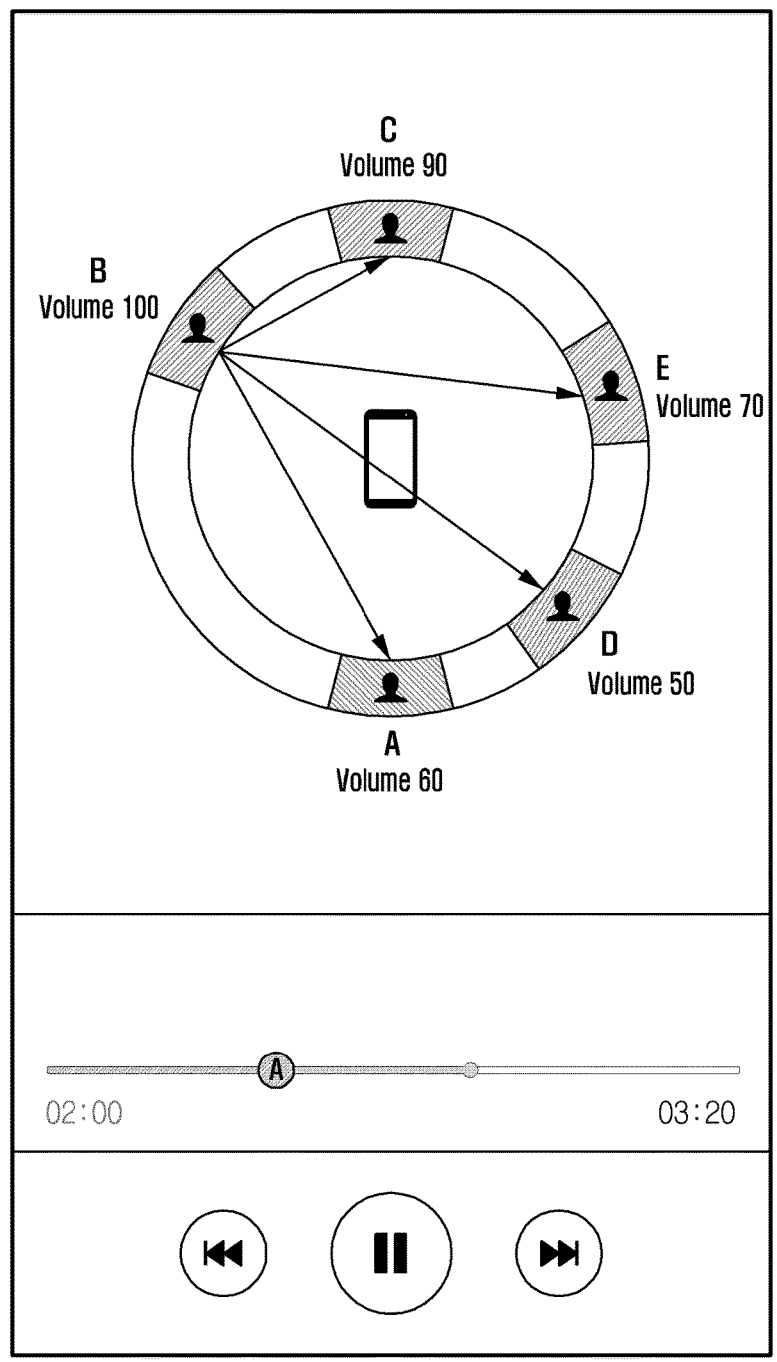

FIGS. 35 to 37 are diagrams illustrating operations of disposing locations of electronic devices participating in sound recording, according to an embodiment of the present invention.

Referring to FIGS. 35 to 37, when displaying electronic devices participating in sound recording while playing a sound recording file, direction information and distance information of client terminals can be used by the master terminal. In the embodiment of the present invention, the direction information and distance information can be stored in a sound recording file. According to various embodiments of the present invention, the client terminals can transmit direction information received from other client terminals to the master terminal or server. The master terminal or server, which received the direction information of each client terminal, can display a circle or other figures in the center of screen, as shown in FIG. 35.

Further, according to this embodiment of the present invention, besides identifying direction information, distances between electronic devices can be calculated by using volume differences of sound recording files recorded by each electronic device. Table 2 shows an example of volume information.

TABLE 2

| Volume Information | A | B | C | D | E |
| --- | --- | --- | --- | --- | --- |
| A | 100 | 50 | 50 | 90 | 70 |
| B | 60 | 100 | 90 | 60 | 80 |
| C | 50 | 60 | 100 | 60 | 80 |
| D | 90 | 50 | 60 | 100 | 80 |
| E | 70 | 80 | 80 | 60 | 100 |

For example, while a speaker of electronic device A is making a speech, each electronic device can record a sound for the identical voice data. According to an embodiment of the present invention, while the speaker of electronic device A is making a speech, electronic devices A to E can record voice data from the speaker of electronic device A. Referring to Table 2, volume differences due to distance differences between the speaker of electronic device A and electronic devices A, B, C, D, and E can be expressed as electronic device A>electronic device D>electronic device E>electronic device B>electronic device C, Accordingly, the seat placements can be predicted based on cumulative data of volume differences according to distance and direction, as shown in FIG. 37.

FIG. 35 shows a case in which the speaker of electronic device A makes a speech. FIG. 36 shows a case in which the speaker of electronic device C makes a speech, and FIG. 37 shows a case in which the speaker of electronic device B makes a speech. Accordingly, each speaker can be distinguished speaker based on the volume differences according to distance differences between electronic devices A, B, C, D, and E, and sound recording and playback of sound by individual speakers can be supported correspondingly.

Further, according to the embodiment of the present invention, the direction information can be estimated by obtaining angle information in a direction having the greatest energy through a plurality of microphones or by using phase differences of voices received from the plurality of microphones.

Further, according to this embodiment of the present invention, if electronic devices participating in sound recording are located in a close proximity, a table shape can be automatically drawn by determining a base electronic device (for example, master terminal), using volume information and direction information of other electronic devices (for example, client terminals) transmitted to the base electronic device, and identifying locations and directions of other electronic devices. In this embodiment of the present invention, the volume information can be used for identifying distances to other electronic devices (for example, client terminals), and the direction information can be identified by using a plurality of microphones or a sound beamforming method. According to various embodiments of the present invention, if the distance or direction of a specific electronic device (for example, client terminal) is difficult to identify, correction can be performed by requesting the corresponding electronic device (for example, client terminal) for direction information and volume information.

Figure 38:
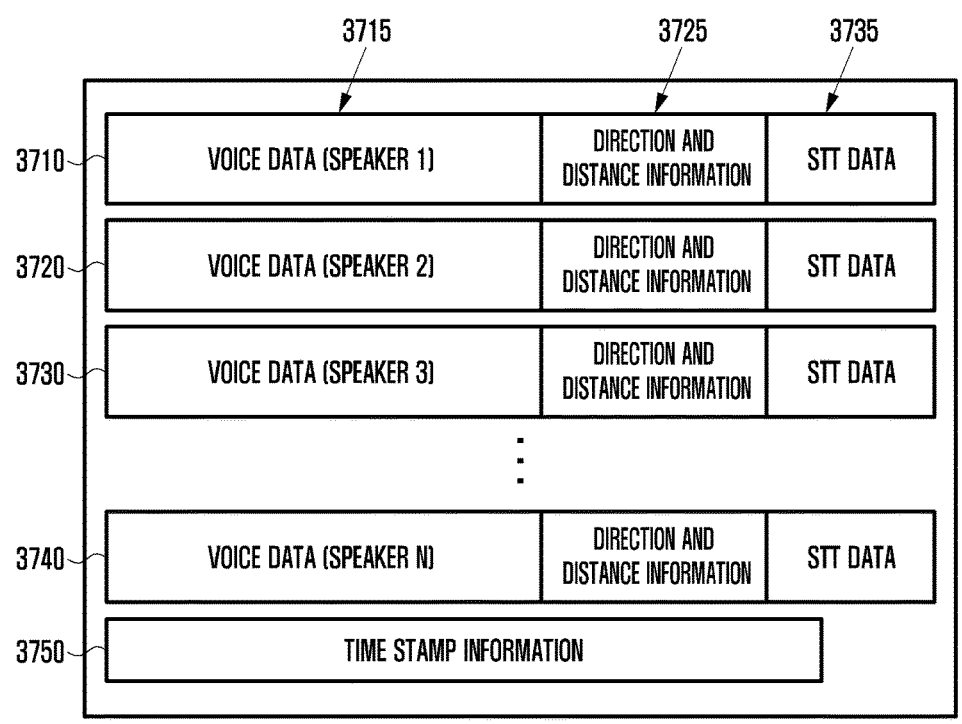
FIGS. 38 and 39 are diagrams illustrating operations of managing a sound recording file in an electronic device, according to an embodiment of the present invention.
Figure 39:
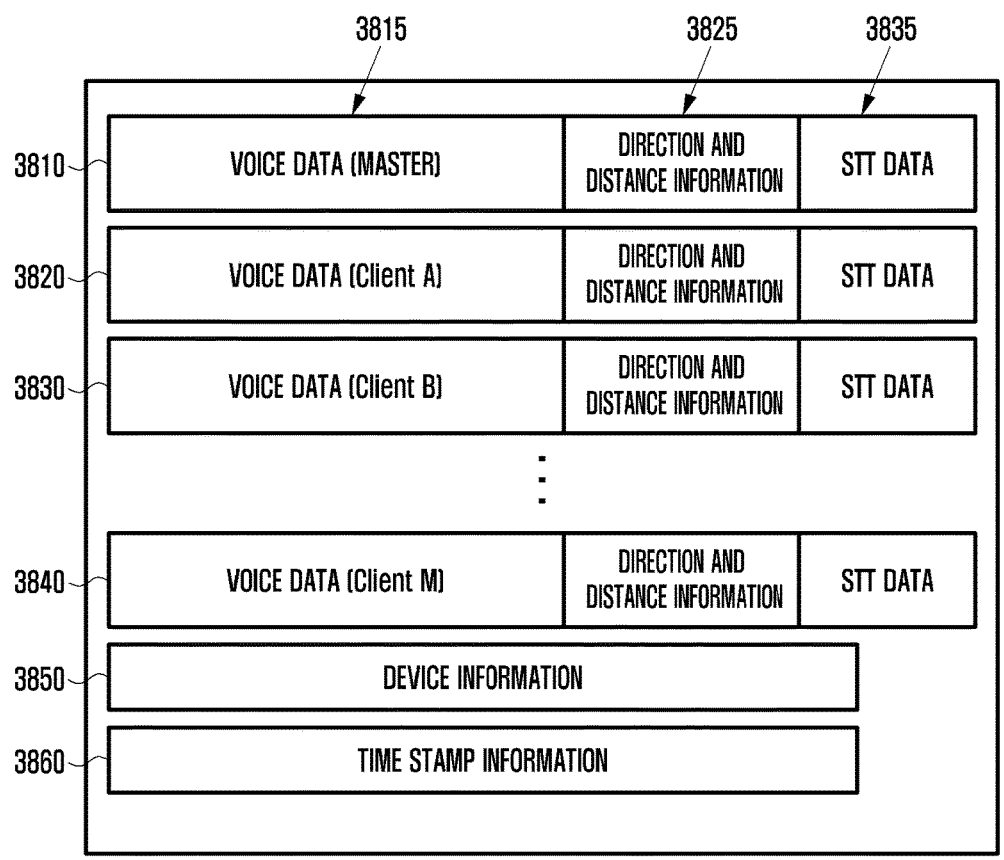

FIGS. 38 and 39 are diagrams illustrating operations of managing a sound recording file in an electronic device, according to an embodiment of the present invention.

In the embodiment of the present invention, the sound recording file can be configured with a plurality of sound recording data generated by sound recording operations through a plurality of microphones, or by a sound recording operation through synchronization of a plurality of electronic devices, as described above. For example, sound recording files generated through a plurality of microphones may have a format shown in FIG. 38, and a sound recording file generated through synchronization of a plurality of electronic devices may have a format shown in FIG. 39.

Referring to FIGS. 38 and 39, the sound recording file can be configured with sound recording data generated by individual speakers or individual electronic devices. For example, if the number of speakers participating in sound recording is N (natural number greater than 1), N pieces of sound recording data 3710, 3720, 3730, and 3740 can be generated. Further, if the number of speakers participating in sound recording is M (natural number greater than 1), M pieces of sound recording data 3810, 3820, 3830, and 3840 can be generated. The electronic device 400 can manage the N or M pieces of sound recording data as a group (file) or as separate files. According to an embodiment of the present invention, the electronic device 400 can generate a single sound recording file by integrating a plurality of sound recording data or generating a plurality of sound recording files corresponding to the sound recording data.

In this embodiment of the present invention, the sound recording data includes voice data 3715 and 3815, direction/distance information 3725 and 3825, and STT data 3735 and 3835. In this embodiment of the present invention, the sound recording file includes time stamp information 3750 and 3860, and further includes device information 3850 of electronic devices participating in sound recording if the sound recording file is recorded based on synchronization of electronic devices as shown in FIG. 39.

As described above, in the embodiment of the present invention, the electronic device 400 can individually or integrally manage a plurality of sound recording data distinguished by individual speakers based on a multi-input through a plurality of microphones or electronic devices.

Hereafter, operations of managing a sound recording file are described referring to a case that sound recording is performed through synchronization of a plurality of electronic devices and a master terminal transmits receives a plurality of sound recording data from client terminals.

According to various embodiments of the present invention, the master terminal can manage a plurality of sound recording data received from client terminals by integrating into a file. For example, a n audio track of representative sound recording data (for example, sound recording data of a master terminal) can be stored in a first area (for example, mdat area) of an MPEG4 container, and audio tracks of the remaining sound recording data (for example, sound recording data of client terminals) can be stored in a second area (for example, an area different from the first area). Here, the master terminal can manage to generate a sound recording file by matching sound recording data of the first area and second area. While playing a sound recording file, the master terminal can simultaneously play audio tracks of all of the sound recording data. Alternatively, the master terminal can selectively play an audio track of desired sound recording data by individually managing the sound recording data of sound recording file.

Further, according to various embodiment of the present invention, the master terminal can manage a plurality of sound recording data received from client terminals by mixing into an audio track. For example, the master terminal can generate a sound recording file by mixing its own sound recording data and sound recording data received from client terminals. Such a sound recording file can be stored by mixing all of the sound recording data as a single sound recording data, and an audio track of sound recording data can be selectively played through sampling.

Further, according to various embodiment of the present invention, the master terminal can manage to store audio tracks of a plurality of sound recording data received from client terminals through channels in an MPEG4 file. When playing a sound recording file, the master terminal can play all the channels of MPEG4 file or desired channels selectively.

Further, according to various embodiment of the present invention, the master terminal can maintain a plurality of sound recording data received from client terminals in an original state, and generate a specific separate file for managing the plurality of sound recording data. The generated specific file may include device information and sound recording data information of the plurality of client terminals, and may further include direction information and distance information of the client terminals. The master terminal can simultaneously play a plurality of sound recording files.

Further, according to various embodiment of the present invention, a mixing playback or simultaneous playback can be supported when playing a plurality of sound recording data simultaneously recorded by the master terminal and client terminal. For example, according to various embodiments of the present invention, the sound recording data in a raw state can be played by using methods of merging after time synchronization, selective merging of sound recording data by individual client terminals, or preferential merging of sound recording data by individual client terminals. The method of selectively merging sound recording data by client terminals is performed by selecting sound recording data of a client terminal generated by a speaker at a specific time, and ignoring sound recording data of the remaining client terminal. Further, the method of preferentially merging sound recording data by individual client terminals is performed by applying a high weighted value to the volume of a client terminal generating a speech at a specific time, and applying a lower weighted value to the volume of a client terminal not generating a speech.

Figure 40:
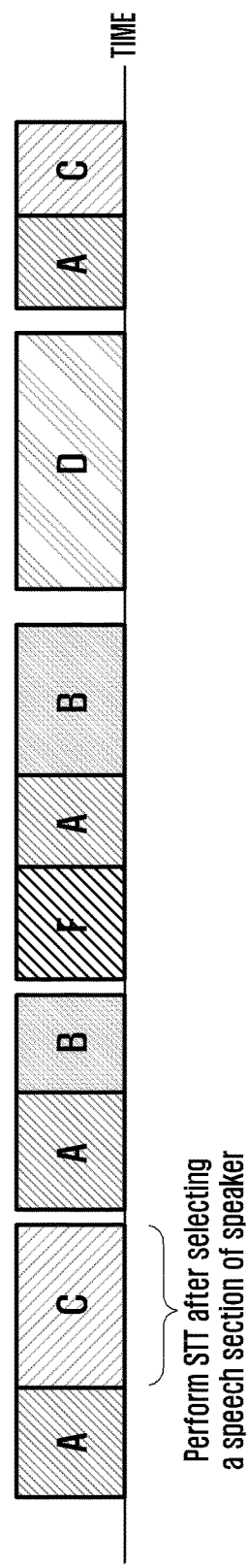
FIG. 40 is a diagram illustrating operations of processing a Speech To Text (STT) function in an electronic device, according to an embodiment of the present invention.

FIG. 40 is a diagram illustrating operations of processing an STT function in an electronic device, according to an embodiment of the present invention.

Referring to FIG. 40, at least a portion of sound recording data of a sound recording file can be stored in the sound recording file by converting a voice to a text. For example, as shown in FIG. 40, STT conversion can be performed by selecting a speech section of a speaker (for example, speaker C). In the embodiment of the present invention, the STT conversion can be performed by identifying a voice from sound recording data of the selected speaker and converting it to text. The converted text can be stored in a specific area of the sound recording data. According to this embodiment of the present invention, as shown in FIGS. 38 and 39, STT data 3735 and 3835, which are converted from the identified voice of the corresponding sound recording data into text, can be included in a portion of the sound recording data selected by a user.

According to the embodiment of the present invention, when playing a sound recording file including STT data, the screen display can be visually processed in a message talk type of messenger, as shown in FIG. 30. Further, according to the embodiment of the present invention, the STT data enables selection of a speech section by individual speakers or electronic devices. A voice of a corresponding section can be converted into text according to the selective playback, and stored in an allocated area of the sound recording file.

Figure 41:
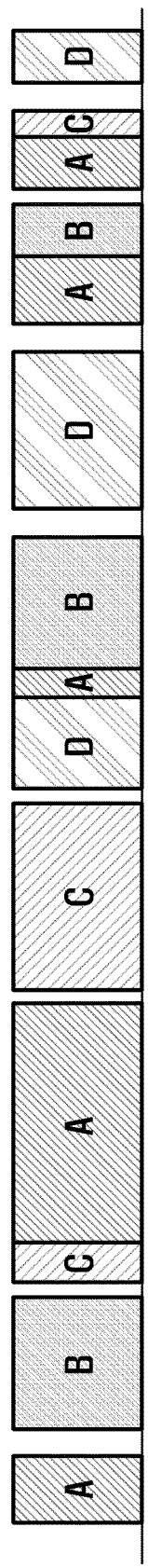
FIGS. 41 to 43 are diagrams illustrating operations of sharing a sound recording file, according to an embodiment of the present invention.
Figure 42:
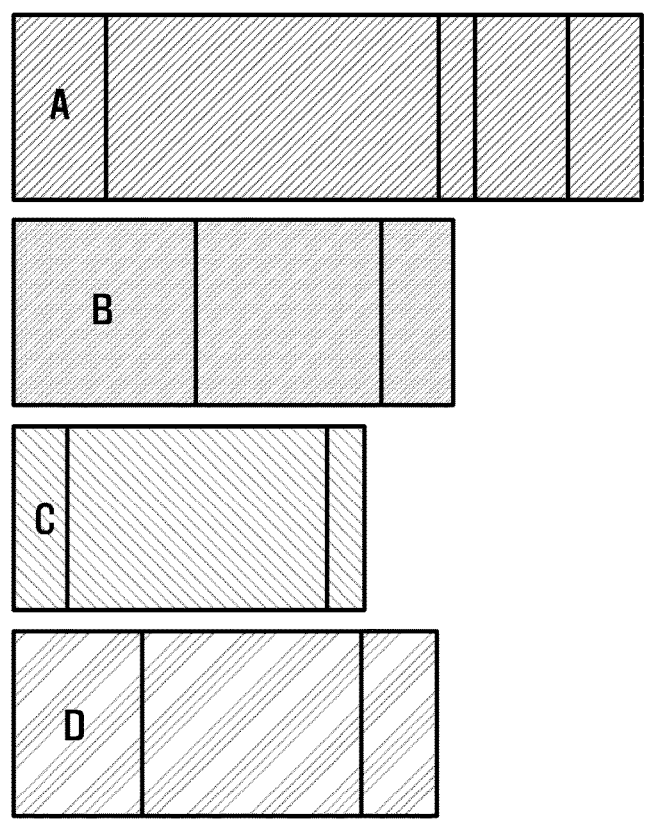
Figure 43:
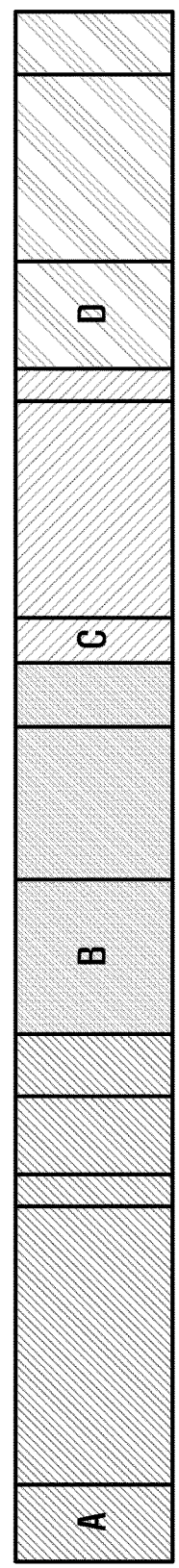

FIGS. 41 to 43 are diagrams illustrating operations of sharing a sound recording file, according to an embodiment of the present invention.

Referring to FIGS. 41 to 43, the sound recording file generated by the electronic device 400 and distinguished by individual speakers can be transmitted and shared with other electronic devices (for example, the server 106 or the electronic devices 102 and 104 of FIG. 1), according to a user setting.

According to various embodiment of the present invention, when transmitting the sound recording file distinguished by individual speakers from the electronic device 400 to other electronic devices, the sound recording file can be edited before transmitting so that an electronic device that does not support playback of the sound recording file with distinguished individual speakers can play the sound recording file. Here, both the original sound recording file and edited sound recording file can be transmitted and shared.

For example, the electronic device 400 can generate a number of divided sound recording files (an edited sound recording file) corresponding to the number of distinguished speakers, as shown in FIG. 42, from the original sound recording file distinguished by individual speakers, as shown in FIG. 41. The electronic device 400 generates a plurality of divided sound recording files (as shown in FIG. 42) from the original sound recording file (as shown in FIG. 41), and can share the divided sound recording files and the original sound recording file selectively with other electronic devices.

According to various embodiments of the present invention, other electronic devices that receive the divided sound recording file can generate a sound recording file by sequentially rearranging a plurality of received sound recording files so that the received sound recording files can be played in sequence, as shown in FIG. 43. The electronic devices, according to various embodiments of the present invention, can share and play the divided sound recording files based on the original sound recording file.

An electronic device and a method for operating the electronic device, according to various embodiments of the present invention, can support voice recording by individual speakers by using a speaker unit and playing a sound recording file by individual speakers. Further, according to various embodiments of the present invention, voice recording by synchronizing a plurality of electronic devices can be supported, and playing sound recording files of each electronic device by individual speakers can be supported through integration of the sound recording file.

According to various embodiments of the present invention, while recording a voice by using an electronic device, the quality of sound recording can be secured, and while playing a sound recording file, a user can intuitively identify a sound recording environment through playback distinguished by individual speakers. According to various embodiments of the present invention, speaker information and location or direction information of speakers participating in the sound recording can be intuitively displayed while playing a sound recording file, and the sound recording function can be improved by supporting playback of a sound recording file according to the selection of a speaker.

According to various embodiments of the present invention, user conveniences can be improved by providing an optimum environment for supporting a sound recording function in the electronic device, and thereby, it can contribute to improvements in usability of an electronic device, accessibility, convenience, and competitiveness.

While the invention has been shown and described with reference to certain embodiments thereof, it will be understood by those skilled in the art that various changes in form and detail may be made therein without departing from the spirit and scope of present invention, as defined by the appended claims and their equivalents.

What is claimed is:

1. A method for operating an electronic device, the method comprising the steps of:
   identifying a voice of at least one speaker from an acoustic signal;
   identifying each direction from the electronic device to the at least one speaker;
   providing a user interface for the acoustic signal based on the each direction; and
   updating the user interface by:
   displaying speaker information and direction information when a sound recording is performed on the acoustic signal; and storing a sound recording file by distinguishing a speaker based on the identified voice of at least one speaker, when the sound recording of the acoustic signal is terminated.

2. The method of claim 1, wherein updating the user interface comprises:
identifying the at least one speaker based on the acoustic signal; and
displaying the speaker information-based on the identification of the at least one speaker.

3. The method of claim 1, wherein storing the sound recording file comprises storing a voice of the at least one speaker, direction information of the at least one speaker, and distance information of the at least one speaker.

4. The method of claim 1, wherein identifying the each direction from the electronic device to the at least one speaker comprises:
identifying the direction from the acoustic signal; and
identifying a speaker area of the at least one speaker according to the identified direction.

5. The method of claim 4, wherein identifying the direction from the acoustic signal comprises:
obtaining an angle value of the direction based on energy sizes of the acoustic signal, by using a plurality of microphones, or
using a phase difference between arriving voices.

6. The method of claim 4, wherein identifying the direction from the acoustic signal comprises comparing energy sizes or volume sizes of speakers collected through synchronization of a plurality of electronic devices.

7. The method of claim 4, wherein identifying the speaker area is performed based on a direction cumulated for a predetermined time.

8. The method of claim 4, wherein identifying the speaker area comprises identifying a speech section of the at least one speaker, a noise section, a simultaneous speech section, a mute section, a speaker movement section, or a continuous speech section of the at least one speaker.

9. The method of claim 1, wherein displaying the speaker information comprises:
receiving a user input related to the speaker information while performing the sound recording; and
editing the speaker information in response to the user input.

10. The method of claim 9, wherein editing the speaker information comprises:
compensating a speaker area according to a movement of the speaker; and
compensating the speaker area according to a movement of the electronic device.

11. The method of claim 10, wherein compensating the speaker area according to the movement of the speaker comprises identifying an identical speaker by using speaker recognition.

12. The method of claim 10, wherein compensating the speaker area according to the movement of the electronic device comprises compensating a rotation angle or displacement by using at least one sensor.

13. The method of claim 9, wherein editing the speaker information comprises synchronizing the speaker information with a user input or a phonebook.

14. The method of claim 1, wherein storing the sound recording file comprises storing at least one of the speaker information, a voice signal of the at least one speaker, text information converted by a Speech To Text (STT) function, and area information of the at least one speaker.

15. The method of claim 1, further comprising sharing the sound recording file with an external electronic device, wherein the sound recording file includes an original sound recording file and divided sound recording files.

16. The method of claim 3, wherein the direction information and the distance information are identified by the electronic device, or obtained from values identified by a plurality of electronic devices.

17. A method for operating an electronic device, the method comprising the steps of:
performing a playback operation;
providing a user interface including a speaker area of at least one speaker corresponding to the playback operation;
outputting a voice of the at least one speaker according to a playback section while performing the playback operation; and
updating the speaker area in the user interface corresponding to the at least one speaker while outputting the voice of the at least one speaker,
wherein a sound recording file that performed the playback operation is stored by distinguishing a speaker based on the voice of at least one speaker.

18. The method of claim 17, wherein updating the speaker area comprises:
identifying the speaker area corresponding to the voice; and
converting the speaker area to a visual form based on the identification of the speaker area.

19. The method of claim 17, further comprising:
receiving a user input while performing the playback operation;
playing a selected speaker area according to the user input; and
visually displaying the selected speaker area.

20. The method of claim 18, wherein converting the speaker area comprises including at least one of speaker information, direction information of a speaker, and distance information of the at least one speaker.

21. The method of claim 18, wherein converting the speaker area comprises displaying and distinguishing the at least one speech section, a mute section, a simultaneous speech section, and an argument section.

22. The method of claim 17, further comprising:
receiving a user input while performing the playback operation; and
editing speaker information based on the user input,
wherein editing the speaker information comprises editing a location of individual speakers or the speaker information in the speaker area.

23. The method of claim 18, wherein converting the speaker area comprises displaying text information corresponding to a voice output of a playback section when playing the playback section including the text information.

24. An electronic device comprising:
a plurality of microphones configured to receive voice input;
a storage unit configured to store a sound recording file by distinguishing a speaker;
a display unit configured to visually display speaker areas of individual speakers when recording a sound or playing a sound recording file; and
a control unit configured to provide a user interface relating a speaker direction to at least one speaker by identifying a voice of the at least one speaker while recording the sound or performing playback of the sound recording file, and to update at least one of speaker information, direction information, and distance information of the at least one speaker through the user interface.

25. A non-transitory computer readable medium having a program, which when executed implements the steps of:
- identifying a voice of at least one speaker from an acoustic signal;
- identifying each direction from the electronic device to the at least one speaker;
- providing a user interface for the acoustic signal based on the each direction; and
- outputting a voice of the at least one speaker according to a playback section while performing the playback operation, wherein providing the user interface comprises:
- displaying speaker information and direction information; and
- storing a sound recording file by distinguishing a speaker based on the identified voice of at least one speaker.

* * * * *